(12) United States Patent
Abe et al.

(10) Patent No.: US 8,764,102 B2
(45) Date of Patent: Jul. 1, 2014

(54) STRUCTURE OF HIGH-STRENGTH VEHICLE BODY MEMBER

(75) Inventors: Masato Abe, Saitama (JP); You Matsutani, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 174 days.

(21) Appl. No.: 13/130,373

(22) PCT Filed: Nov. 20, 2009

(86) PCT No.: PCT/JP2009/069687
§ 371 (c)(1),
(2), (4) Date: May 20, 2011

(87) PCT Pub. No.: WO2010/058832
PCT Pub. Date: May 27, 2010

(65) Prior Publication Data
US 2011/0227369 A1 Sep. 22, 2011

(30) Foreign Application Priority Data

Nov. 21, 2008 (JP) ................................ 2008-297592
Dec. 5, 2008 (JP) ................................ 2008-311408
Feb. 3, 2009 (JP) ................................ 2009-022080

(51) Int. Cl.
*B60K 37/00* (2006.01)
(52) U.S. Cl.
USPC ....................................... 296/193.02; 296/70
(58) Field of Classification Search
CPC .............................. B62D 25/145; B62D 25/14
USPC .......................... 296/193.02, 70, 72; 280/752
See application file for complete search history.

(56) References Cited

U.S. PATENT DOCUMENTS

| 5,238,286 A | 8/1993 | Tanaka et al. |
| 7,185,917 B2 | 3/2007 | Nagata et al. |

(Continued)

FOREIGN PATENT DOCUMENTS

| CN | 1590165 | 3/2005 |
| CN | 1603173 | 4/2005 |

(Continued)

OTHER PUBLICATIONS

Chinese Office Action issued Oct. 12, 2012 in corresponding Chinese Application No. 200980146521.5.

(Continued)

*Primary Examiner* — Joseph Pape
(74) *Attorney, Agent, or Firm* — Wenderoth, Lind & Ponack, L.L.P.

(57) ABSTRACT

The strength and rigidity of a high-strength-vehicle-body-member main part can be effectively improved.
A structure of a high-strength vehicle body member, includes: a high-strength-vehicle-body-member main part 37 provided in a front part of a cabin 31 of a vehicle and extending substantially in a vehicle width direction; a high-rigidity structure part 64 provided at least to a middle portion of the high-strength-vehicle-body-member main part 37 and including a plurality of closed cross-section portions aligned in a front-rear direction of the vehicle; a stay 42 attached to the high-rigidity structure part 64 and supporting the high-strength-vehicle-body-member main part 37 in a vertical direction; a post bracket 44 attached to the high-rigidity structure part 64 and supporting the high-strength-vehicle-body-member main part 37 in the vehicle front-rear direction; and a knee protector 47 attached to the high-rigidity structure part 37 and being capable of receiving a knee of an occupant and absorbing a knee input load thereof upon application of an emergency input load in the vehicle front-rear direction.

20 Claims, 26 Drawing Sheets

(56) References Cited

U.S. PATENT DOCUMENTS

| | | | |
|---|---|---|---|
| 7,367,613 B2 * | 5/2008 | Ellison et al. | 296/193.02 |
| 7,497,143 B2 | 3/2009 | Hayashi | |
| 2003/0057692 A1 | 3/2003 | Horsch et al. | |
| 2004/0135400 A1 * | 7/2004 | Matsuzaki et al. | 296/193.02 |
| 2005/0067824 A1 | 3/2005 | Kim | |
| 2007/0222200 A1 | 9/2007 | Kukubo | |
| 2008/0054680 A1 | 3/2008 | Ellison et al. | |
| 2008/0054681 A1 | 3/2008 | Ellison et al. | |
| 2008/0054682 A1 | 3/2008 | Ellison et al. | |

FOREIGN PATENT DOCUMENTS

| | | |
|---|---|---|
| CN | 1956872 | 5/2007 |
| EP | 1 894 819 | 3/2008 |
| JP | 7-267026 | 10/1995 |
| JP | 2000-108940 | 4/2000 |
| JP | 2001-270467 | 10/2001 |
| JP | 2002-274433 | 9/2002 |
| JP | 2003-127814 | 5/2003 |
| JP | 2003-182593 | 7/2003 |
| JP | 2005-96525 | 4/2005 |
| JP | 2005-112078 | 4/2005 |
| JP | 2006-341808 | 12/2006 |
| JP | 2007-191014 | 8/2007 |

OTHER PUBLICATIONS

Supplementary European Search Report issued Apr. 4, 2012 in European Patent Application No. EP 09 82 7613.

International Search Report issued Feb. 23, 2010 in International (PCT) Application No. PCT/JP2009/069687.

* cited by examiner

STRUCTURE OF HIGH-STRENGTH VEHICLE BODY MEMBER

TECHNICAL FIELD

The present invention relates to a structure of a high-strength vehicle body member.

BACKGROUND ART

Vehicles such as automobiles are provided with a resin instrument panel in a front part of the cabin. Behind the instrument panel, a metal, high-strength vehicle body member is provided (see Patent Documents 1 and 2, for example).

In general, as shown in FIG. 31, the front part of the cabin (cabin front part FR1) includes a cabin front wall FR2, a cabin floor FR3, and cabin side walls FR4.

As shown in FIG. 3, a high-strength vehicle body member 1 provided in the front part of the cabin includes a high-strength-vehicle-body-member main part 3 which extends substantially in a vehicle width direction 2. In FIG. 3, the high-strength-vehicle-body-member main part 3 is formed of a pipe member having a circular cross section. This pipe member has a shape in which its middle portion bulges (toward the front). The high-strength-vehicle-body-member main part 3 includes, at its both ends, side brackets 4 for attachment to left and right vehicle body panels (side panels; not illustrated), respectively.

The high-strength-vehicle-body-member main part 3 is designed mainly for supporting a steering column (not illustrated). For this reason, at a middle portion (driver-seat side portion) in the vehicle width direction 2, the high-strength-vehicle-body-member main part 3 includes a column bracket 5 for attachment of the steering column. The column bracket 5 is usually provided to the high-strength-vehicle-body-member main part 3 while being divided in the front-rear direction (not illustrated).

Also, at a center portion of the middle portion in the vehicle width direction 2, the high-strength-vehicle-body-member main part 3 includes stays 8 that fix a lower portion of the high-strength-vehicle-body-member main part 3 to a cabin floor 6 (floor panel; see FIG. 5) to thereby support the high-strength-vehicle-body-member main part 3 in a vertical direction 7. In FIG. 3, the stays 8 are provided as a pair of left and right stays. The stays 8 are provided with attachment brackets (not illustrated) or the like to which a car audio system (not illustrated), a control box (not illustrated) for controlling the air conditioning system, and the like can be attached. Moreover, for the car audio system, the control box, and the like to be mounted at predetermined positions, the stays 8 are set at positions at a cabin inner side of an instrument panel 9 (see FIG. 5). In FIG. 5, each stay 8 has a shape in which it extends substantially in the vertical direction 7 and an upper end side thereof bends toward the front of the vehicle in a side view. Due to such a shape, the positions of the upper end and the lower end of the stay 8 are different from each other to a large extent in the front-rear direction.

At the driver-seat side portion of the middle portion in the vehicle width direction 2, the high-strength-vehicle-body-member main part 3 includes a post bracket 13 that fixes a vehicle-front-side portion of the high-strength-vehicle-body-member main part 3 to a cabin front wall 11 (dash panel; see FIG. 5) to thereby support the high-strength-vehicle-body-member main part 3 in the vehicle front-rear direction 12. In FIG. 3, the post bracket 13 extends in the vehicle front-rear direction 12 and has a substantially U cross-sectional shape with its top open. As shown in FIG. 6, this post bracket 13 is so configured that its strength is about such a level that the post bracket 13 is bent and deformed (crushed) as indicated by an imaginary line upon application of an emergency input load 15 from the front (e.g., displacement of the cabin front wall 11 toward the rear of the vehicle), and that the post bracket 13 is also bent and deformed upon application of knee input loads 16 and 17 (see FIG. 5) by the occupant from the rear of the vehicle. To achieve such a strength, a notch, some other frangible portions 18 (see FIG. 6), and the like are formed in the post bracket 13 to purposely lower the strength of the post bracket 13.

Further, if necessary, the high-strength-vehicle-body-member main part 3 includes a knee protector 21 at the driver-seat side portion or a passenger-seat side portion of the middle portion in the vehicle width direction 2 as shown in FIG. 4. The knee protector 21 is capable of receiving the knees of the occupant in an emergency and absorbing the knee input loads 16 and 17 (see FIG. 5). The knee protector 21 includes, for example, knee protection brackets 22 each of which extends downward from a lower portion of the high-strength-vehicle-body-member main part 3 and has a substantially L or V shape in the side view, and a knee receiving member 23 which directly receives the knees of the occupant. In this case, the knee protection brackets 22 are provided as paired left and right brackets in a way to substantially correspond to both knees of the occupant, respectively. In addition, the knee receiving member 23 is laid between cabin-inner-side end portions of the paired left and right knee protection brackets 22.

Moreover, besides the knee protector 21 described above, there exists a knee protector such as one shown in FIG. 5 which is made suitable for occupants of different physical sizes by including different knee protection brackets, namely, upper knee protection brackets 24 capable of receiving mainly the knees of an occupant of an average physical size and absorbing the knee input load 16 thereof, and lower knee protection brackets 25 capable of receiving mainly the knees of an occupant of a small physical size and absorbing the knee input load 17 thereof. Note that the knee protector 21 in FIG. 4 does not have such a function to handle different physical sizes.

As described above, the high-strength-vehicle-body-member main part 3 is attached to the unillustrated left and right vehicle body panels (side panels) with the help of the side brackets 4 provided at both ends of the high-strength-vehicle-body-member main part 3.

The high-strength-vehicle-body-member main part 3 basically functions to support the steering column through the column bracket 5.

Moreover, the stays 8 provided to the middle portion, in the vehicle width direction 2, of the high-strength-vehicle-body-member main part 3 function to fix the lower portion of the high-strength-vehicle-body-member main part 3 to the cabin floor 6 (floor panel) to support the high-strength-vehicle-body-member main part 3 mainly in the vertical direction 7. By the stays 8, it is possible to suppress vibrations of the steering column and the high-strength-vehicle-body-member main part 3 in the vertical direction 7, and the like.

The post bracket 13 provided to the middle portion, in the vehicle width direction 2, of the high-strength-vehicle-body-member main part 3 functions to fix the vehicle-front-side portion of the high-strength-vehicle-body-member main part to the cabin front wall 11 (dash panel) to support the high-strength-vehicle-body-member main part 3 mainly in the vehicle front-rear direction 12. The post bracket 13 also functions to prevent the high-strength-vehicle-body-member main part 3 from being displaced toward the rear of the vehicle, being bent, and so on, by being bent and deformed (crushed) before the high-strength-vehicle-body-member main part 3 is deformed, upon application of the emergency input load 15 from the front of the vehicle, as illustrated in FIG. 6. The post bracket 13 also functions to prevent the high-strength-vehicle-body-member main part 3 from being displaced toward the front of the vehicle, being bent, and so on, by being bent and deformed (crushed) before the high-strength-vehicle-body-member main part 3 is deformed, upon application of the knee input loads 16 and 17 by the occupant from the cabin inner side.

The knee protector 21 provided to the middle portion, in the vehicle width direction 2, of the high-strength-vehicle-body-member main part 3 functions to absorb the knee input loads 16 and 17 in an emergency by receiving the knees of the occupant via the knee receiving member 23 and allowing the knee protection brackets 22 to be bent and deformed (crushed).

Further, the structure in FIG. 5 functions based on the height at which the knees hit the knee receiving remember 23; that is, mainly the upper knee protection brackets 24 are bent and deformed (crushed) to absorb the knee input load 16 from an occupant of an average physical size, whereas mainly the lower knee protection brackets 25 are bent and deformed (crushed) to absorb the knee input load 17 from an occupant of a small physical size.

With the configuration as described above, it is possible to prevent the occupant from being thrown out of the vehicle and the like accidents in the event that an emergency input load is inputted to the vehicle, for example.

Meanwhile, behind the instrument panel, a metal, high-strength vehicle body member having a different structure may be provided (see Patent Document 1, for example).

As shown in FIGS. 22 and 23, a high-strength vehicle body member 202 provided in a front part of a cabin 201 includes a high-strength-vehicle-body-member main part 204 which extends substantially in a vehicle width direction 203.

This high-strength-vehicle-body-member main part 204 is usually formed of a pipe member having a circular cross section. This pipe member is so formed that its driver-seat side (large-diameter pipe portion 205) is thick and its passenger-seat side (small-diameter pipe portion 206) is narrow. Between the large-diameter pipe portion 205 and the small-diameter pipe portion 206, a tapered joining portion 207 is provided to continuously join both pipe portions while absorbing the difference in diameter therebetween. The large-diameter pipe portion 205 and the tapered joining portion 207 are integrally fixed to each other by welding (all around welding), and the tapered joining portion 207 and the small-diameter pipe portion 206 are integrally fixed to each other by welding (all around welding). Meanwhile, in FIG. 22, the high-strength vehicle body member 202 is shown as a member for a left-hand drive vehicle.

The high-strength-vehicle-body-member main part 204 includes, at its both ends, side brackets 209 that are attachable to left and right vehicle body panels (side panels; not illustrated). These side brackets 209 are integrally fixed to the high-strength-vehicle-body-member main part 204 by welding.

In addition, at a middle portion in the vehicle width direction 203, the high-strength-vehicle-body-member main part 204 includes a stay 212 that fixes a lower portion of the high-strength-vehicle-body-member main part 204 to a cabin floor (floor panel; not illustrated) to thereby support the high-strength-vehicle-body-member main part 204. This stay 212 extends substantially in a vertical direction 213. The upper end of the stay 212 is integrally fixed to the high-strength-vehicle-body-member main part 204 by welding.

Further, at the middle portion in the vehicle width direction 203, the high-strength-vehicle-body-member main part 204 includes column brackets 215 and 216 through which a steering column 214 (see FIG. 23) can be attached at least to a lower portion of the high-strength-vehicle-body-member main part 204. These column brackets 215 and 216 are usually provided on front and rear sides of the high-strength-vehicle-body-member main part 204, respectively. Moreover, each of the column brackets 215 and 216 is usually provided as a pair of left and right column brackets. The column brackets 215 and 216 are integrally fixed to the high-strength-vehicle-body-member main part 204 by welding.

The high-strength-vehicle-body-member main part 204 also includes a post bracket 217 capable of supporting a vehicle-front-side portion of the high-strength-vehicle-body-member main part 204.

As shown in FIG. 23, this post bracket 217 has a substantially bifurcated shape in the side view including: a main-part supporting portion 221 provided between a cabin front wall 218 (dash panel) and the vehicle-front-side portion of the high-strength-vehicle-body-member main part 204; and a column supporting portion 222 provided between the cabin front wall 218 (dash panel) and the column bracket 215 at the vehicle front side.

The post bracket 217 is formed of a single vertical surface portion 223. A horizontal flange portion 224 which is obtained by bending is provided at the upper end of this vertical surface portion 223 (an upper end portion of the main-part supporting portion 221). This horizontal flange portion 224 has a small and substantially fixed width.

A front-wall attachment portion 225 which is attachable to the cabin front wall 218 is provided to a middle portion of the bifurcated post bracket 217, i.e., a portion at which the front end of the main-part supporting portion 221 and the front end of the column supporting portion 222 meet. As shown in FIG. 24, this front-wall attachment portion 225 includes a contact surface 226 capable of contacting the cabin front wall 218, and a fastening portion 227, such as a screw hole, provided through this contact surface 226.

The post bracket 217 (main-part supporting portion 221 and the like) is also provided with a frangible portion such as a notch (emergency deformation frangible portion; not illustrated) as appropriate so that the post bracket 217 (main-part supporting portion 221 and the like) may not be deformed under normal conditions but may be deformed in an emergency (e.g., when an emergency input load is inputted from the front).

Further, as shown in FIG. 23, the cabin-inner-side end of the main-part supporting portion 221 of the post bracket 217 is integrally fixed to the high-strength-vehicle-body-member main part 204 by welding (welded portion 231). In addition, the cabin-inner-side end of the column supporting portion 22 of the post bracket 217 is integrally fixed to a vehicle-front-side end portion of the column bracket 215 by welding (welded portion 232).

As described above, the high-strength-vehicle-body-member main part 204 is attached to the left and right vehicle body panels (side panels) with the help of the side brackets 209 provided at both ends of the high-strength-vehicle-body-member main part 204.

The high-strength-vehicle-body-member main part 204 basically functions to support the steering column 214 through the column brackets 215 and 216.

Moreover, the stay 212 provided to the middle portion, in the vehicle width direction 203, of the high-strength-vehiclebody-member main part 204 functions to fix the lower portion of the high-strength-vehicle-body-member main part 204 to the unillustrated cabin floor (floor panel) to support the high-strength-vehicle-body-member main part 204 mainly in the vertical direction 213. By the stay 212, it is possible to suppress vibrations of the steering column 214 and the high-strength-vehicle-body-member main part 204 in the vertical direction 213, and the like.

Moreover, the post bracket 217 provided to the middle portion, in the vehicle width direction 203, of the high-strength-vehicle-body-member main part 204 functions to fix the high-strength-vehicle-body-member main part 204 in the vehicle front-rear direction 233 with the main-part supporting portion 221 fixing the vehicle-front-side portion of the high-strength-vehicle-body-member main part 204 to the cabin front wall 218 (dash panel).

The post bracket 217 also functions such that the column supporting portion 222 supports the steering column 214 in the vehicle front-rear direction 233, the vertical direction 213, and the circumferential direction (rotational direction) of the high-strength-vehicle-body-member main part 204 through the column bracket 215 at the vehicle front side.

Moreover, as shown in FIG. 24, the post bracket 217 also functions to prevent the high-strength-vehicle-body-member main part 204 from being displaced toward the cabin inner side, being bent, and so on, with the main-part supporting portion 221 of the post bracket 217 being bent and deformed (crushed) before the high-strength-vehicle-body-member main part 204 is deformed, upon application of the emergency input load 234 from the front in the vehicle front-rear direction 233.

As described above, the post bracket 217 (main-part supporting portion 221 and the like) requires the function which allows the post bracket 217 not to be deformed under normal conditions but allows it to be deformed in an emergency. To achieve such a function, a frangible portion such as a notch (emergency deformation frangible portion; not illustrated) is provided to the post bracket 217 (main-part supporting portion 221 and the like) as appropriate to lower the strength of the post bracket 217 (main-part supporting portion 221 and the like) in an emergency.

Meanwhile, behind the instrument panel, a metal, high-strength vehicle body member having a different structure may be provided (see Patent Documents 2 and 3, for example).

As shown in FIG. 32, a high-strength vehicle body member 305 placed in the cabin front part FR1 (see FIG. 31) includes a high-strength-vehicle-body-member main part 307 which extends substantially in a vehicle width direction 306. The high-strength vehicle body member 305 includes side brackets 308 for attaching both ends of the high-strength-vehicle-body-member main part 307 to the left and right cabin side walls FR4 (see FIG. 31), respectively. The high-strength vehicle body member 305 also includes stays 309 capable of supporting the high-strength-vehicle-body-member main part 307 on the cabin floor FR3 (see FIG. 31). The high-strength vehicle body member 305 also includes a post bracket 311 capable of supporting the high-strength-vehicle-body-member main part 307 on the cabin front wall FR2.

The high-strength-vehicle-body-member main part 307 includes a column bracket 313 capable of supporting a steering column.

As shown in FIG. 33, the high-strength vehicle body member 305 also includes air-conditioning-unit attachment portions 315 for fixing an air conditioning unit 314 to the high-strength-vehicle-body-member main part 307 and the stays 309.

Moreover, as shown in FIG. 35, to the high-strength-vehicle-body-member main part 307, a knee protector 318 is attached which is capable of receiving the knees of the occupant in an emergency (e.g., when an emergency input load is inputted from the front) and absorbing knee input loads 316U and 316D.

Here, as shown in FIGS. 31 and 32, the high-strength-vehicle-body-member main part 307 is usually formed of a metal pipe having a circular cross section. Also, because of the difference in required strength, the high-strength-vehicle-body-member main part 307 includes a large-diameter pipe 321 on the driver-seat side and a small-diameter pipe 322 on the passenger-seat side. The large-diameter pipe 321 and the small-diameter pipe 322 are integrated together with a joining member 324 therebetween. This joining member 324 is a tapered, short tubular member or the like. The large-diameter pipe 321 and the joining member 324 are fixed to each other by welding (all around welding), and the joining member 324 and the small-diameter pipe 322 are fixed to each other by welding (all around welding).

The aforementioned stays 309 are usually made of metal. The stays 309 are attached to a substantially center portion of a middle portion, in the vehicle width direction 306, of the high-strength-vehicle-body-member main part 307. The number of stays 309 provided is usually one or two. The stays 309 extend substantially in a vertical direction 325. An upper end portion of each stay 309 is fixed to a lower portion of the high-strength-vehicle-body-member main part 307 by welding or bolting (in the case of FIG. 31, bolted in the vehicle width direction 306). The upper end portion of the stay 309 is bolted at about such a level that it would not come off in an emergency. Also, a lower end portion of each stay 309 is bolted to the cabin floor FR3 (in the case of FIG. 31, bolted in the vehicle width direction 306).

The aforementioned post bracket 311 is usually made of metal. The post bracket 311 is attached to a driver-seat side portion of the high-strength-vehicle-body-member main part 307 (large-diameter pipe 321). The post bracket 311 extends substantially in a vehicle front-rear direction 326. A front end portion of the post bracket 311 is fixed to the cabin front wall FR2. Moreover, a rear end portion of the post bracket 311 is fixed to a vehicle-front-side portion of the high-strength-vehicle-body-member main part 307, either directly or indirectly with the column bracket 313 therebetween. The rear end portion of the post bracket 311 is fixed by welding to the high-strength-vehicle-body-member main part 307 or to the column bracket 313. Note that the post bracket 311 is configured to be crushed in an emergency as shown in FIG. 34 so as to reduce the distance of rearward displacement of the high-strength-vehicle-body-member main part 307 and to absorb an emergency input load 327. Thus, a frangible portion 328 is provided to the post bracket 311.

The aforementioned column bracket 313 is usually made of metal. The column bracket 313 is attached to a driver-seat side of the high-strength-vehicle-body-member main part 307 (large-diameter pipe 321). The column bracket 311 is provided on both front and rear sides of the high-strength-vehicle-body-member main part 307 so that the steering column can be fixed at its two, front and rear portions (not shown). The column bracket 313 is fixed by welding to the high-strength-vehicle-body-member main part 307.

The aforementioned air-conditioning-unit attachment portions 315 are attached to the center portion of the middle portion, in the vehicle width direction 306, of the high-strength-vehicle-body-member main part 307, the stays 309, and the like. Usually, the air conditioning unit 314 is mainly made of resin.

The aforementioned knee protector 318 is attached to the driver-seat side portion (large-diameter pipe 321) or a passenger-seat side portion (small-diameter pipe 322) of the high-strength-vehicle-body-member main part 307. In the case of FIG. 35, the knee protector 318 includes different brackets, namely, upper brackets 318a for the knees of an occupant of an average physical size, and lower brackets 318b for the knees of an occupant of a small physical size. The upper brackets 318a are joined to the lower brackets 318b by a knee receiving member 318c.

According to such a configuration, when the emergency input load 327 is applied to the vehicle (vehicle body) from the front thereof in an emergency, the cabin front wall FR2 and the left and right cabin side walls FR4 are displaced toward the rear of the vehicle, which in turn displaces the high-strength-vehicle-body-member main part 307 toward the rear of the vehicle by way of the post bracket 311, the side brackets 308, and the like. In this event, the post bracket 311 functions to reduce the distance of displacement of the high-strength-vehicle-body-member main part 307 toward the rear of the vehicle and absorb the emergency input load 327 by allowing the frangible portion 328 to be crushed as shown in FIG. 34.

Moreover, when the cabin front wall FR2 is displaced toward the rear of the vehicle in an emergency, the cabin front wall FR2 crushes the air conditioning unit 314 that is mainly made of resin. This makes it possible to reduce the distances of rearward displacement of the high-strength-vehicle-body-member main part 307 and the stays 309 and to absorb the emergency input load 327.

Furthermore, the knee protector 318 provided to the high-strength-vehicle-body-member main part 307 functions to absorb the knee input loads 316U and 316D in an emergency by receiving the knees of the occupant via the knee receiving member 318c and allowing the upper brackets 318a and the lower brackets 318b to be bent and deformed (crushed).

The knee protector 318 functions such that mainly the upper brackets 318a are bent and deformed (crushed) to absorb the input load 316U (top one in FIG. 35) from an occupant of an average physical size, whereas mainly the lower brackets 318b are bent and deformed (crushed) to absorb the knee input load 316D (bottom one in FIG. 35) from an occupant of a small physical size. With this configuration, it is possible to prevent the occupant from being thrown out of the vehicle and the like accidents, for example.

PRIOR ART DOCUMENTS

Patent Documents

Patent Document 1: Japanese Patent Application Publication No. H07-267026
Patent Document 2: Japanese Patent Application Publication No. 2002-274433
Patent Document 3: Japanese Patent Application Publication No. 2005-112078

SUMMARY OF THE INVENTION

Problems to be Solved by the Invention

However, the structures of the high-strength vehicle body members described above have the following problems.

Specifically, the knee protection brackets 22 constituting the knee protector 21 in FIG. 4 are configured to extend downward from the high-strength-vehicle-body-member main part 3 as shown in FIG. 5 (arm length L). Hence, when the knee protector 21 receives the knees of the occupant in an emergency to absorb knee input loads 16 and 17, the high-strength-vehicle-body-member main part 3 is subjected to a twisting moment M, a load F1 toward the front, a load F2 toward above, and the like (same applies to FIG. 35).

For this reason, in order to predict how the knee protector 21 acts (becomes crushed and so on) against the knee input loads 16 and 17 from the occupant and to cause the knee protector 21 to act accurately as predicted, it is necessary to minimize deformation of the high-strength-vehicle-body-member main part 3 caused by the moment M, the loads F1 and F2, and the like.

Possible measures to reduce deformation of the high-strength-vehicle-body-member main part 3 are: measure 1) to increase the strength of the high-strength-vehicle-body-member main part 3; measure 2) to increase the strengths of the post bracket 13 and the stays 8 to suppress deformation of the high-strength-vehicle-body-member main part 3; and the like.

Consider a case of employing the indirect measure, i.e., the measure 2. In this case, in order to prevent displacement, bend, and the like of the high-strength-vehicle-body-member main part 3, the post bracket 13 is so configured that its strength is about such a level that it is bent and deformed by the emergency input load 15 from the front and also is bent and deformed by the knee input loads 16 and 17 by the occupant from the rear. In other words, the strength of the post bracket 13 is lowered purposely. Accordingly, it is difficult for the post bracket 13 to suppress deformation of the high-strength-vehicle-body-member main part 3.

For installation of the car audio system, the control box, and the like, each stay 8 has the shape in which its upper end side is bent toward the front of the vehicle in the side view so that the stay 8 can be situated at the cabin inner side of the instrument panel 9. In other words, the stay 8 does not have a configuration considering the securing of the strength as the first priority. Thus, it is likewise difficult for the stays 8 to suppress deformation of the high-strength-vehicle-body-member main part 3.

Accordingly, it is most effective and realistic to employ the direct measure, i.e., the measure 1. It should be noted that there are many components behind the instrument panel 9 and the space therein is limited. It is therefore difficult to increase the section modulus of the high-strength-vehicle-body-member main part 3 to increase the strength of the high-strength-vehicle-body-member main part 3. Then, a high-strength (expensive) material, such as a high-tensile steel, may be used instead of increasing the section modulus of the high-strength-vehicle-body-member main part 3. In this way, the strength of the high-strength-vehicle-body-member main part 3 can be increased. Use of such a material, however, causes such problems as requiring a high cost and thus is unrealistic.

Meanwhile, some other possible measure besides the above is, for example, to create a design of the knee protector 21 concerning the deformation of the high-strength-vehicle-body-member main part 3. It is, however, difficult to accurately predict the performance of the protector 21 because the input direction of the knees of the occupant (the directions of the knee input loads 16 and 17) varies depending on the individual, the situation, and so on. Moreover, creating a design concerning the deformation of the high-strength-vehicle-body-member main part 3 is expected to have troubles such as requiring a number of complicated processes, and thus cannot be said to be a realistic measure.

Meanwhile, the post bracket 217 shown in FIG. 23 is configured to be deformed by a predetermined deformation stroke a as indicated by an imaginary line in FIG. 24 upon application of the emergency input load 234 from the front in the vehicle front-rear direction 233. In this way, the emergency input load 234 can be well absorbed. However, if the direction of the emergency input load 234 is off, it may be difficult to secure a sufficient deformation stroke a.

For example, as shown in FIG. 25, if the emergency input load 234 is off in the vehicle width direction 203 (oblique load 235), a deformation stroke b of the post bracket 217 may possibly be small (a>b). Moreover, as shown in FIG. 23, if the emergency input load 234 is off in the vertical direction 213 (vertical load 236), the deformation of the post bracket 217 may possibly be difficult to occur.

That is, in an emergency, the post bracket 13, 217, 311 is forced to be crushed to reduce the distance of rearward displacement of the high-strength-vehicle-body-member main part 3, 204, 307 and absorb the emergency input load 15, 234, 327. However, achieving such reduction and absorption mainly by use of the post bracket 13, 217, 311 is not practical in terms of structure.

In the meanwhile, recently, there have been demands for vehicles such as automobiles to be lighter due to needs for improvement in fuel consumption and the like, and thus the air conditioning unit 314 is now required to be smaller and lighter. This makes the inside of the air conditioning unit 314 denser, which in turn reduces the crush margin in an emergency. Accordingly, it is becoming more and more difficult for the air conditioning unit 314 to have the function to reduce the distances of rearward displacement of the high-strength-vehicle-body-member main part 307 and the stays 309 and absorb the emergency input load 327.

Meanwhile, besides what are described above, new problems, some other problems, and the like may possibly arise in the steps to reach the present invention. These new problems, other problems, and the like will be described in examples of the present invention instead of describing them in this section. Note that if it is necessary to describe these new problems, other problems, and the like in this section, the description thereof given in the examples can be added to this section. In that case, wordings in the description can be changed to suit this section.

Means for Solving the Problems

A structure of a high-strength vehicle body member of the present invention includes: a high-strength-vehicle-body-member main part provided in a front part of a cabin of a vehicle and extending substantially in a vehicle width direction; a high-rigidity structure part provided at least to a middle portion of the high-strength-vehicle-body-member main part and including a plurality of closed cross-section portions aligned in a front-rear direction of the vehicle; a stay attached to the high-rigidity structure part and supporting the high-strength-vehicle-body-member main part in a vertical direction; a post bracket attached to the high-rigidity structure part and supporting the high-strength-vehicle-body-member main part in the vehicle front-rear direction; and a knee protector attached to the high-rigidity structure part and being capable of receiving a knee of an occupant and absorbing a knee input load thereof upon application of an emergency input load in the vehicle front-rear direction.

The structure of a high-strength vehicle body member is characterized in that, preferably, at an upper end side of the stay, an expanding cross-section portion is provided which has a horizontal cross section larger than that of a lower end side of the stay, and the expanding cross-section portion is attached to a lower surface of the high-rigidity structure part.

The structure of a high-strength vehicle body member is characterized in that, preferably, the post bracket is a reinforced post bracket having such a strength that the post bracket is bent and deformed before the high-strength-vehicle-body-member main part upon application of an emergency input load from the front in the vehicle front-rear direction, but is not bent or deformed before the high-strength-vehicle-body-member main part upon application of the knee input load by the occupant from the rear in the vehicle front-rear direction.

The structure of a high-strength vehicle body member is characterized in that, preferably, the structure further comprises a column bracket which is attached to the high-rigidity structure part and to which a steering column of the vehicle is attached, and the post bracket has a bifurcated shape including a main-part supporting portion provided between a cabin front wall of the vehicle and a vehicle-front-side portion of the high-rigidity structure part, and a column supporting portion provided between the cabin front wall and the column bracket.

The structure of a high-strength vehicle body member is characterized in that, preferably, a reinforced post bracket body having a substantially triangular shape in a side view is formed by laying and joining a base bracket between and to a vehicle-rear-side end of the main-part supporting portion of the post bracket and a lower end of the column supporting portion thereof, the base bracket being capable of being disposed in contact, from above, with a vehicle-front-side upper surface of the high-rigidity structure part and an upper surface of the column bracket, a high-strength-vehicle-body-member attachment portion through which the base bracket is attached to the high-rigidity structure part is provided between the base bracket and the vehicle-front-side upper surface of the high-rigidity structure part, and a column-bracket attachment portion through which the base bracket is attached to the column bracket is provided between the base bracket and the upper surface of the column bracket.

The structure of a high-strength vehicle body member is characterized in that, preferably, an emergency separable/escapable structure portion is provided between the high-rigidity structure part and column bracket and the reinforced post bracket body the emergency separable/escapable structure portion enabling the reinforced post bracket body to be attached to the high-rigidity structure part and the column bracket in such a manner that the reinforced post bracket body is separable and escapable therefrom upon application of an emergency input load from the front, and the emergency separable/escapable structure portion includes a slide surface portion provided to a lower surface of the base bracket, a guide surface portion provided to the vehicle-front-side upper surface of the high-rigidity structure part and to the upper surface of the column bracket and being capable of guiding sliding movement of the slide surface portion toward rear and upper sides of the vehicle, a load absorption attachment member provided to the high-strength-vehicle-body-member attachment portion and to the column-bracket attachment portion and being capable of breaking due to an emergency input load from the front of the vehicle to absorb the emergency input load, and a load absorption amount adjustment member so provided as to be selectively mountable between the slide surface portion and the guide surface portion, and being capable of breaking due to an emergency input load from the front of the vehicle to absorb the emergency input load and of setting and adjusting an amount of the absorption of the emergency input load.

The structure of a high-strength vehicle body member is characterized in that, preferably, the post bracket includes at least two vertical surface portions disposed in parallel to each other with a gap therebetween, and the two vertical surface portions are joined to each other by the base bracket.

The structure of a high-strength vehicle body member is characterized in that, preferably, an attachment structure portion through which the stay is attached to the high-rigidity structure part is provided between the high-rigidity structure part and the stay, and the attachment structure portion is an emergency separable attachment structure portion enabling the high-rigidity structure part and the stay to be separated from each other upon application of an emergency input load.

The structure of a high-strength vehicle body member is characterized in that, preferably, the attachment structure portion includes an attachment surface portion provided to the high-rigidity structure part, an attachment surface portion provided to the stay, and a fixture portion fixing both of the attachment surface portions to each other, the emergency separable attachment structure portion includes both of the attachment surface portions as emergency front-rear displaceable portions capable of being displaced substantially in the vehicle front-rear direction, and the emergency separable attachment structure portion includes the fixture portion as an emergency releasable fixture portion capable of releasing a fixed state of the high-rigidity structure part and the stay upon application of an emergency input load.

The structure of a high-strength vehicle body member is characterized in that, preferably, the emergency releasable fixture portion includes a load absorption portion capable of absorbing the emergency input load when the fixed state of the high-rigidity structure part and the stay is released.

It should be noted that each of the configurations described above is the least configuration necessary for exerting a given effect, and details of the configurations as well as configurations that are not described have degrees of freedom as a matter of course. Moreover, matters which can be figured out from the description of the configurations are within the scopes of the configurations as a matter of course even if such matters are not described particularly specifically. Furthermore, if any configuration other than those described above is added, an operation and an effect of the added configuration can be added as a matter of course.

Effects of the Invention

A structure of a high-strength vehicle body member according to the present invention includes: a high-strength-vehicle-body-member main part provided in a front part of a cabin of a vehicle and extending substantially in a vehicle width direction; a high-rigidity structure part provided at least to a middle portion of the high-strength-vehicle-body-member main part and including a plurality of closed cross-section portions aligned in a front-rear direction of the vehicle; a stay attached to the high-rigidity structure part and supporting the high-strength-vehicle-body-member main part in a vertical direction; a post bracket attached to the high-rigidity structure part and supporting the high-strength-vehicle-body-member main part in the vehicle front-rear direction; and a knee protector attached to the high-rigidity structure part and being capable of receiving a knee of an occupant and absorbing a knee input load thereof upon application of an emergency input load in the vehicle front-rear direction.

According to this configuration, the following operations and effects can be obtained. Specifically, by providing the high-rigidity structure part including the multiple closed cross-section portions at least to the middle portion of the high-strength-vehicle-body-member main part, it is possible to improve the strength and rigidity of at least the middle portion of the high-strength-vehicle-body-member main part. Accordingly, deflection and twisting (in the circumferential direction) of the high-strength-vehicle-body-member main part can be suppressed, whereby the high-strength-vehicle-body-member main part can be prevented from being displaced, bent, and so on. By attaching the stay, the post bracket, and the knee protector to the high-rigidity structure part, the attachment rigidities to these members are improved, which in turn makes it possible to improve the functions of the individual members. Particularly, the level of dependence of the knee protector on the high-strength-vehicle-body-member main part can be lowered.

The structure of a high-strength vehicle body member is characterized in that, preferably, at an upper end side of the stay, an expanding cross-section portion is provided which has a horizontal cross section larger than that of a lower end side of the stay, and the expanding cross-section portion is attached to a lower surface of the high-rigidity structure part.

According to this configuration, the following operations and effects can be obtained. Specifically, the expanding cross-section portion provided to the upper end side portion of the stay has a high section modulus, and thus deformation of the stay itself can be made small. Hence, with the expanding cross-section portion connected to the lower surface of the high-rigidity structure part, the stay can effectively suppress displacement of the high-strength-vehicle-body-member main part (high-rigidity structure part and the like) in the vehicle front-rear direction and the vertical direction. With the stay, it is possible to suppress displacement of the high-strength-vehicle-body-member main part toward the rear of the vehicle upon application of the emergency input load from the front, for example. Moreover, with the stay, it is also possible to suppress displacement of the high-strength-vehicle-body-member main part toward upper and front sides of the vehicle upon application of a knee input load to the knee protector, for example. Moreover, with the expanding cross-section portion connected to the lower surface of the high-rigidity structure part, the stay can effectively suppress twisting of the high-strength-vehicle-body-member main part (high-rigidity structure part and the like). The stay generates a reaction force against a moment generated in the high-strength-vehicle-body-member main part upon, for example, application of the knee input load to the knee protector. Such a reaction force can suppress twisting of the high-strength-vehicle-body-member main part. Accordingly, with the stay having the expanding cross-section portion, it is possible to lower a strength of the high-strength-vehicle-body-member main part which is required to achieve satisfactory performance of the knee protector. In addition, with the stay having the expanding cross-section portion, it is also possible to further lower the level of dependence of the knee protector on the high-strength-vehicle-body-member main part.

The structure of a high-strength vehicle body member is characterized in that, preferably, the post bracket is a reinforced post bracket having such a strength that the post bracket is bent and deformed before the high-strength-vehicle-body-member main part upon application of an emergency input load from the front in the vehicle front-rear direction, but is not bent or deformed before the high-strength-vehicle-body-member main part upon application of the knee input load by the occupant from the rear in the vehicle front-rear direction.

According to this configuration, the following operations and effects can be obtained. Specifically, the high-strength-vehicle-body-member main part is made resistant to bending and twisting with the help of the effect of the high-rigidity structure part that improves the rigidity and strength of the high-strength-vehicle-body-member main part, as well as the effect of the stay that suppresses displacement and twisting of the high-strength-vehicle-body-member main part. Thus, it is possible to receive the knee input load in the knee protector only by the high-strength-vehicle-body-member main part. This in turn eliminates the need for absorbing the knee input load by causing the post bracket to be bent and deformed before the high-strength-vehicle-body-member main part is bent, whereby the strength of the post bracket can be increased. With the reinforced post bracket obtained by increasing the strength of the post bracket, the reinforced post bracket is bent and deformed upon application of the emergency input load from the front of the vehicle in the vehicle front-rear direction and absorbs the load, but is not bent or deformed upon application of the knee input load by the occupant from the rear in the vehicle front-rear direction. That is, the reinforced post bracket 73 and the high-strength-vehicle-body-member main part function to share the knee input load. Thus, a structure can be obtained which is capable of suppressing and preventing both displacement of the high-strength-vehicle-body-member main part toward the rear of the vehicle upon application of the emergency input load from the front, and displacement, toward the front of the vehicle, and twisting of the high-strength-vehicle-body-member main part upon application of the knee input load. Accordingly, with the reinforced post bracket, it is possible to lower a strength of the high-strength-vehicle-body-member main part which is required to achieve satisfactory performance of the knee protector. In addition, with the reinforced post bracket, it is also possible to further lower the level of dependence of the knee protector on the high-strength-vehicle-body-member main part. Providing the post bracket as the reinforced post bracket can also increase the support rigidity of the steering column. Then, the freedom in selecting the material may be increased and so on to accordingly reduce the weights of other portions of the high-strength-vehicle-body-member main part.

The structure of a high-strength vehicle body member is characterized in that, preferably, the structure further comprises a column bracket which is attached to the high-rigidity structure part and to which a steering column of the vehicle is attached, and the post bracket has a bifurcated shape including a main-part supporting portion provided between a cabin front wall of the vehicle and a vehicle-front-side portion of the high-rigidity structure part, and a column supporting portion provided between the cabin front wall and the column bracket.

The structure of a high-strength vehicle body member is characterized in that, preferably, a reinforced post bracket body having a substantially triangular shape in a side view is formed by laying and joining a base bracket between and to a vehicle-rear-side end of the main-part supporting portion of the post bracket and a lower end of the column supporting portion thereof, the base bracket being capable of being disposed in contact, from above, with a vehicle-front-side upper surface of the high-rigidity structure part and an upper surface of the column bracket, a high-strength-vehicle-body-member attachment portion through which the base bracket is attached to the high-rigidity structure part is provided between the base bracket and the vehicle-front-side upper surface of the high-rigidity structure part, and a column-bracket attachment portion through which the base bracket is attached to the column bracket is provided between the base bracket and the upper surface of the column bracket.

According to this configuration, the following operations and effects can be obtained. Specifically, the bifurcated post bracket and the base bracket together form the reinforced post bracket body having a substantially triangular shape in the side view. In this way, the rigidity of the reinforced post bracket body can be increased. Accordingly, the post bracket or the reinforce post bracket body can be made lighter. The base bracket of the reinforced post bracket body is disposed in contact, from above, with a vehicle-front-side upper portion of the high-strength-vehicle-body-member main part as well as the upper surface of the column bracket. Then, the base bracket and the vehicle-front-side upper portion of the high-strength-vehicle-body-member main part are attached to each other by use of the high-strength-vehicle-body-member attachment portion, and the base bracket and the upper surface of the column bracket are attached to each other by use of the column-bracket attachment portion. Accordingly, as compared to a case where the post bracket is directly fixed by welding to the high-strength-vehicle-body-member main part and the column bracket, the influence of welding distortion can be reduced, thereby improving the attachment accuracy of the reinforced post bracket body.

The structure of a high-strength vehicle body member is characterized in that, preferably, an emergency separable/escapable structure portion is provided between the high-rigidity structure part and column bracket and the reinforced post bracket body the emergency separable/escapable structure portion enabling the reinforced post bracket body to be attached to the high-rigidity structure part and the column bracket in such a manner that the reinforced post bracket body is separable and escapable therefrom upon application of an emergency input load from the front, and the emergency separable/escapable structure portion includes a slide surface portion provided to a lower surface of the base bracket, a guide surface portion provided to the vehicle-front-side upper surface of the high-rigidity structure part and to the upper surface of the column bracket and being capable of guiding sliding movement of the slide surface portion toward rear and upper sides of the vehicle, a load absorption attachment member provided to the high-strength-vehicle-body-member attachment portion and to the column-bracket attachment portion and being capable of breaking due to an emergency input load from the front of the vehicle to absorb the emergency input load, and a load absorption amount adjustment member so provided as to be selectively mountable between the slide surface portion and the guide surface portion, and being capable of breaking due to an emergency input load from the front of the vehicle to absorb the emergency input load and of setting and adjusting an amount of the absorption of the emergency input load.

According to this configuration, the following operations and effects can be obtained. Upon application of the emergency input load from the front, the load absorption attachment member and the load absorption amount adjustment member break due to the emergency input load to thereby absorb the emergency input load. In this case, the amount of absorption of the emergency input load can be set and adjusted by adjusting the positions and number of selectively mountable load absorption amount adjustment members to be mounted. Due to the breaking of the load absorption attachment member and the load absorption amount adjustment member, the reinforced post bracket body is separated from the high-strength-vehicle-body-member main part and the column bracket. In the separation, the slide surface portion slides on the guide surface portion toward the rear and upper sides of the vehicle. Accordingly, the reinforced post bracket body can stably and securely escape toward the rear of the vehicle without causing influence such as displacement and bending deformation of the high-strength-vehicle-body-member main part.

The structure of a high-strength vehicle body member is characterized in that, preferably, the post bracket includes at least two vertical surface portions disposed in parallel to each other with a gap therebetween, and the two vertical surface portions are joined to each other by the base bracket.

According to this configuration, the following operations and effects can be obtained. Specifically, the post bracket includes at least two vertical surface portions disposed in parallel to each other with a gap therebetween. These two vertical surface portions are joined to each other by the base bracket. This is structurally advantageous in load absorption as compared to a typical post bracket including only one vertical surface portion. Specifically, as the two, parallel vertical surface portions hold to withstand a load and vibrations, it is possible to secure a rigidity in the vehicle front-rear direction required in a normal situation (non-deformation situation) as well as a lateral rigidity for suppressing vibrations in the vehicle width direction. Moreover, the two, parallel vertical surface portions are crushed (bending deformation or plastic deformation) upon application of the emergency input load. Thus, it is possible to obtain deformation characteristics (shape) necessary in an emergency (deformation situation) against the emergency input load from the front of the vehicle. Furthermore, even when the input direction of the emergency input load is off, the two, parallel vertical surface portions are deformed in a way to fall laterally. Thus, it is possible to stably secure deformation characteristics (shape) necessary in an emergency (deformation situation). In other words, a load input in an oblique direction can be well handled (a constant deformation stroke can be obtained). Accordingly, there is no need to purposely increase the thickness of the post bracket or lower the strength of the post bracket as a whole by providing a frangible portion such as a notch to the post bracket.

The structure of a high-strength vehicle body member is characterized in that, preferably, an attachment structure portion through which the stay is attached to the high-rigidity structure part is provided between the high-rigidity structure part and the stay, and the attachment structure portion is an emergency separable attachment structure portion enabling the high-rigidity structure part and the stay to be separated from each other upon application of an emergency input load.

According to this configuration, the following operations and effects can be obtained. Specifically, the high-strength-vehicle-body-member main part (high-rigidity structure part) and the stay which are formed as members independent of each other are attached and integrated together at the attachment structure portion. The high-strength vehicle body member is placed in the front part of the cabin. In the high-strength vehicle body member placed in the front part of the cabin, the high-strength-vehicle-body-member main part extends substantially in the vehicle width direction. Moreover, the high-strength-vehicle-body-member main part (high-rigidity structure part) is supported on the cabin floor by means of the stay. Furthermore, the high-strength-vehicle-body-member main part (high-rigidity structure part) is supported on the cabin front wall by means of the post bracket. Upon application of the emergency input load, it is possible to separate the high-strength-vehicle-body-member main part (high-rigidity structure part) and the stay from each other by the emergency separable attachment structure portion provided as the attachment structure portion of the high-strength-vehicle-body-member main part (high-rigidity structure part) and the stay. As described above, in an emergency, the high-strength-vehicle-body-member main part (high-rigidity structure part) can be separated from the stay or vice versa and displaced by a corresponding necessary distance. Thereby, it is possible to suppress deformation of the high-strength-vehicle-body-member main part and the stay. Meanwhile, it is also possible to increase the strengths of the high-strength-vehicle-body-member main part and the stay and to do the like as needed.

The structure of a high-strength vehicle body member is characterized in that, preferably, the attachment structure portion includes an attachment surface portion provided to the high-rigidity structure part, an attachment surface portion provided to the stay, and a fixture portion fixing both of the attachment surface portions to each other, the emergency separable attachment structure portion includes both of the attachment surface portions as emergency front-rear displaceable portions capable of being displaced substantially in the vehicle front-rear direction, and the emergency separable attachment structure portion includes the fixture portion as an emergency releasable fixture portion capable of releasing a fixed state of the high-rigidity structure part and the stay upon application of an emergency input load.

According to this configuration, the following operations and effects can be obtained. Specifically, the attachment structure portion (emergency separable attachment structure portion) attaches together a lower portion of the high-strength-vehicle-body-member main part (high-rigidity structure part) and the upper end of the stay by bringing the attachment surface portions (emergency front-rear displaceable portions) into contact with each other and fixing them to each other by the fixture portion (emergency releasable fixture portion). Then, when the emergency input load is applied to the stay and the like, the emergency releasable fixture portion of the emergency separable attachment structure portion releases the fixed state of the high-strength-vehicle-body-member main part (high-rigidity structure part) and the stay. The emergency front-rear displaceable portions function to guide the high-strength-vehicle-body-member main part and the stay in such a manner that the high-strength-vehicle-body-member main part and the stay slide relative to each other substantially in the vehicle front-rear direction.

The structure of a high-strength vehicle body member is characterized in that, preferably, the emergency releasable fixture portion includes a load absorption portion capable of absorbing the emergency input load when the fixed state of the high-rigidity structure part and the stay is released.

According to this configuration, the following operations and effects can be obtained. Specifically, when the high-strength-vehicle-body-member main part (high-rigidity structure part) and the stay are separated from each other, loads such as the emergency input load and a moment can be absorbed by the load absorption portion provided to the emergency releasable fixture portion. With this, it is possible to effectively prevent deformation of the high-strength-vehicle-body-member main part and the stay and the like attributable to the emergency input load, a moment, and the like without having to increase the strengths of the high-strength-vehicle-body-member main part and the stay. It is also possible to reduce the distances of displacement of the high-strength-vehicle-body-member main part and the stay, and the like.

MODES FOR CARRYING OUT THE INVENTION

The present invention mainly aims to effectively improve the strength and rigidity of a main part of a high-strength vehicle body member.

Hereinbelow, examples embodying the present invention will be described along with the drawings.

The following examples are closely connected to the background art, the problems to be solved by the invention, and the like that are mentioned above. Thus, description as well as that description with necessary changes may be borrowed from one another whenever deemed necessary.

EXAMPLE 1

Figure 1:
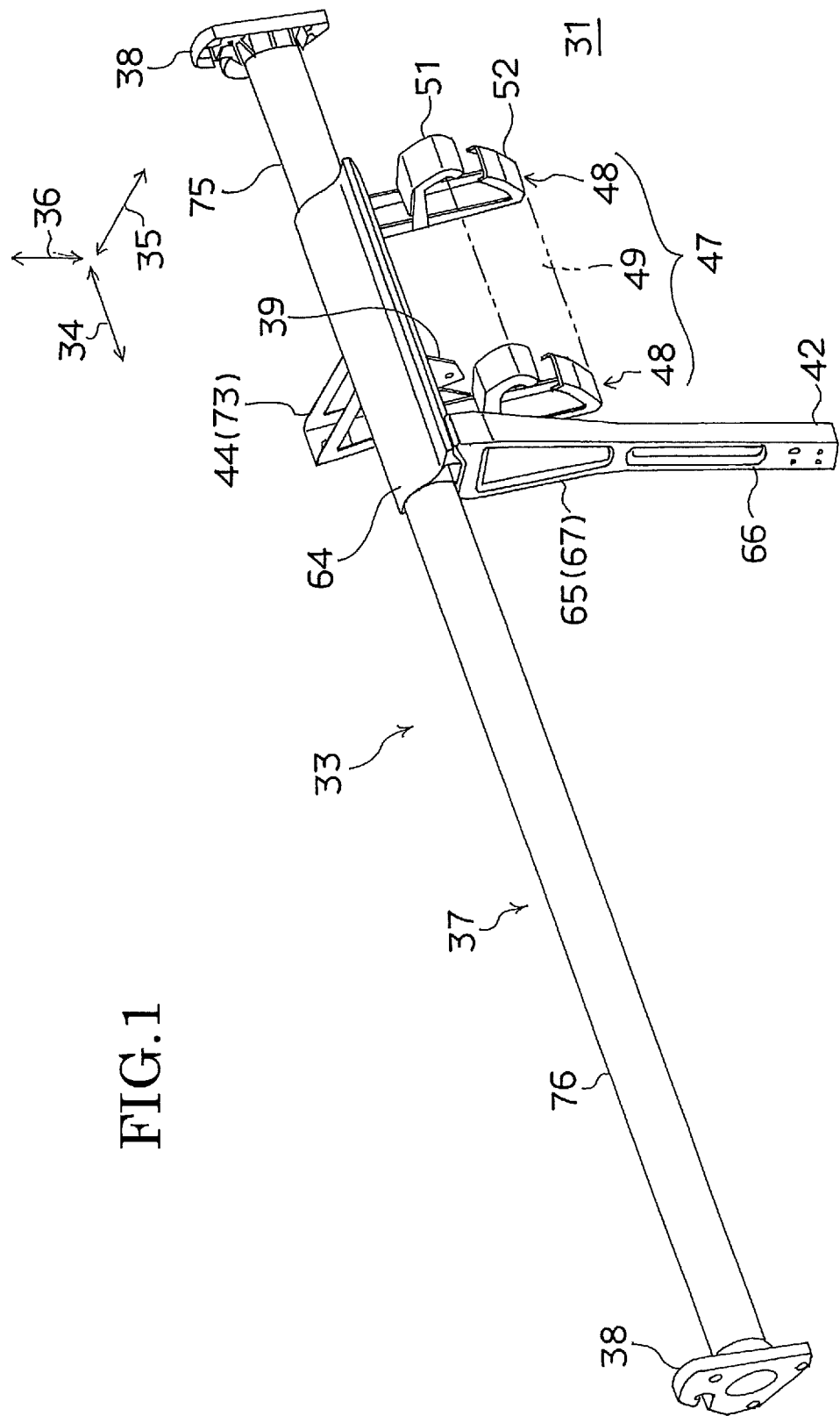
FIG. 1 is a perspective view of a structure of a high-strength vehicle body member according to Example 1 of the present invention.
Figure 2:
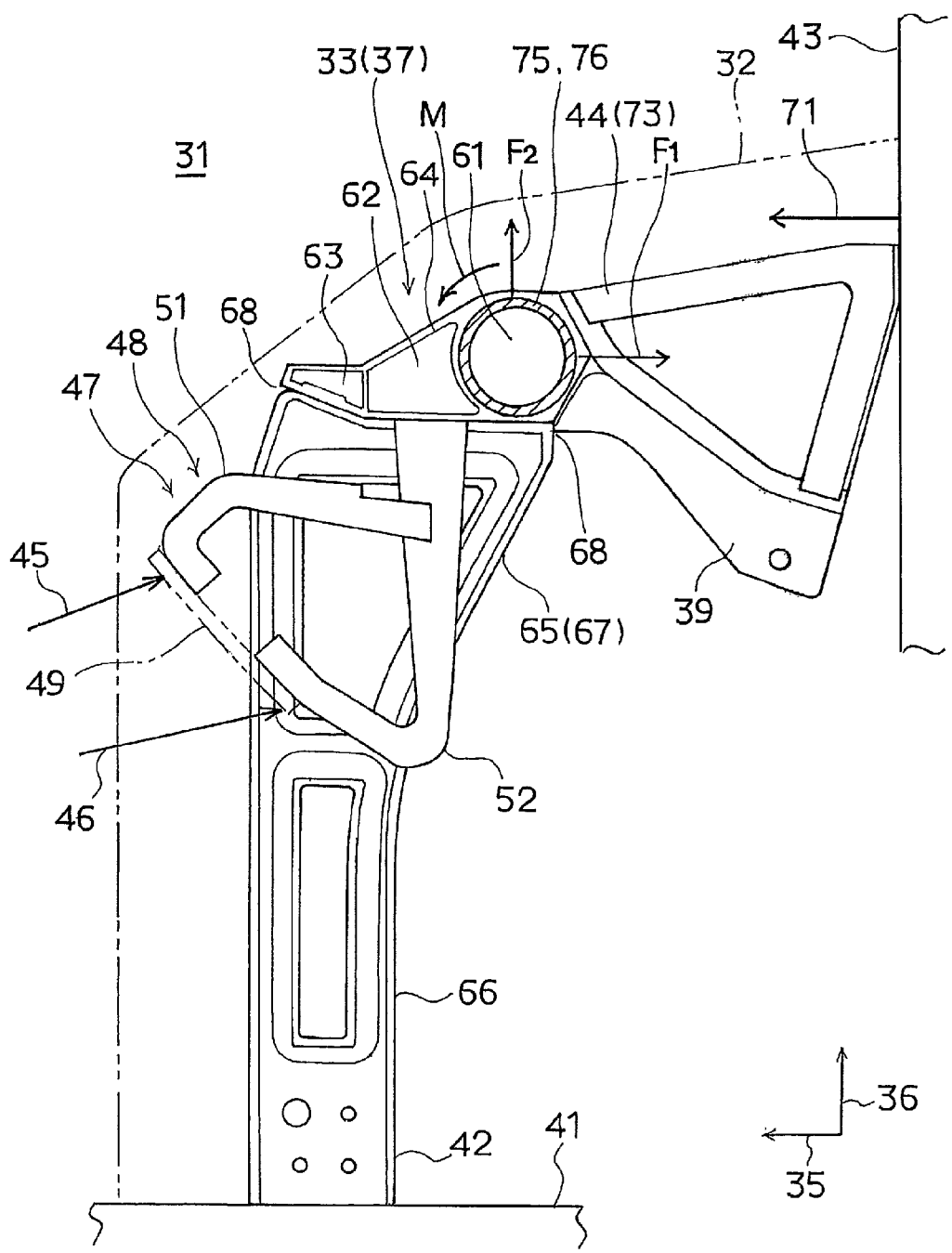
FIG. 2 is a side view of the structure of the high-strength vehicle body member in FIG. 1.
Figure 3:
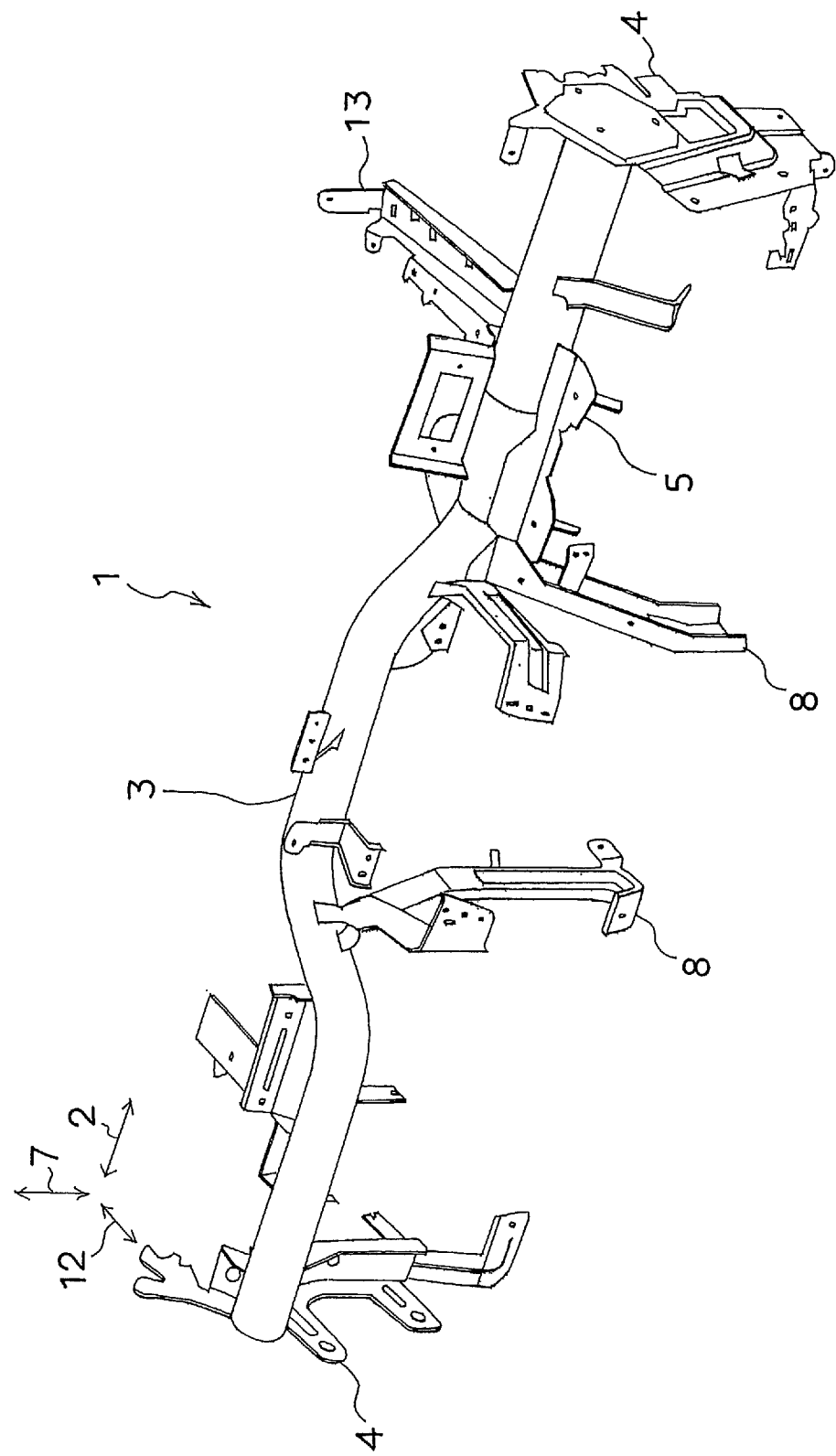
FIG. 3 is a perspective view of a structure of a high-strength vehicle body member according to a conventional example.
Figure 4:
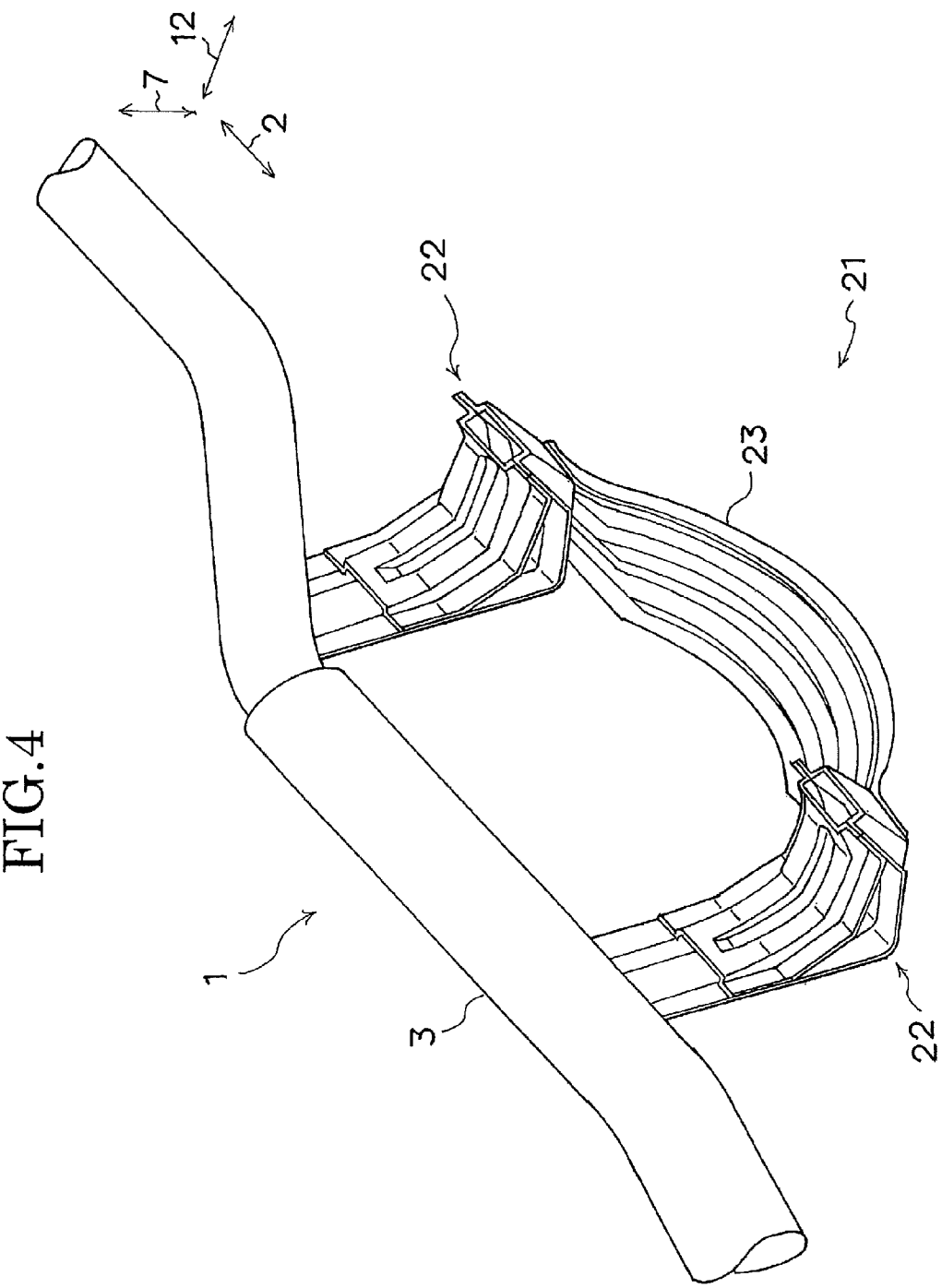
FIG. 4 is a perspective view showing a knee protector according to the conventional example.
Figure 5:
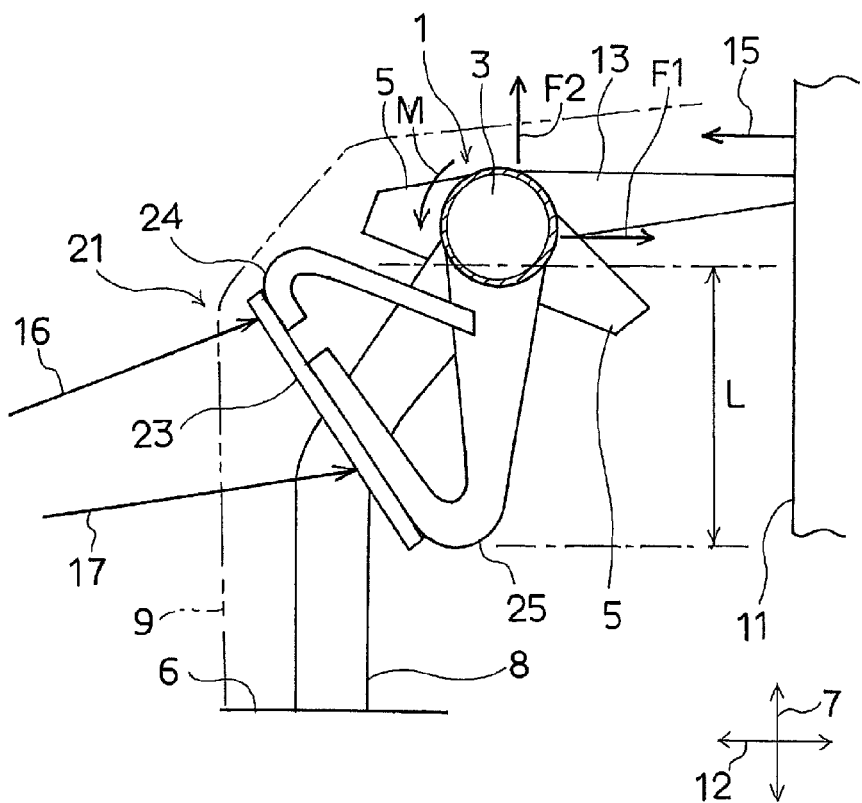
FIG. 5 is a side view for describing a problem in the conventional example.
Figure 6:
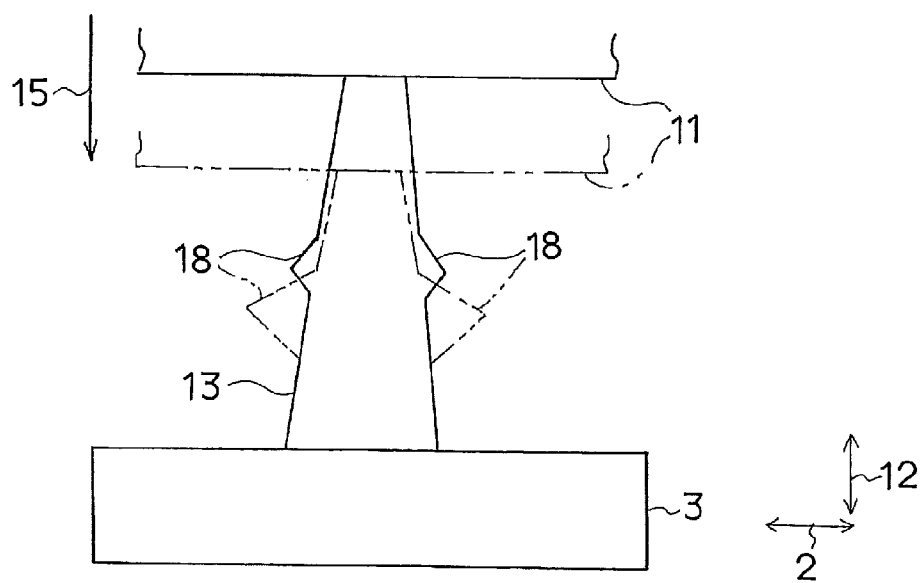
FIG. 6 is a plan view for describing another problem in the conventional example.

FIGS. 1 and 2 are diagrams showing a configuration in this example.

First of all, a basic configuration will be described.

Vehicles such as automobiles are provided with a resin instrument panel 32 (see FIG. 2) in a front part of a cabin 31. Behind the instrument panel 32, a metal, high-strength vehicle body member 33 is provided.

Here, reference numeral 34 denotes the vehicle width direction, reference numeral 35 denotes the vehicle front-rear direction, and reference numeral 36 denotes the vertical direction. The high-strength vehicle body member 33 includes a high-strength-vehicle-body-member main part 37 which extends substantially in the vehicle width direction 34.

The high-strength-vehicle-body-member main part 37 provided in a front part of the cabin 31 includes, at its both ends, side brackets 38 for attachment to left and right vehicle body panels (side panels; not illustrated), respectively. These side brackets 38 are made of metal and fixed by welding to the high-strength-vehicle-body-member main part 37.

The high-strength-vehicle-body-member main part 37 is provided mainly for supporting a steering column (not illustrated). For this reason, at a middle portion in the vehicle width direction 34, the high-strength-vehicle-body-member main part 37 includes a column bracket 39 for attachment of the steering column. The column bracket 39 is used for attaching a vehicle-front-side portion of the steering column. The column bracket 39 is made of metal and fixed to the high-strength-vehicle-body-member main part 37 (high-rigidity structure part 64 described later).

Also, at the middle portion in the vehicle width direction 34, the high-strength-vehicle-body-member main part 37 includes a stay 42 that fixes a lower portion of the high-strength-vehicle-body-member main part 37 to a cabin floor 41 (floor panel; see FIG. 2) to thereby support the high-strength-vehicle-body-member main part 37 in the vertical direction 36. This stay 42 is made of metal.

Also, at the middle portion in the vehicle width direction 34, the high-strength-vehicle-body-member main part 37 includes a post bracket 44 that fixes the high-strength-vehicle-body-member main part 37 to a cabin front wall 43 (dash panel; see FIG. 2) to thereby support the high-strength-vehicle-body-member main part 37 in the vehicle front-rear direction 35. This post bracket 44 is made of metal and fixed to the high-strength-vehicle-body-member main part 37 (high-rigidity structure part 64 described later).

Further, if necessary, at the middle portion in the vehicle width direction 34, the high-strength-vehicle-body-member main part 37 includes a knee protector 47 capable of receiving the knees of the occupant in an emergency and absorbing knee input loads 45 and 46. This knee protector 47 includes knee protection brackets 48 which are attached to a lower portion of the high-strength-vehicle-body-member main part 37 (high-rigidity structure part 64 described later), and a knee receiving member 49 which directly receives the knees of the occupant. The knee protection brackets 48 are made of metal. The knee receiving member 49 is made of metal as well.

In this example, each knee protection bracket 48 is made suitable for occupants of different physical sizes by including different upper and lower brackets, namely, an upper knee protection bracket 51 capable of receiving mainly the knee of an occupant of an average physical size and absorbing the knee input load 45, and a lower knee protection bracket 52 capable of receiving mainly the knee of an occupant of a small physical size and absorbing the knee input load 46.

Here, each upper knee protection bracket 51 has a substantially sideways "J" shape in the side view. In addition, each lower knee protection bracket 52 has a substantially "V" shape in the side view. As shown in the drawings, the upper knee protection bracket 51 is fixed by welding to a middle portion of a vertically extending portion of the lower knee protection bracket 52. In addition, the lower knee protection bracket 52 is fixed to the high-strength-vehicle-body-member main part 37 (high-rigidity structure part 64 described later) at the upper end of the vertically extending portion thereof.

The knee protection brackets 48 are provided as paired left and right brackets in a way to substantially correspond to both knees of the occupant, respectively. The knee receiving member 49 is laid between end portions of the paired left and right knee protection brackets 48 (cabin-inner-side end surfaces of the upper knee protection brackets 51 and the lower knee protection brackets 52). The knee receiving member 49 is placed behind the instrument panel 32.

In addition to the basic configuration given above, a structure of the high-strength vehicle body member in this example has the following configurations.

(a) The high-rigidity structure part 64 including multiple closed cross-section portions 61 to 63 is provided at least to the middle portion of the high-strength-vehicle-body-member main part 37. The stay 42, the post bracket 44, and the knee protector 47 are attached (collectively) to the high-rigidity structure part 64.

(b) To an upper end side portion 65 of the stay 42, an expanding cross-section portion 67 is provided which has a larger cross section than a lower end side portion 66. This expanding cross-section portion 67 is connected to a lower surface of the high-rigidity structure part 64 (connecting portion 68).

(c) The post bracket 44 is a reinforced post bracket 73 having such a strength that it is bent and deformed before the high-strength-vehicle-body-member main part 37 upon application of an emergency input load 71 from the front in the vehicle front-rear direction 35, but is not bent or deformed before the high-strength-vehicle-body-member main part 37 upon application of the knee input loads 45 and 46 by the occupant from the rear in the vehicle front-rear direction 35.

Details of the above configurations are as follows.

The high-rigidity structure part 64 including the multiple closed cross-section portions 61 to 63 may be provided to the high-strength-vehicle-body-member main part 37 either entirely or partially. In FIG. 1, the high-rigidity structure part 64 is provided partially. To be specific, assuming that the high-strength-vehicle-body-member main part 37 is divided into three sections of a driver-seat side portion, a passenger-seat side portion, and a center portion, the high-rigidity structure part 64 is partially provided to the driver-seat side portion at a position corresponding to the inner half thereof. The outer half of the driver-seat side portion as well as the passenger-seat side portion and the center portion are formed of respective different pipe members 75 and 76 having circular cross sections with the same diameter. The pipe members 75 and 76 (inner ends thereof) are each fixed to the high-rigidity structure part 64 by press fitting or the like. Meanwhile, the aforementioned side brackets 38 are attached to the outer ends of the pipe members 75 and 76, respectively. In FIG. 1, the high-strength-vehicle-body-member main part 37 is one for a right-hand drive vehicle.

The multiple closed cross-section portions 61 to 63 are tubular portions each extending in the vehicle width direction 34 while maintaining the size and shape of its cross section. In this example, the high-rigidity structure part 64 has a triple-continuous-tube shape in which the three tubular closed cross-section portions 61 to 63 are aligned next to each other in the vehicle front-rear direction 35. The number of the multiple closed cross-section portions 61 to 63 may be any number as long as not smaller than two, but three is most suitable in terms of structure and function. Also, in order to increase the strength in the vehicle front-rear direction 35, the multiple closed cross-section portions 61 to 63 are most suitably arranged to be aligned next to each other in the vehicle front-rear direction 35. By such an arrangement, the high-rigidity structure part 64 is longer than typical ones in the vehicle front-rear direction 35. Note that the arrangement of the multiple closed cross-section portions 61 to 63 is not limited to this arrangement.

The multiple closed cross-section portions 61 to 63 are formed to have mutually different sizes; that is, the one closest to the front of the vehicle (closed cross-section portion 61) is the largest, the one at the middle (closed cross-section portion 62) is smaller than the closed cross-section portion 61, and the one closest to the rear of the vehicle (closed cross-section portion 63) is the smallest. Due to such size differences, the high-rigidity structure part 64 has a wedge shape in the side view. The closed cross-section portion 61 closest to the front of the vehicle has such a size (inside diameter) and a shape (circular shape) that the pipe members 75 and 76 can be press fitted thereto, and therefore serves as a pipe member connecting portion.

The high-rigidity structure part 64 as above can be formed through extrusion of a light alloy, for example.

The column bracket 39 is attached to a vehicle-front-side lower portion of a substantially center portion, in the vehicle width direction 34, of the high-rigidity structure part 64. Moreover, the stay 42 is attached to a cabin-inner-side lower surface of the high-rigidity structure part 64. The post bracket 44 is attached to a vehicle-front-side upper portion of the substantially center portion, in the vehicle width direction 34, of the high-rigidity structure part 64, as well as to an upper side of the column bracket 39. The paired knee protection brackets 48 of the knee protector 47 are attached to a lower surface of the high-rigidity structure part 64 at positions near both ends thereof in the vehicle width direction 34, respectively.

Specifically, the high-rigidity structure part 64 has: at its vehicle-front-side lower portion, a column bracket attachment surface which faces downward and to which the column bracket 39 can be attached; at its vehicle-front-side upper portion, a post bracket attachment surface which faces upward and to which the post bracket 44 can be attached; and at its almost entire lower surface, a horizontal attachment surface to which the stay 42 and the knee protection brackets 48 can be attached. Moreover, on the cabin inner side of the horizontal attachment surface, a column attachment surface is provided for direct attachment of a cabin-inner-side portion of the steering column. A column attachment screw hole portion is formed integrally in this column attachment surface.

The stay 42 is disposed immediately below (in the vertical direction 36) the high-rigidity structure part 64. The stay 42 has a square U cross-sectional shape in the vehicle width direction 34, and is formed of a metal plate extending substantially in the vertical direction. When necessary, the upper end side portion 65 and the lower end side portion 66 of the stay 42 may include portions in a reinforcing form obtained by embossing, or the like portions.

The expanding cross-section portion 67 of the upper end side portion 65 of the stay 42 has a gradually expanding shape in which its vehicle-front-side portion expands as it extends upward. The upper end of the expanding cross-section portion 67 has a length in the vehicle front-rear direction 35 and a (bent) shape that are substantially the same as those of the horizontal surface and the column attachment surface so that the upper end can be in contact with and fixed to the entire lower surface of the high-rigidity structure part 64 in the vehicle front-rear direction 35.

The expanding cross-section portion 67 and the connecting portion 68 at the lower surface of the high-rigidity structure part 64 may be joined by welding if they are made of the same material. If made of different materials, the expanding cross-section portion 67 and the connecting portion 68 may be mechanically joined, bonded by use of adhesive, or joined in the like fashion. Also, the connecting portion 68 may be a portion connecting entirely (entirely connecting portion) or partly (partially connecting portion).

It is possible for the post bracket 44 to serve as a reinforced post bracket 73 by increasing the thickness thereof or changing the material thereof to a high-strength material, for example. In this example, the post bracket 44 is formed as an independent reinforced structure having a triangular (closed loop) shape in the side view to serve as the reinforced post bracket 73 obtained by structural reinforcement. In this case, the reinforced post bracket 73 having that triangular shape in the side view is disposed in contact with an upper surface of the column bracket 39 and the post bracket attachment surface facing upward and provided to the vehicle-front-side upper portion of the high-rigidity structure part 64, and also is fixed thereto with fixing members.

Next, operations of this example will be described.

The high-strength-vehicle-body-member main part 37 functions mainly to support the steering column (not illustrated) through the column bracket 39.

The stay 42 provided to the middle portion, in the vehicle width direction 34, of the high-strength-vehicle-body-member main part 37 (high-rigidity structure part 64) functions to fix the lower portion of the high-strength-vehicle-body-member main part 37 (high-rigidity structure part 64) to the cabin floor 41 (floor panel) to support the high-strength-vehicle-body-member main part 37 mainly in the vertical direction 36. By the stay 42, it is possible to suppress vibrations of the steering column and the high-strength-vehicle-body-member main part 37 in the vertical direction 36, and the like.

The post bracket 44 provided to the middle portion, in the vehicle width direction 34, of the high-strength-vehicle-body-member main part 37 (high-rigidity structure part 64) functions to fix the vehicle front-side portion of the high-strength-vehicle-body-member main part 37 (high-rigidity structure part 64) to the cabin front wall 43 (dash panel) to support the high-strength-vehicle-body-member main part 37 mainly in the vehicle front-rear direction 35.

The knee protector 47 provided to the middle portion, in the vehicle width direction 34, of the high-strength-vehicle-body-member main part 37 (high-rigidity structure part 64) functions to absorb the knee input loads 45 and 46 in an emergency by receiving the knees of the occupant via the knee receiving member 49 and allowing the knee protection brackets 48 to be bent and deformed (crushed).

Specifically, the knee protector 47 functions such that mainly the upper knee protection brackets 51 are bent and deformed (crushed) to absorb the knee input load 45 from an occupant of an average physical size, whereas mainly the lower knee protection brackets 52 are bent and deformed (crushed) to absorb the knee input load 46 from an occupant of a small physical size.

With this, it is possible to prevent the occupant from being thrown out of the vehicle and the like accidents, for example.

According to this example, the following operations and effects can be obtained.

(a) The following operations and effects can be obtained by the structure including: the high-strength-vehicle-body-member main part 37 provided in the front part of the cabin 31 of the vehicle and extending substantially in the vehicle width direction; the high-rigidity structure part 64 provided at least to the middle portion of the high-strength-vehicle-body-member main part 37 and including the multiple closed cross-section portions 61 to 63 aligned in the vehicle front-rear direction; the stay 42 attached to the high-rigidity structure part 64 and supporting the high-strength-vehicle-body-member main part 37 in the vertical direction; the post bracket 44 attached to the high-rigidity structure part 64 and supporting the high-strength-vehicle-body-member main part 37 in the vehicle front-rear direction; and the knee protector 47 attached to the high-rigidity structure part 64, and capable of receiving the knees of the occupant and absorbing the knee input load thereof upon application of an emergency input load in the vehicle front-rear direction.

Specifically, the high-strength-vehicle-body-member main part 37 has such rigidity as to be able to mainly support the steering column, as mentioned above. The stay 42 provided to the middle portion, in the vehicle width direction 34, of the high-strength-vehicle-body-member main part 37 (high-rigidity structure part 64) makes it possible to support the lower portion of the high-strength-vehicle-body-member main part 37 in the vertical direction 36. Moreover, the post bracket 44 provided to the middle portion, in the vehicle width direction 34, of the high-strength-vehicle-body-member main part 37 (high-rigidity structure part 64) makes it possible to support the vehicle-front-side portion of the high-strength-vehicle-body-member main part 37 in the vehicle front-rear direction 35. Furthermore, the knee protector 47 provided to the middle portion, in the vehicle width direction 34, of the high-strength-vehicle-body-member main part 37 (high-rigidity structure part 64) makes it possible to receive and absorb the knee input loads 45 and 46 from the occupant in an emergency.

By providing the high-rigidity structure part 64 including the multiple closed cross-section portions 61 to 63 at least to the middle portion of the high-strength-vehicle-body-member main part 37, it is possible to improve the strength and rigidity of at least the high-strength-vehicle-body-member main part 37. Accordingly, deflection and twisting (in the circumferential direction) of the high-strength-vehicle-body-member main part 37 can be suppressed, whereby the high-strength-vehicle-body-member main part 37 can be prevented from being displaced, bent, and so on.

By attaching the stay 42, the post bracket 44, and the knee protector 47 to the high-rigidity structure part 64, the attachment rigidities to these members are improved, which in turn makes it possible to improve the functions of the individual members. Particularly, the level of dependence of the knee protector 47 on the high-strength-vehicle-body-member main part 37 can be lowered.

(b) Further, the following operations and effects can be obtained by providing, to the upper end side portion 65 of the stay 42, the expanding cross-section portion 67 which has a larger cross section than the lower end side portion 66, and by attaching the expanding cross-section portion 67 to the lower surface of the high-rigidity structure part 64.

Specifically, the expanding cross-section portion 67 provided to the upper end side portion 65 of the stay 42 has a high section modulus, and thus deformation of the stay 42 can be made small.

Hence, with the expanding cross-section portion 67 connected to the lower surface of the high-rigidity structure part 64, the stay 42 can effectively suppress displacement of the high-strength-vehicle-body-member main part 37 (high-rigidity structure part 64 and the like) in the vehicle front-rear direction 35 and the vertical direction 36.

With the stay 42, it is possible to suppress rearward displacement of the high-strength-vehicle-body-member main part 37 upon application of the emergency input load 71 from the front of the vehicle, for example. Moreover, with the stay 42, it is also possible to suppress displacement of the high-strength-vehicle-body-member main part 37 toward upper and front sides of the vehicle upon application of the knee input loads 45 and 46 to the knee protector 47 (see the loads F1 and F2 and FIG. 2), for example.

Moreover, with the expanding cross-section portion 67 connected to the lower surface of the high-rigidity structure part 64, the stay 42 can effectively suppress twisting of the high-strength-vehicle-body-member main part 37 (high-rigidity structure part 64). The stay 42 generates a reaction force against the moment M generated in the high-strength-vehicle-body-member main part 37 upon, for example, application of the knee input loads 45 and 46 to the knee protector 47. Such a reaction force can suppress twisting of the high-strength-vehicle-body-member main part 37 (high-rigidity structure part 64).

Accordingly, with the stay 42 having the expanding cross-section portion 67, it is possible to lower a strength of the high-strength-vehicle-body-member main part 37 which is required to achieve satisfactory performance of the knee protector 47. In addition, with the stay 42 having the expanding cross-section portion 67, it is also possible to further lower the level of dependence of the knee protector 47 on the high-strength-vehicle-body-member main part 37.

(c) Furthermore, the following operations and effects can be obtained by providing the post bracket 44 as the reinforced post bracket 73 having such a strength that it is bent and deformed before the high-strength-vehicle-body-member main part 37 upon application of the emergency input load 71 from the front in the vehicle front-rear direction 35, but is not bent or deformed before the high-strength-vehicle-body-member main part 37 upon application of the knee input loads 45 and 46 by the occupant from the rear in the vehicle front-rear direction 35.

Specifically, the high-strength-vehicle-body-member main part 37 is made resistant to bending and twisting with the help of the effect of the high-rigidity structure part 64 that improves the rigidity and strength of the high-strength-vehicle-body-member main part 37, as well as the effect of the stay that suppresses displacement and twisting of the high-strength-vehicle-body-member main part 37. Thus, it is possible to receive the knee input loads 45 and 46 in the knee protector 47 only by the high-strength-vehicle-body-member main part 37. This in turn eliminates the need for absorbing the knee input loads 45 and 46 by causing the post bracket 44 to be bent and deformed before the high-strength-vehicle-body-member main part 37 is bent, whereby the strength of the post bracket 44 can be increased.

With the reinforced post bracket 73 obtained by increasing the strength of the post bracket 44, the reinforced post bracket 73 is bent and deformed upon application of the emergency input load 71 from the front in the vehicle front-rear direction 35 and absorbs the load, but is not bent or deformed upon application of the knee input loads 45 and 46 by the occupant from the rear in the vehicle front-rear direction 35. That is, the reinforced post bracket 73 and the high-strength-vehicle-body-member main part 37 function to share the knee input loads 45 and 46.

Thus, a structure can be obtained which is capable of suppressing and preventing both displacement of the high-strength-vehicle-body-member main part 37 toward the rear of the vehicle upon application of the emergency input load 71 from the front, and displacement, toward the front of the vehicle, and twisting of the high-strength-vehicle-body-member main part 37 upon application of the knee input loads 45 and 46.

Accordingly, with the reinforced post bracket 73, it is possible to lower a strength of the high-strength-vehicle-body-member main part 37 which is required to achieve satisfactory performance of the knee protector 47. In addition, with the reinforced post bracket 73, it is possible to further lower the level of dependence of the knee protector 47 on the high-strength-vehicle-body-member main part 37.

Providing the reinforced post bracket 73 can also increase the support rigidity of the steering column. Then, for example, the freedom in selecting the material may be increased and so on to accordingly reduce the weights of other portions of the high-strength-vehicle-body-member main part 37.

EXAMPLE 2

This example mainly aims to improve the overall performance of the post bracket, and to secure the deformation stroke even when the input direction of an emergency input load is off.

Hereinbelow, an example embodying the present invention will be described along with the drawings.

The following example is closely connected to the background art, the problems to be solved by the invention, and the like that are mentioned above. Thus, description as well as that description with necessary changes may be borrowed from one another whenever deemed necessary.

FIGS. 7 to 21 show this example and modifications thereof.

First of all, a basic configuration will be described.

Here, reference numeral 241 denotes the vehicle width direction, reference numeral 242 denotes the vehicle front-rear direction, and reference numeral 243 denotes the vertical direction.

Figure 7:
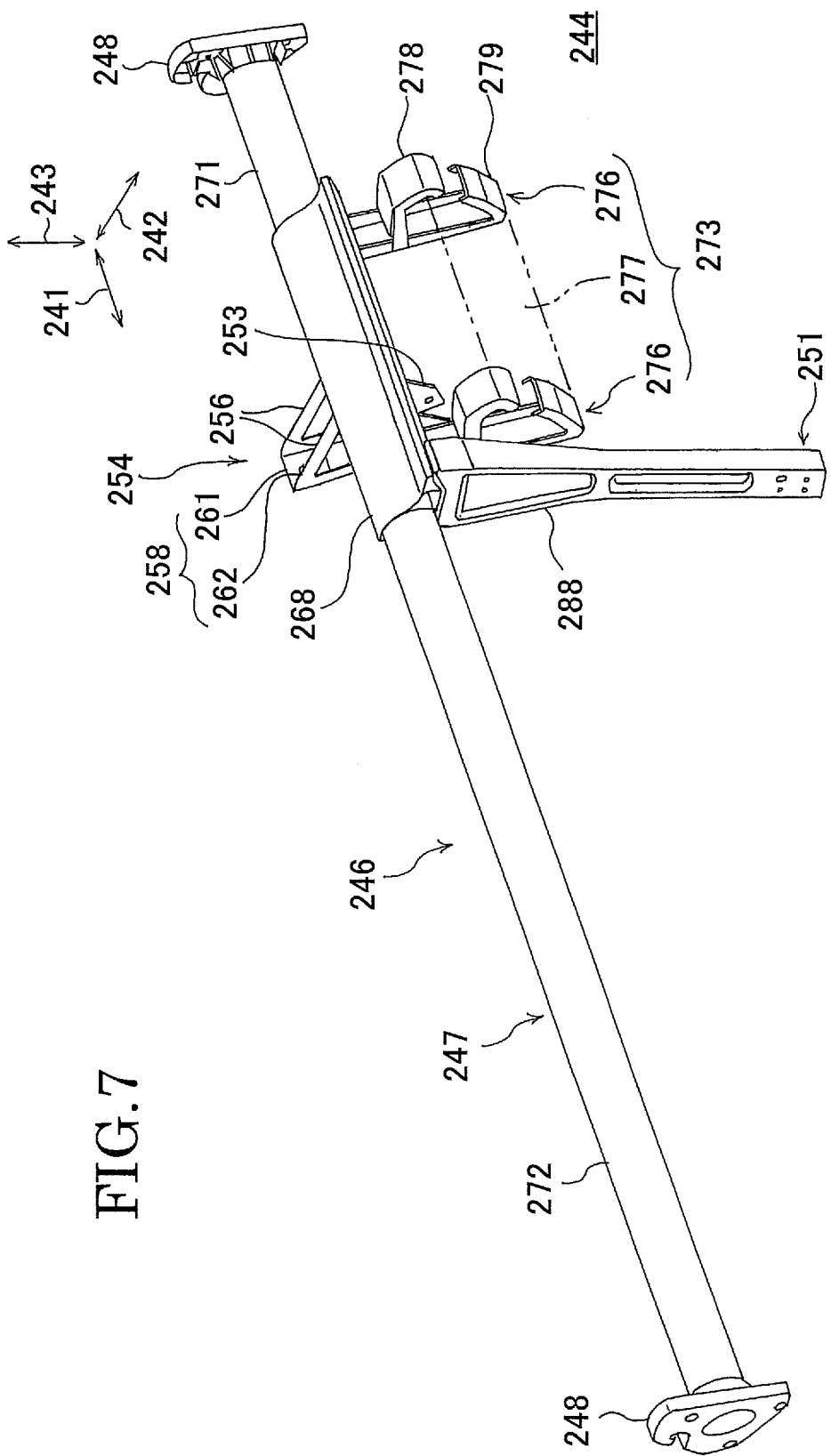
FIG. 7 is a perspective view of a structure of a high-strength vehicle body member according to Example 2 of the present invention.
Figure 8:
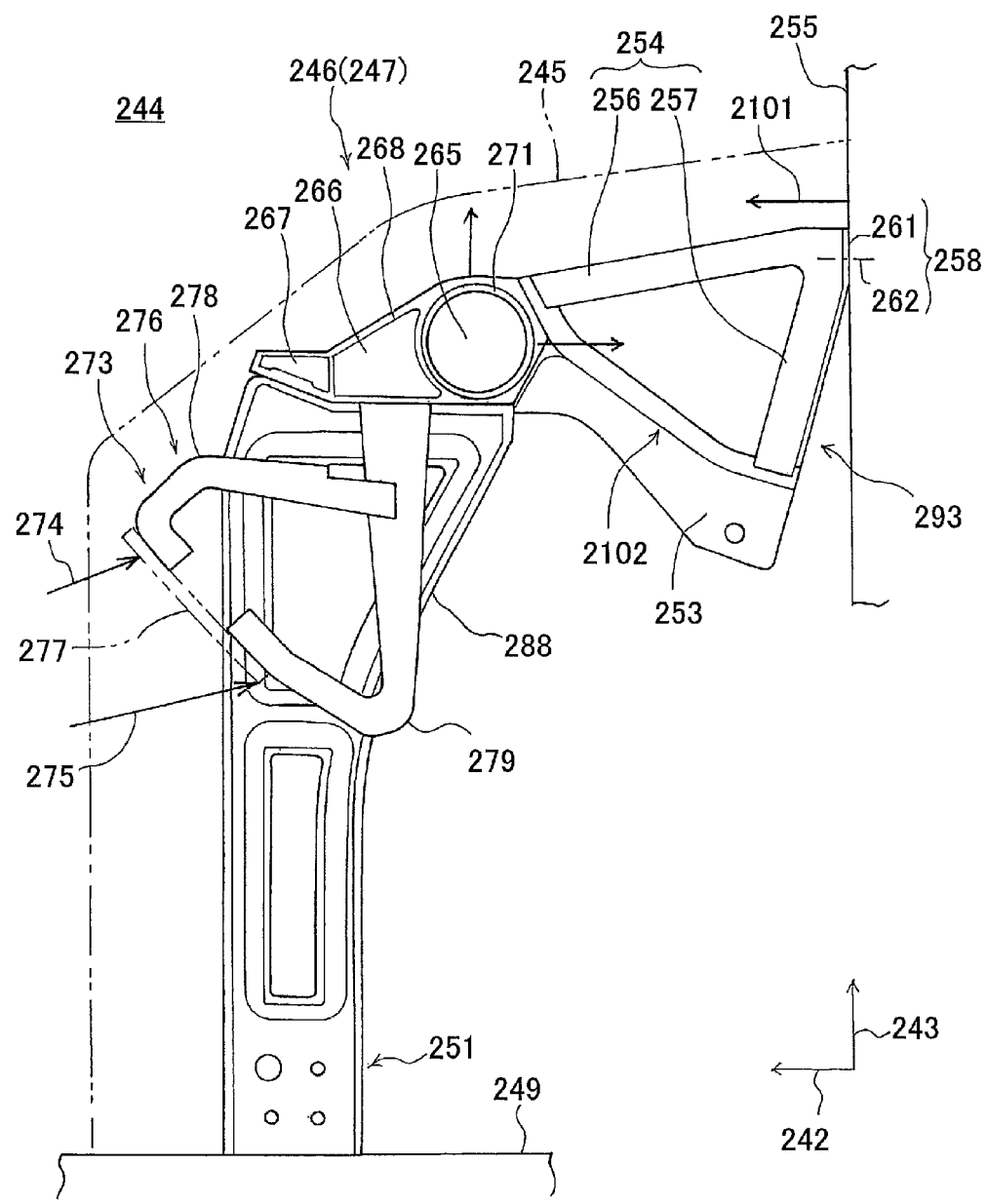
FIG. 8 is a side view of the structure of the high-strength vehicle body member in FIG. 7.

As shown in FIG. 7 and FIG. 8, vehicles such as automobiles are provided with a resin instrument panel 245 (see FIG. 8) in a front part of a cabin 244. Behind the instrument panel 245, a metal, high-strength vehicle body member 246 is provided.

The high-strength vehicle body member 246 provided in the front part of the cabin 244 includes a high-strength-vehicle-body-member main part 247 which extends substantially in the vehicle width direction 241.

This high-strength-vehicle-body-member main part 247 includes, at its both ends, side brackets 248 which are attachable to left and right vehicle body panels (side panels; not illustrated). These side brackets 248 are integrally fixed (welded, press-fitted, bonded, bolted, etc.) to the high-strength-vehicle-body-member main part 247.

In addition, at a middle portion in the vehicle width direction 241, the high-strength-vehicle-body-member main part 247 includes a stay 251 that fixes a lower portion of the high-strength-vehicle-body-member main part 247 to a cabin floor 249 (floor panel; see FIG. 2) to thereby support the high-strength-vehicle-body-member main part 247 in the vertical direction 243. This stay 251 extends substantially in the vertical direction 243. The upper end of the stay 251 is fixed (welded, press-fitted, bonded, bolted, etc.) to the high-strength-vehicle-body-member main part 247 (high-rigidity structure part 268 described later).

Moreover, at the driver-seat side of the middle portion in the vehicle width direction 241, the high-strength-vehicle-body-member main part 247 includes at least a column bracket 253 through which a steering column (not illustrated) can be attached to a lower portion of the high-strength-vehicle-body-member main part 247. In this example, the column bracket 253 is used for attaching a vehicle-front-side portion of the steering column.

Furthermore, the high-strength-vehicle-body-member main part 247 includes a post bracket 254 capable of supporting a vehicle-front-side portion of the high-strength-vehicle-body-member main part 247.

As shown in FIG. 8, this post bracket 254 has a substantially bifurcated shape in the side view including: a main-part supporting portion 256 provided between a cabin front wall 255 (dash panel) and the vehicle-front-side portion of the high-strength-vehicle-body-member main part 247 (high-rigidity structure part 268 described later); and a column supporting portion 257 provided between the cabin front wall 255 (dash panel) and (a front end portion of) the column bracket 253 at the vehicle front side.

Figure 9:
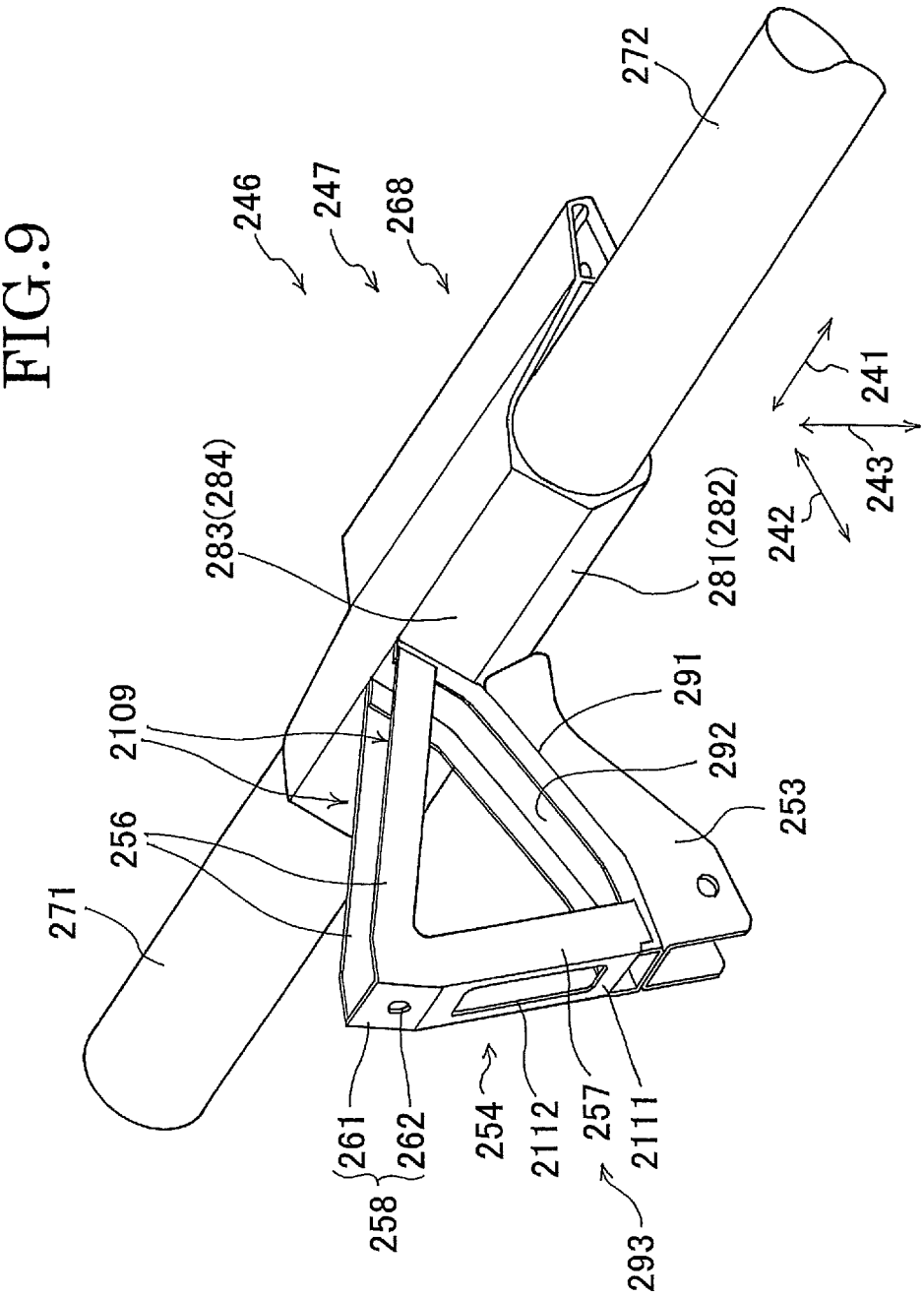
FIG. 9 is an enlarged perspective view of a post bracket part in FIG. 7.

A front-wall attachment portion 258 which is attachable to the cabin front wall 255 is provided to a middle portion of the bifurcated post bracket 254, i.e., a portion at which the front end of the main-part supporting portion 256 and the front end of the column supporting portion 257 meet. As shown in FIG. 9, this front-wall attachment portion 258 includes a contact surface portion 261 capable of contacting the cabin front wall 255, and a vehicle-body fastening portion 262, such as a screw hole, provided through this contact surface portion 261.

Figure 10:
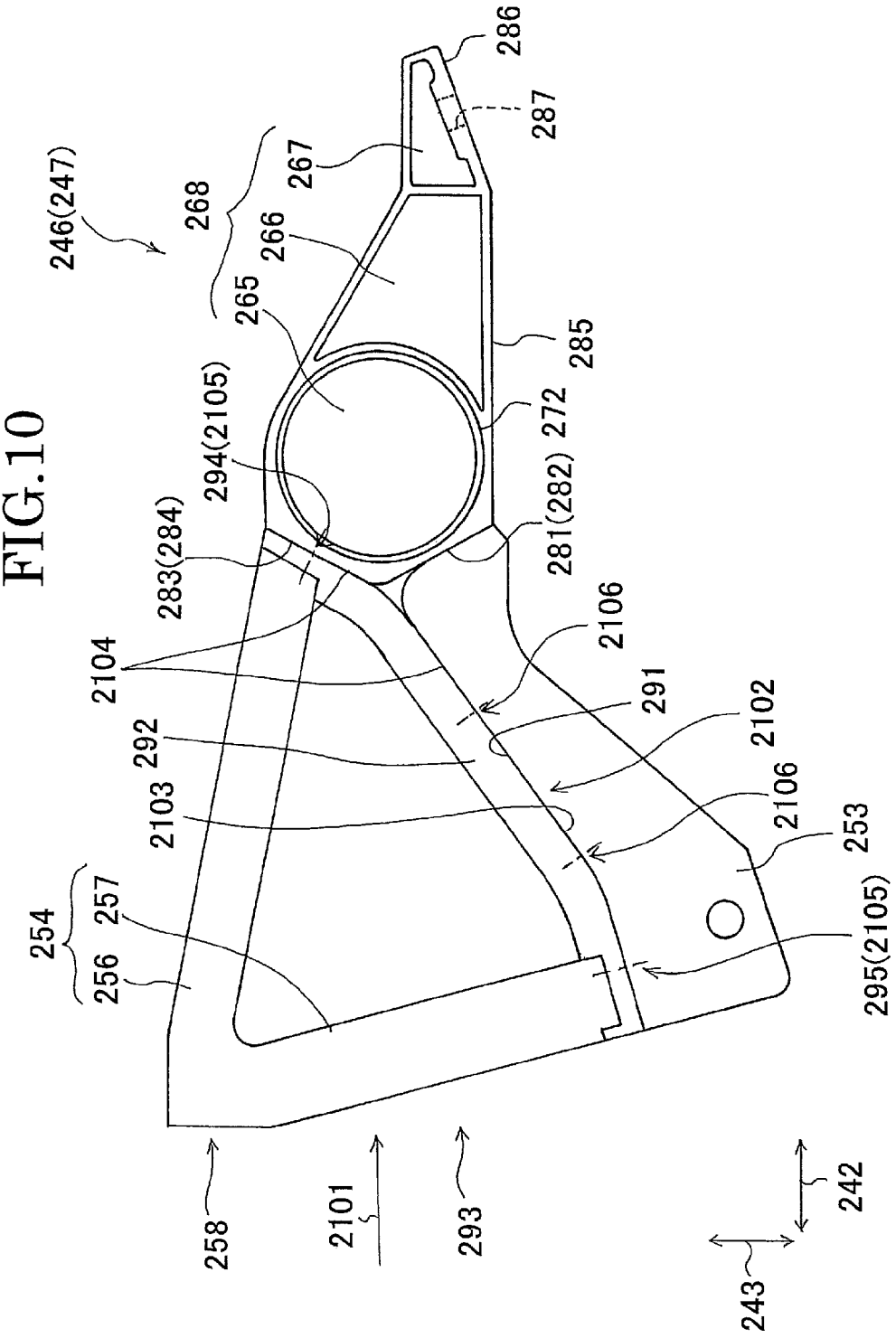
FIG. 10 is a side view of the post bracket part in FIG. 9.

In addition, at least at the middle portion, the aforementioned high-strength-vehicle-body-member main part 247 includes a high-rigidity structure part 268 including multiple closed cross-section portions 265 to 267 as shown in FIG. 10. In this example, the high-rigidity structure part 268 is partially provided at a position corresponding to the inner half of the driver-seat side. As shown in FIG. 7, two pipe members 271 and 272 having circular cross sections are fixed to both end portions of the high-rigidity structure part 268 by press fitting or the like, respectively. The high-rigidity structure part 268 as above can be formed through extrusion of a light alloy, for example.

The aforementioned stay 251 and post bracket 254 as well as a knee protector 273 are collectively attached to the high-rigidity structure part 268. The knee protector 273 is designed to receive the knees of the occupant in an emergency and absorb knee input loads 274 and 275 (see FIG. 8). In this example, the knee protector 273 includes paired left and right knee protection brackets 276 and a knee receiving member 277 laid between the paired knee protection brackets 276. Further, each knee protection bracket 276 is formed of different knee protection brackets, namely, an upper knee protection bracket 278 for absorbing mainly the knee input load 274 from an occupant of an average physical size, and a lower knee protection bracket 279 for absorbing mainly the knee input load 275 from an occupant of a small physical size. The knee receiving member 277 is placed behind the instrument panel 245, instead of being directly attached to the instrument panel 245.

Specifically, as shown in FIG. 10, the high-rigidity structure part 268 has: at its vehicle-front-side lower portion 281, a tilted column bracket attachment surface 282 which faces downward and to which the column bracket 253 can be attached; at its vehicle-front-side upper portion 283, a tilted post bracket attachment surface 284 which faces upward and to which the post bracket 254 can be attached; and at its almost entire lower surface, a horizontal attachment surface 285 to which both the stay 251 and the knee protection brackets 276 can be attached. Moreover, on the cabin inner side of the horizontal attachment surface 285, a column attachment surface 286 is provided for direct attachment of a cabin-inner-side portion of the steering column. This column attachment surface 286 is so formed that a middle portion thereof may be thicker than any other portion of the high-rigidity structure part 268. A column attachment screw hole portion 287 is formed in this thick portion of the column attachment surface 286.

The high-rigidity structure part 268 has a shape that is longer in the vehicle front-rear direction 242 than a usual pipe with a circular cross section in order to improve the strength thereof in the vehicle front-rear direction 242. Then, an upper portion of the aforementioned stay 251 has a gradually expanding shape (gradually expanding shape portion 288) that has the total length, in the vehicle front-rear direction 242, of the horizontal attachment surface 285 and the column attachment surface 286. The upper end of the stay 251 has such a bent shape as to be able to contact both the horizontal attachment surface 285 and the column attachment surface 286.

In addition to the basic configuration given above, a structure of the high-strength vehicle body member in this example has the following configurations.

Figure 11:
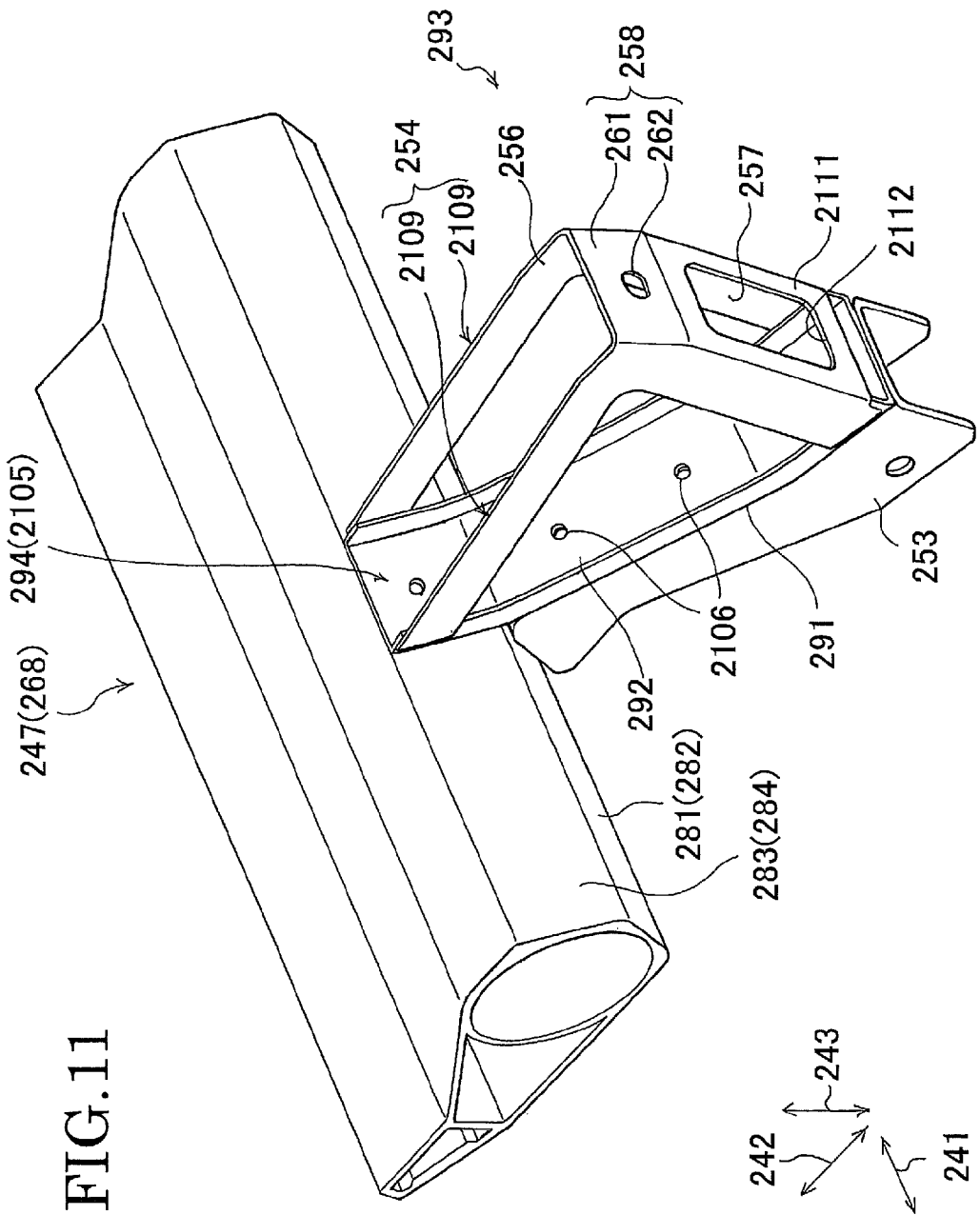
FIG. 11 is an enlarged perspective view of the same post bracket part in FIG. 9.
Figure 12:
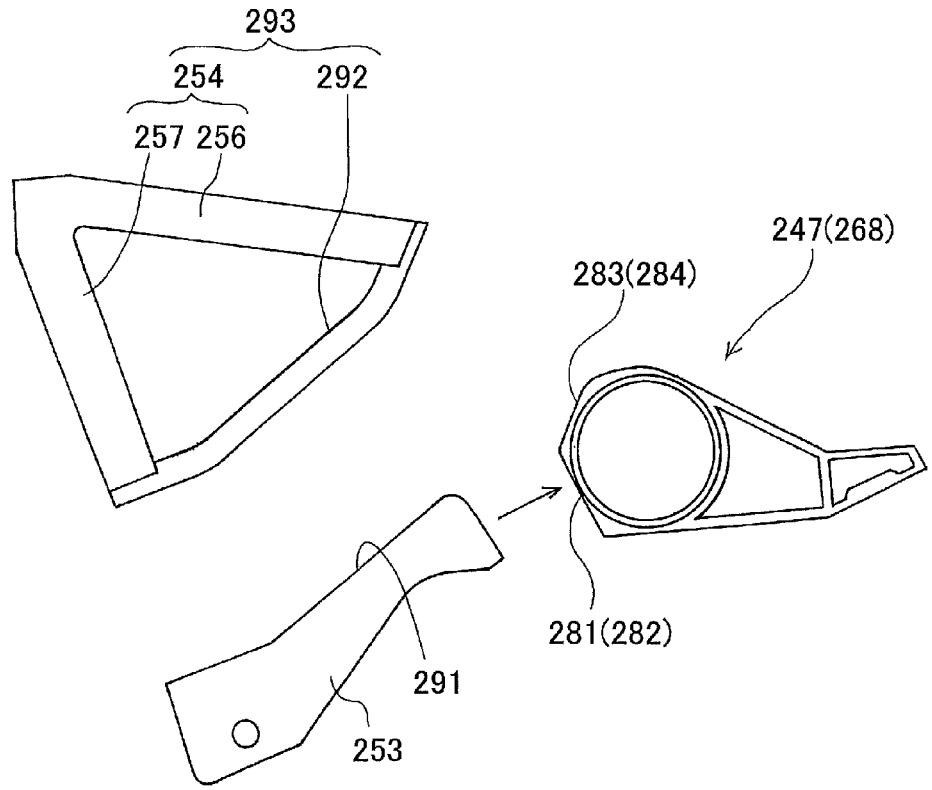
FIG. 12 is a view showing attachment of the post bracket.
Figure 13:
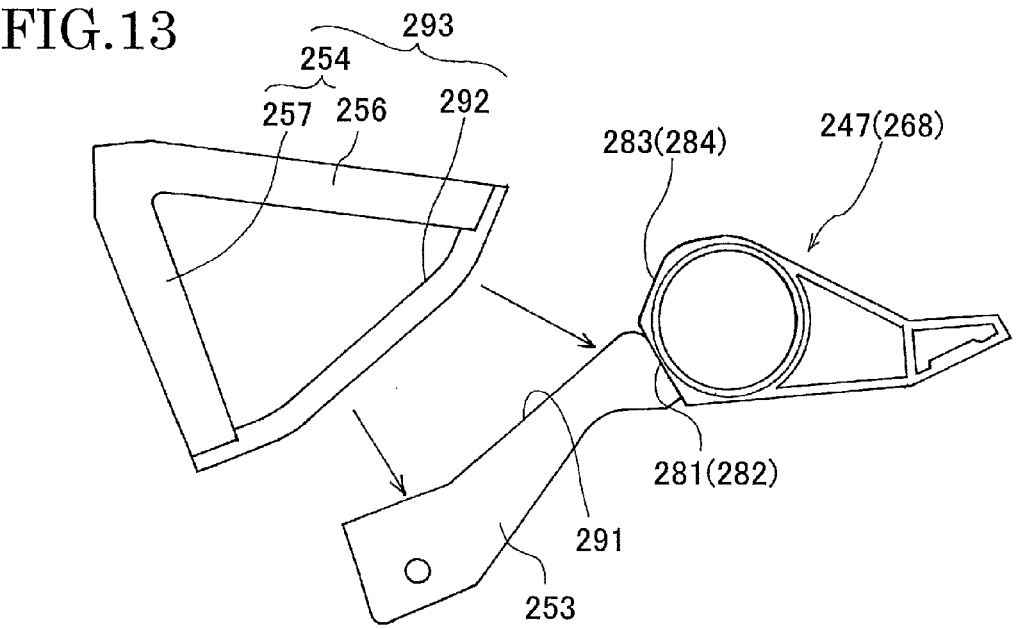
FIG. 13 is a view showing attachment of the post bracket after FIG. 12.
Figure 14:
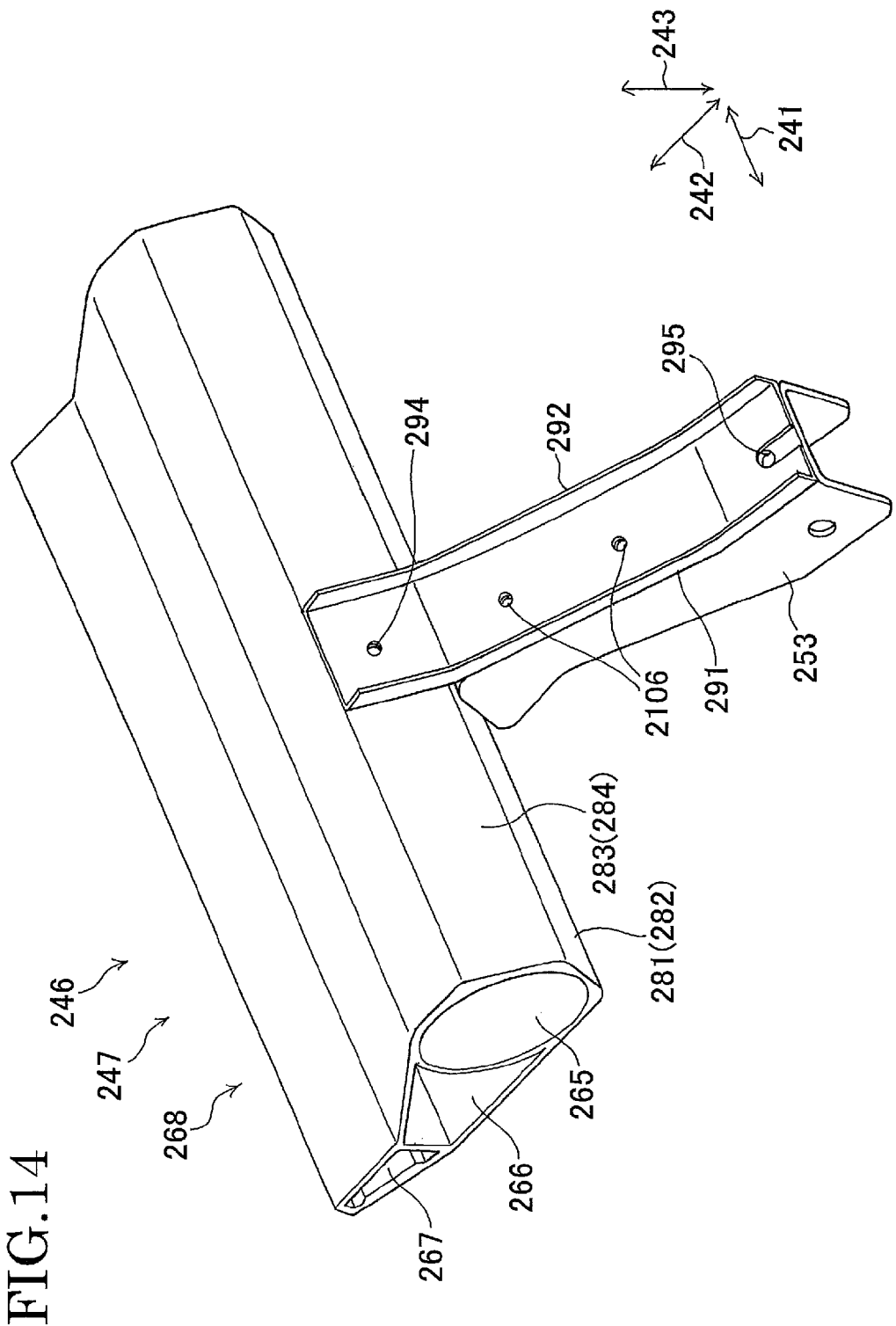
FIG. 14 is an enlarged perspective view showing an attached state of the post bracket.

(a) As shown in FIGS. 11, 12 and 13, a base bracket 292 is provided which can be disposed in contact, from above, with the vehicle-front-side upper portion 283 of the high-strength-vehicle-body-member main part 247 as well as an upper surface 291 of the column bracket 253. Then, this base bracket 292 is laid between and integrally joined to the vehicle-rear-side end of the main-part supporting portion 256 and the lower end of the column supporting portion 257 of the bifurcated post bracket 254. In this way, a reinforced post bracket body 293 is formed which is independent of the high-strength-vehicle-body-member main part 247 and has a substantially triangular shape in the side view (closed loop structure). As shown in FIG. 14, between the base bracket 292 forming the reinforced post bracket body 293 and the vehicle-front-side upper portion 283 of the high-rigidity structure part 268, a high-strength-vehicle-body-member attachment portion 294 is provided to attach the base bracket 292 to the vehicle-front-side upper portion 283. Similarly, between the base bracket 292 and an upper surface 291 of the column bracket 253, a column-bracket attachment portion 295 is provided to attach the base bracket 292 to the column bracket 253.

The vehicle-rear-side end of the main-part supporting portion 256 of the post bracket 254 and the vehicle-rear-side end of the base bracket 292 are fixed to each other by welding (welded portion), and the lower end of the column supporting portion 257 and the vehicle-front-side end of the base bracket 292 are fixed to each other by welding (welded portion). The high-strength-vehicle-body-member attachment portion 294 and the column-bracket attachment portion 295 are attachment hole portions, or the like. These attachment hole portions are circular holes, elongated holes, or the like. In this example, only the attachment hole portion of the column-bracket attachment portion 295 on the base bracket 292 side is an elongated hole extending in the vehicle front-rear direction 242 until reaching the vehicle-front-side end of the base bracket 292. The other attachment hole portion is a circular hole.

Figure 15:
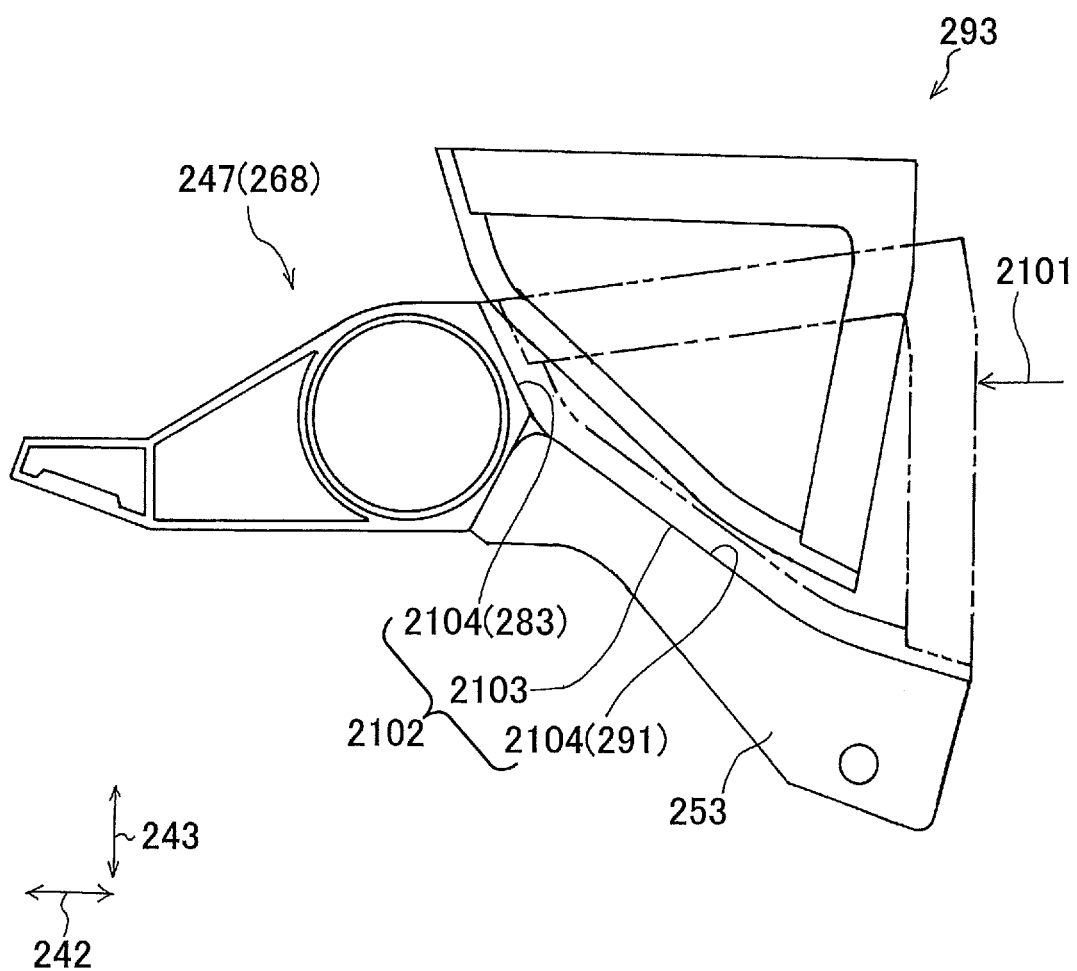
FIG. 15 is a side view showing how the post bracket acts in an emergency.

(b) As shown in FIG. 15, the high-rigidity structure part 268 and column bracket 253 and the reinforced post bracket body 293 have an emergency separable/escapable structure portion 2102 therebetween at which the reinforced post bracket body 293 can be attached to the high-strength-vehicle-body-member main part 247 and the column bracket 253 but is separable and escapable therefrom upon application of an emergency input load 2101 (see FIG. 8) from the front.

This emergency separable/escapable structure portion 2102 includes: a slide surface portion 2103 provided to the lower surface of the base bracket 292; and a guide surface portion 2104 provided to each of the upper surface 291 of the column bracket 253 and the vehicle-front-side upper portion 283 of the high-rigidity structure part 268 and being capable of guiding sliding movement of the slide surface portion 2103 toward the rear and upper sides of the vehicle.

As shown in FIG. 10, the emergency separable/escapable structure portion 2102 also includes: a load absorption attachment member 2105 provided to each of the high-strength-vehicle-body-member attachment portion 294 and the column-bracket attachment portion 295 and being capable of breaking upon application of the emergency input load 2101 from the front of the vehicle to absorb that emergency input load 2101; and a load absorption amount adjustment member 2106 so provided as to be selectively mountable between the slide surface portion 2103 and the guide surface portions 2104 and being capable of breaking upon application of the emergency input load 2101 from the front to set and adjust the amount of absorption of the emergency input load 2101.

Here, the slide surface portion 2103 and the guide surface portions 2104 may be formed into an arc shape curving downward, a polygonal shape approximate to such an arc shape, or the like, for example. Rivets or the like can be used as the load absorption attachment members 2105 and the load absorption amount adjustment members 2106.

Figure 16:
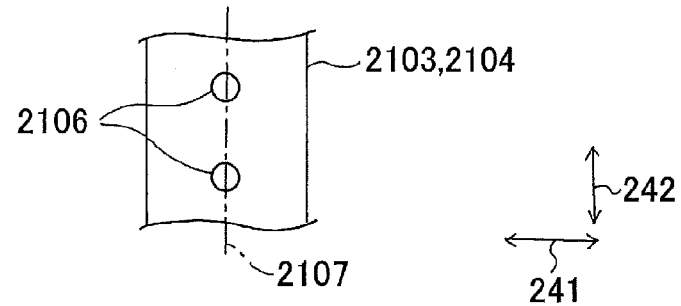
FIG. 16 is a partial plan view showing the attachment positions of load absorption amount adjustment members.
Figure 17:
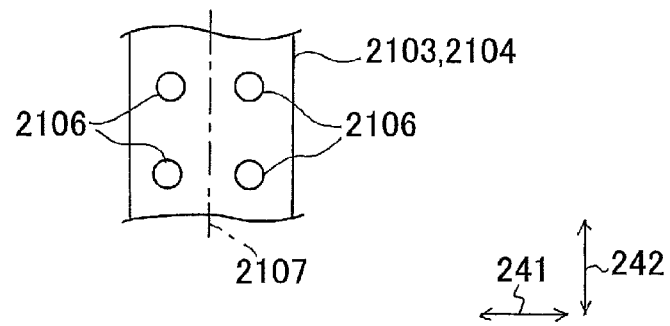
FIG. 17 is a partial plan view showing other attachment positions of load absorption amount adjustment members.

Further, the load absorption amount adjustment members 2106 can be aligned on a widthwise center line 2107 of the slide surface portion 2103 and the guide surface portions 2104 as shown in FIG. 16, for example. Alternatively, the load absorption amount adjustment members 2106 can be aligned on both sides of the widthwise center line 2107 in parallel with the widthwise center line 2107 as shown in FIG. 17 so as to be resistant to deformation in the vehicle width direction 241.

Figure 18:
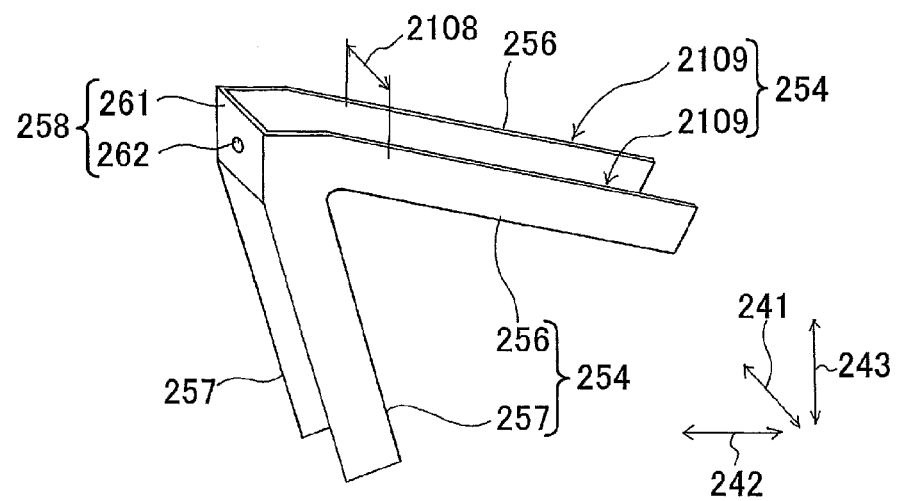
FIG. 18 is a perspective view of two vertical surface portions of the post bracket.

(c) As shown in FIG. 18, the post bracket 254 includes at least two vertical surface portions 2109 disposed in parallel to each other with a gap 2108 therebetween. These two vertical surface portions 2109 are joined to each other by the base bracket 292.

Here, each vertical surface portion 2109 includes the aforementioned main-part supporting portion 256 and column supporting portion 257 and has the substantially bifurcated shape in the side view. Each vertical surface portion 2109 is oriented in a direction substantially perpendicular to the vehicle width direction 241. The two vertical surface portions 2109 are joined to each other also by the front-wall attachment portion 258. The two vertical surface portions 2109 may also be joined to each other at the vehicle front side of the column supporting portion 257 as shown in FIG. 9 (front-portion joining surface portion 2111). In FIG. 9, a punched hole portion 2112 is formed as an opening in the front-portion joining surface portion 2111.

Next, operations of this example will be described.

The high-strength-vehicle-body-member main part 247 is attached to the left and right vehicle body panels (side panels) through the side brackets 248 provided to its both ends.

The high-strength-vehicle-body-member main part 247 functions mainly to support the steering column through the column bracket 253.

The stay 251 provided to the middle portion, in the vehicle width direction 241, of the high-strength-vehicle-body-member main part 247 functions to fix the lower portion of the high-strength-vehicle-body-member main part 247 (high-rigidity structure part 268) to the cabin floor 249 (floor panel; see FIG. 8) to support the high-strength-vehicle-body-member main part 247 mainly in the vertical direction 243. By the stay 251, it is possible to suppress vibrations of the steering column and the high-strength-vehicle-body-member main part 247 in the vertical direction 243, and the like.

The post bracket 254 provided to the middle portion, in the vehicle width direction 241, of the high-strength-vehicle-body-member main part 247 functions to fix the vehicle front-side portion of the high-strength-vehicle-body-member main part 247 (high-rigidity structure part 268) to the cabin front wall 255 (dash panel; see FIG. 8) to support the high-strength-vehicle-body-member main part 247 mainly in the vehicle front-rear direction 242.

Furthermore, the post bracket 254 functions such that the column supporting portion 257 supports the steering column through the column bracket 253 at the vehicle front side in the vehicle front-rear direction 242, the vertical direction 243, and the circumferential direction (rotational direction) of the high-strength-vehicle-body-member main part 247.

Figure 19:
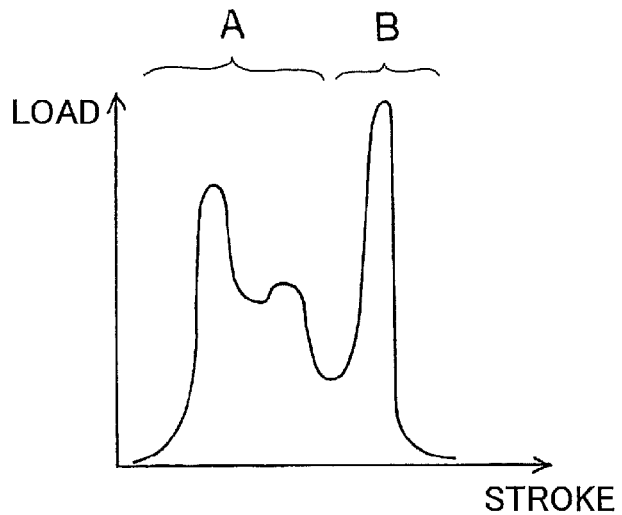
FIG. 19 is a graph showing the relationship between a deformation stroke of the post bracket and a load.
Figure 20:
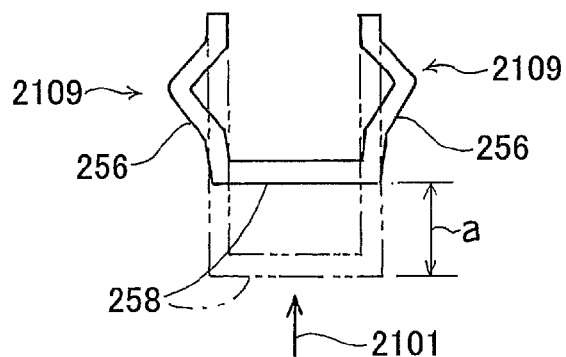
FIG. 20 is a partial plan view showing how the post bracket is deformed.

Then, as shown in FIG. 19, upon application of the emergency input load 2101 (see FIG. 8) from the front of the vehicle, the post bracket 254 (reinforced post bracket body 293) is firstly crushed to absorb this load (see a deformation absorption range A in FIG. 19; see also FIG. 20). Thereafter, the load absorption attachment members 2105 and the load absorption amount adjustment members 2106 break and the post bracket 254 is separated and displaced away from the high-strength-vehicle-body-member main part 247 and the like to thereby absorb the load (see a separation absorption range B in FIG. 19; see also FIG. 15). Note that in FIG. 19, the load absorption takes place at two stages (with two peaks) in the deformation absorption range A due to how the post bracket 254 is crushed; however, the load absorption is not limited thereto.

According to this example, the following operations and effects can be obtained.

(a) The bifurcated post bracket 254 and the base bracket 292 together form the reinforced post bracket body 293 having a substantially triangular shape in the side view. In this way, the rigidity of the reinforced post bracket body 293 can be increased. Accordingly, the post bracket 254 or the reinforce post bracket body 293 can be made lighter.

The base bracket 292 of the reinforced post bracket body 293 is disposed in contact, from above, with the vehicle-front-side upper portion 283 of the high-strength-vehicle-body-member main part 247 as well as the upper surface 291 of the column bracket 253. Then, the base bracket 292 and the vehicle-front-side upper portion 283 of the high-strength-vehicle-body-member main part 247 are attached to each other by use of the high-strength-vehicle-body-member attachment portion 294, and the base bracket 292 and the upper surface 291 of the column bracket 253 are attached to each other by use of the column-bracket attachment portion 295. Accordingly, as compared to a case where the post bracket 254 is directly fixed by welding to the high-strength-vehicle-body-member main part 247 and the column bracket 253, the influence of welding distortion can be reduced, thereby improving the attachment accuracy of the reinforced post bracket body 293.

(b) Upon application of the emergency input load 2101 from the front, the post bracket 254 or the reinforced post bracket body 293 is crushed, and thereafter, the load absorption attachment members 2105 and the load absorption amount adjustment members 2106 break due to the emergency input load 2101. In this way, the emergency input load 2101 can be absorbed as illustrated by the separation absorption range B in FIG. 19. In this case, the amount of absorption of the emergency input load 2101 can be set and adjusted by adjusting the positions and number of the selectively mountable load absorption amount adjustment members 2106 to be mounted.

Due to the breaking of the load absorption attachment members 2105 and the load absorption amount adjustment members 2106 and so on, the reinforced post bracket body 293 is separated from the high-strength-vehicle-body-member main part 247 and the column bracket 253. In the separation, the slide surface portion 2103 slides on the guide surface portion 2104 toward the rear and upper sides of the vehicle. Accordingly, the reinforced post bracket body 293 can stably and securely escape toward the rear of the vehicle without causing influence such as displacement and bending deformation of the high-strength-vehicle-body-member main part 247.

(c) The post bracket 254 includes at least two vertical surface portions 2109 disposed in parallel to each other with the gap 2108 therebetween. These two vertical surface portions 2109 are joined to each other by the base bracket 292. This is structurally advantageous in load absorption as compared to a typical post bracket 254 including only one vertical surface portion 2109.

Specifically, as the two, parallel vertical surface portions 2109 hold to withstand a load and vibrations, it is possible to secure a rigidity in the vehicle front-rear direction 242 required in a normal situation (non-deformation situation) as well as a lateral rigidity for suppressing vibrations in the vehicle width direction 241.

Moreover, as shown in FIG. 20, the main-part supporting portions 256 of the respective two, parallel vertical surface portions 2109 are crushed (bending deformation or plastic deformation) upon application of the emergency input load 2101. Thus, it is possible to obtain deformation characteristics (shape) necessary in an emergency (deformation situation) against the emergency input load 2101 from the front of the vehicle.

Figure 21:
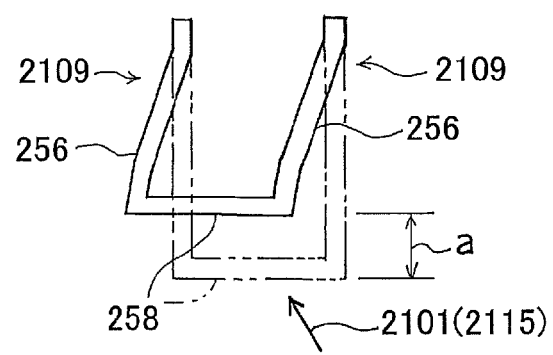
FIG. 21 is a partial plan view showing how the post bracket is deformed in a case where the input direction of a load is tilted.
Figure 22:
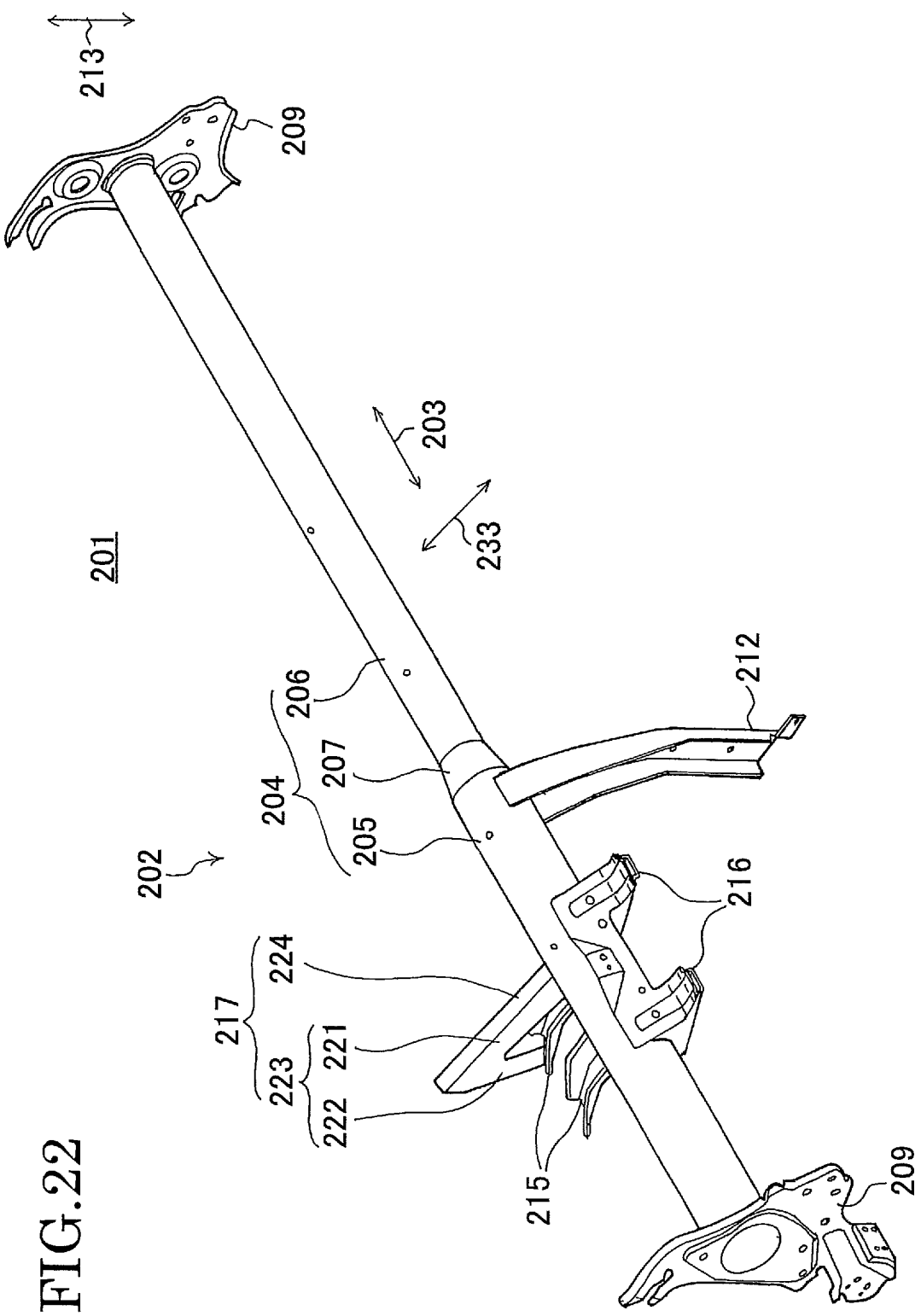
FIG. 22 is a perspective view of a structure of a high-strength vehicle body member according to another conventional example.
Figure 23:
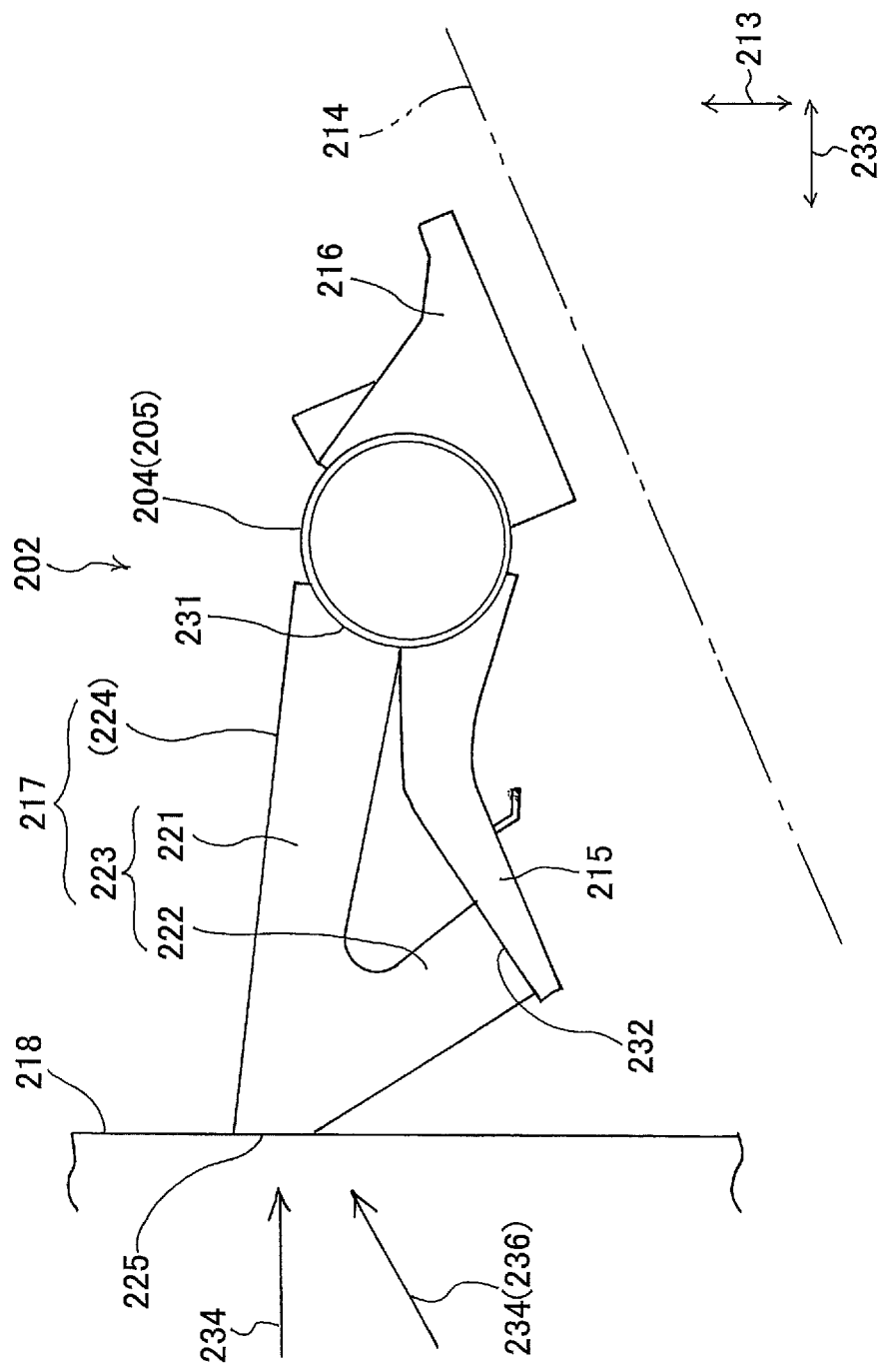
FIG. 23 is a side view of the structure of the high-strength vehicle body member in FIG. 22.
Figure 24:
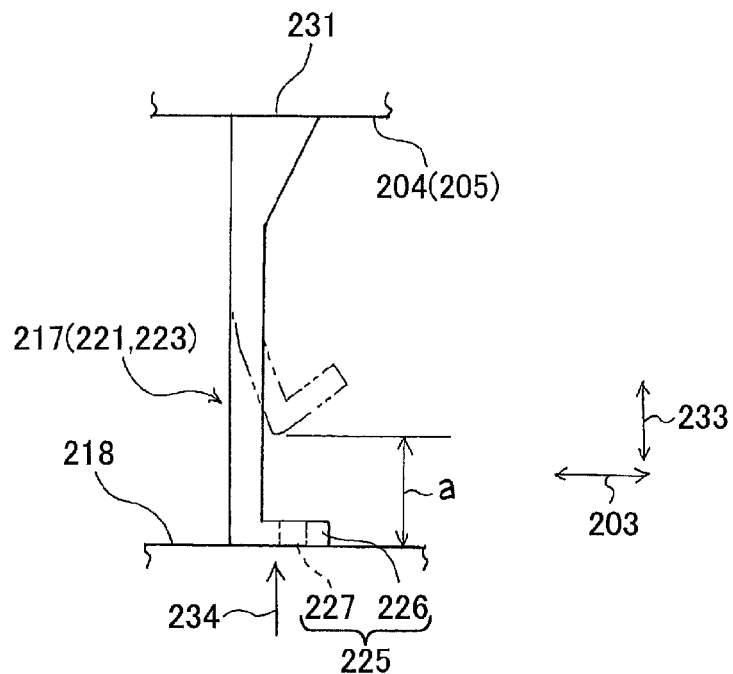
FIG. 24 is a plan view showing how a post bracket in the conventional example is deformed.
Figure 25:
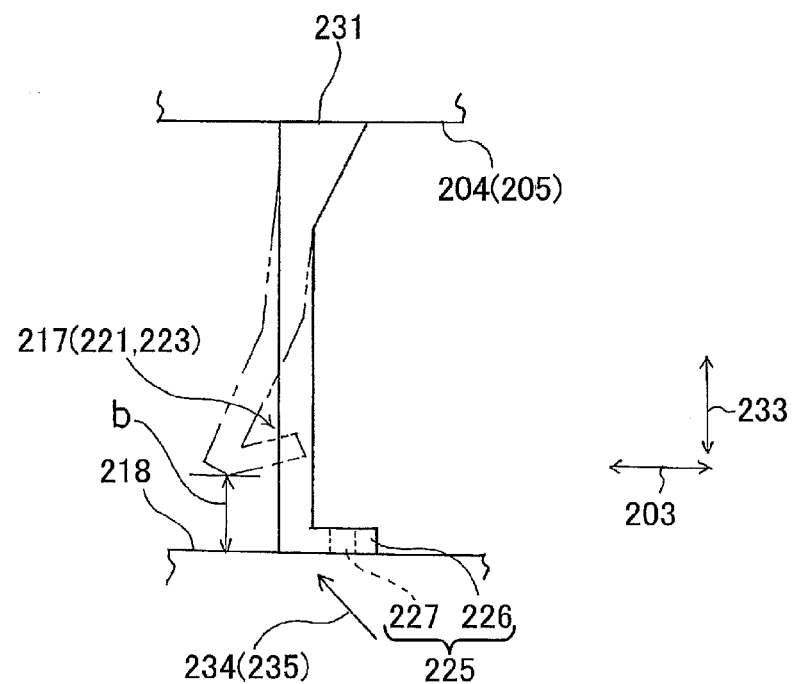
FIG. 25 is a partial plan view showing how the post bracket is deformed in a case where the input direction of a load is tilted in the conventional example.

Furthermore, as shown in FIG. 21, even when the input direction of the emergency input load 2101 is off (oblique input 2115), the main-part supporting portions 256 of the two, parallel vertical surface portions 2109 are deformed in a way to fall laterally. Thus, it is possible to stably secure deformation characteristics (shape) necessary in an emergency (deformation situation).

In other words, a load input (oblique input 2115) in an oblique direction can be well handled (a constant deformation stroke a can be obtained).

Accordingly, there is no need to purposely increase the thickness of the post bracket 254 or lower the strength of the post bracket 254 as a whole by providing a frangible portion such as a notch to the post bracket 254.

EXAMPLE 3

This example mainly aims to increase the strength and rigidity of the high-strength-vehicle-body-member main part against application of an emergency input load.

Hereinbelow, an example embodying the present invention will be described along with the drawings.

The following example is closely connected to the background art, the problems to be solved by the invention, and the like that are mentioned above. Thus, description as well as that description with necessary changes may be borrowed from one another whenever deemed necessary.

FIGS. 26 to 30 show this example and modifications thereof.

First of all, a basic configuration will be described.

Here, reference numeral 331 denotes the vehicle width direction, reference numeral 332 denotes the vehicle front-rear direction, and reference numeral 333 denotes the vertical direction.

A vehicle such as an automobile is provided with a resin instrument panel in a front part of the cabin. Behind this instrument panel, a metal, high-strength vehicle body member is provided.

Figure 27:
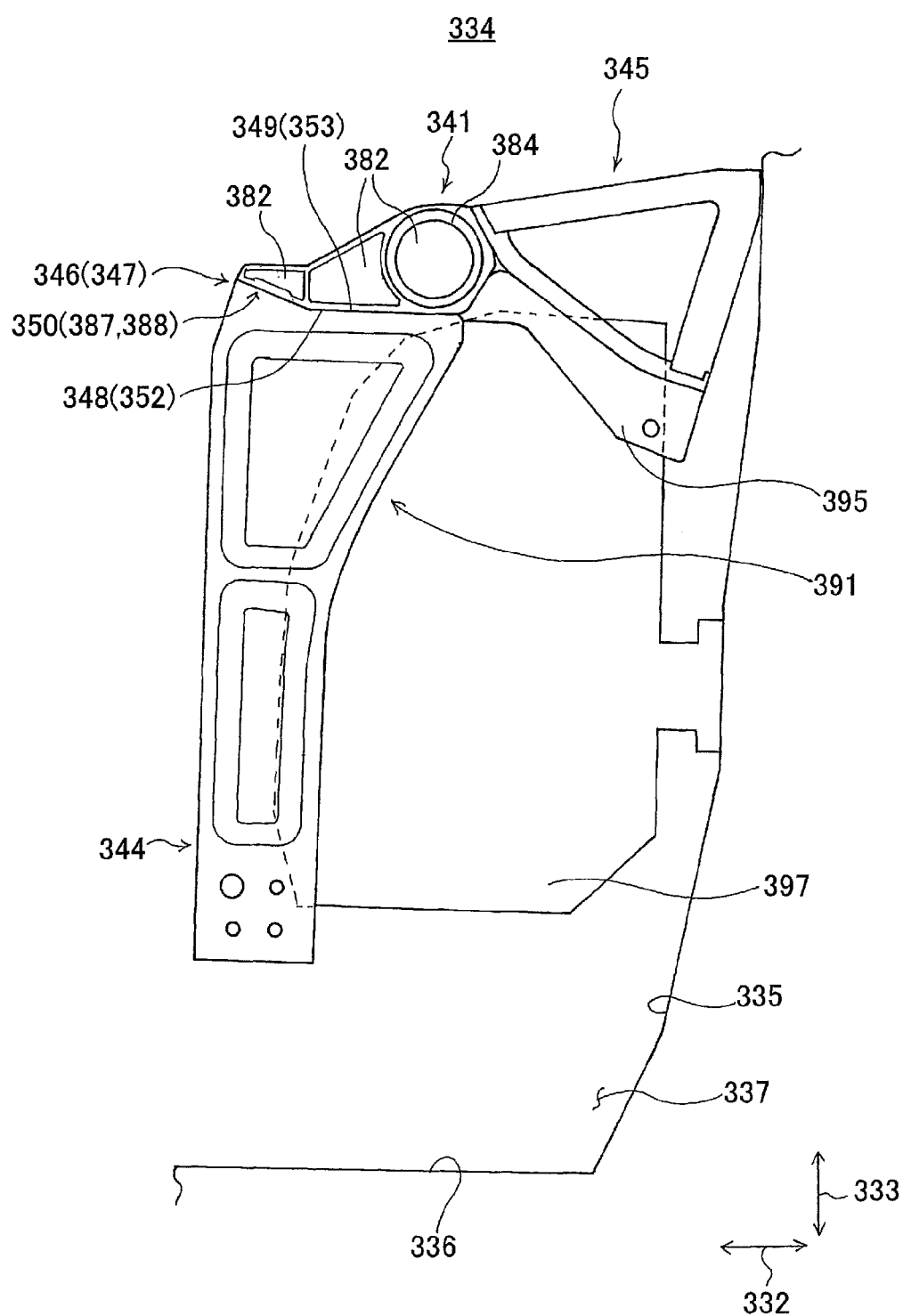
FIG. 27 is a side view of a stay part in FIG. 26.

As shown in FIG. 27, a front part of the cabin (cabin front part 334) includes a cabin front wall 335, a cabin floor 336, and cabin side walls 337.

Figure 26:
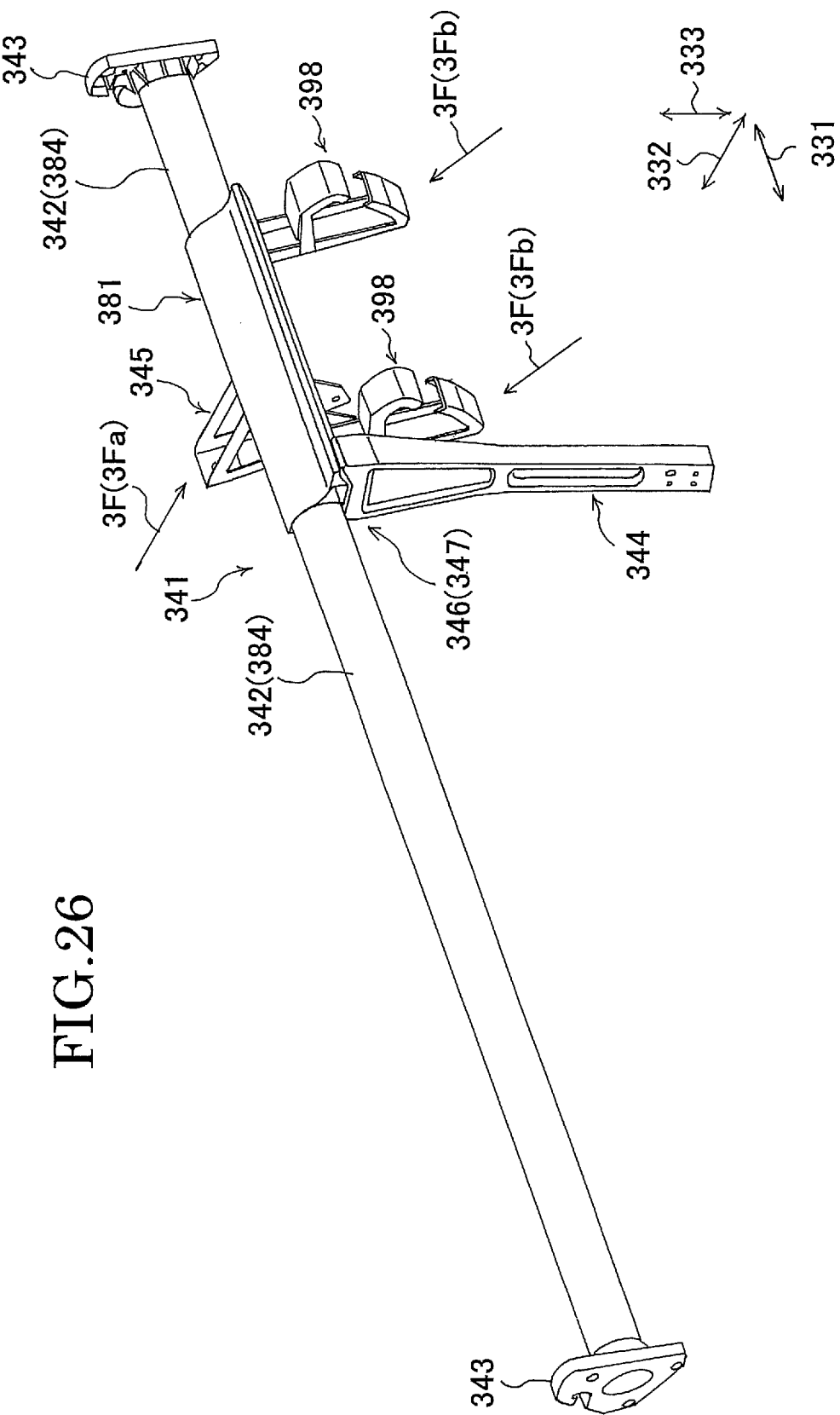
FIG. 26 is a perspective view of a structure of a high-strength vehicle body member according to Example 3.

As shown in FIG. 26, a high-strength vehicle body member 341 placed in the cabin front part 334 includes a high-strength-vehicle-body-member main part 342 which extends substantially in the vehicle width direction 331. The high-strength vehicle body member 341 includes side brackets 343 for attaching both ends of the high-strength-vehicle-body-member main part 342 to the left and right cabin side walls 337, respectively. The high-strength vehicle body member 341 also includes a stay 344 that fixes the high-strength-vehicle-body-member main part 342 (high-rigidity structure part 381 described later) to the cabin floor 336 to support the high-strength-vehicle-body-member main part 342. The high-strength vehicle body member 341 further includes a post bracket 345 that fixes the high-strength-vehicle-body-member main part 342 (high-rigidity structure part 381 described later) to the cabin front wall 335 to support the high-strength-vehicle-body-member main part 342.

In addition to the basic configuration given above, a structure of the high-strength vehicle body member in this example has the following configurations.

(a) First of all, the high-strength-vehicle-body-member main part 342 and the stay 344 are formed as members independent of each other. Then, between the high-strength-vehicle-body-member main part 342 and the stay 344, an attachment structure portion 346 is provided through which those members can be attached to each other. Further, this attachment structure portion 346 serves as an emergency separable attachment structure portion 347 which enables the high-strength-vehicle-body-member main part 342 and the stay 344 to be separated from each other upon application of an emergency input load 3F.

Figure 28:
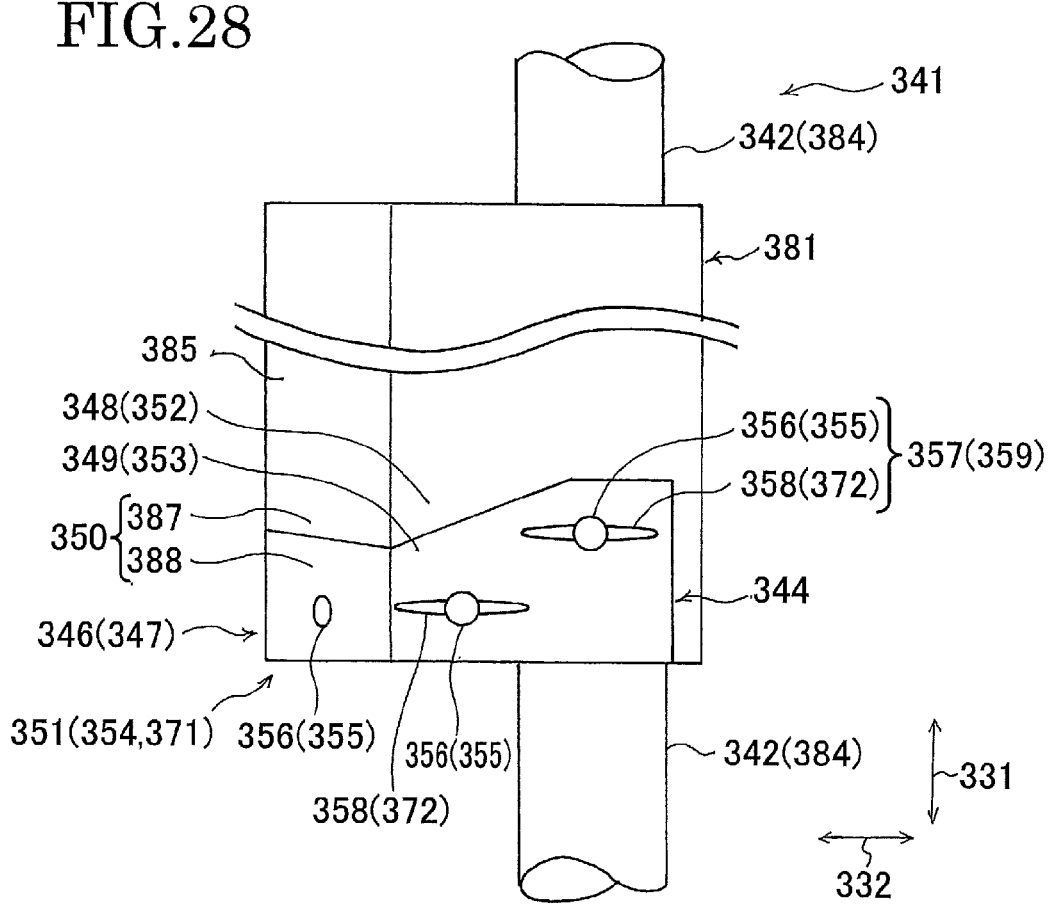
FIG. 28 is a bottom view of a stay attachment portion in FIG. 27.

(b) As shown in FIG. 27, the attachment structure portion 346 includes an attachment surface portion 348 provided to the high-strength-vehicle-body-member main part 342 (high-rigidity structure part 381 described later) and an attachment surface portion 349 provided to the stay 344. As shown in FIG. 28, the attachment structure portion 346 also includes fixture portions 351 that fix both the attachment surface portions 348 and 349 to each other. The emergency separable attachment structure portion 347 has the attachment surface portions 348 and 349 in FIG. 27 as emergency front-rear displaceable portions 352 and 353, respectively, which are capable of displacement substantially in the vehicle front-rear direction 332. The emergency separable attachment structure portion 347 also has the fixture portions 351 in FIG. 28 as emergency releasable fixture portions 354 that release the fixed state of the high-strength-vehicle-body-member main part 342 (high-rigidity structure part 381) and the stay 344 upon application of the emergency input load 3F (see FIG. 30).

Here, the attachment surface portions 348 and 349, or the emergency front-rear displaceable portions 352 and 353, are horizontal and flat surfaces in sliding contact with each other (horizontal surface portions or sliding contact surface portions). Note that the attachment surface portions 348 and 349, or the emergency front-rear displaceable portions 352 and 353, can be provided with a stopper portion 350 capable of limiting displacement of any one of the high-strength-vehicle-body-member main part 342 and the stay 344 toward one or the other way in the vehicle front-rear direction 332. This stopper portion 350 will be described later.

The fixture portions 351 may serve as fastening fixture portions 357 each using a screw 355 and a screw hole 356 as shown in FIG. 28, for example. For the fixture portions 351 to function as the emergency releasable fixture portions 354, the fastening fixture portions 357 may serve as displaceable fastening fixture portions 359 by forming elongated holes 358 or the like stretched in the vehicle front-rear direction 332 as their screw holes 356, for example.

Meanwhile, though not particularly illustrated, the fixture portions 351 may serve as riveted portions using rivets or the like, for example. These rivets may be utilized as they are as the emergency releasable fixture portions 354 (breakable riveted portions) by optimally setting the strengths thereof.

Figure 29:
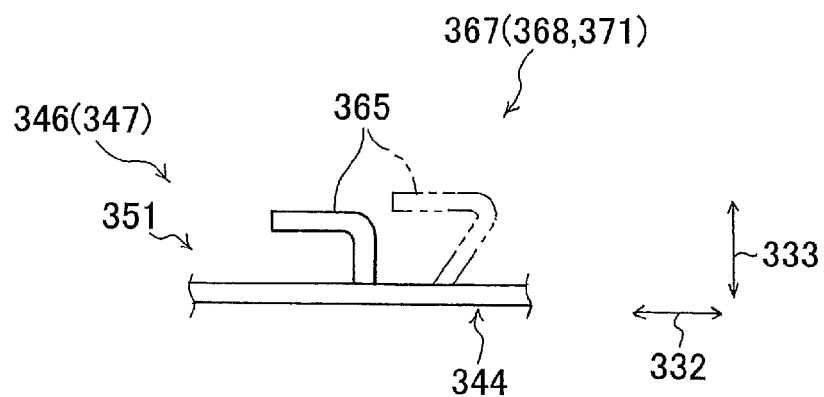
FIG. 29 is a view showing another example of the stay attachment portion.

Alternatively, the fixture portions 351 may serve as locking fixture portions 367 each including a hook portion 365 and a hook locking hole portion (not illustrated) as shown in FIG. 29, for example. This hook portion 365 may be utilized as it is as the emergency releasable fixture portion 354 (deformable locking fixture portion 368) by optimally setting the strength thereof. In this case, the hook portion 365 and the hook locking hole portion are provided respectively to the high-strength-vehicle-body-member main part 342 (high-rigidity structure part 381) and the stay 344, or vice versa.

(c) The emergency releasable fixture portions 354 include load absorption portions 371 capable of absorbing a load when the high-strength-vehicle-body-member main part 342 (high-rigidity structure part 381) and the stay 344 are separated from each other.

Here, the emergency input load 3F (see FIG. 30) to be absorbed by the load absorption portions 371 includes, for example, one from the front of the vehicle (first load 3Fa), one from the rear of the vehicle (second load 3Fb), and the like (see FIG. 26). Among these, the emergency input load 3F from the rear of the vehicle is, for example, a knee input load from the occupant, or the like.

Note that the elongated hole 358 in each displaceable fastening fixture portion 359 serving as the emergency releasable fixture portion 354 has a slit portion 372 that is smaller (narrower) than the diameter of the corresponding screw 355, except for a center portion to insert the screw 355. Then, when an emergency input load is generated, the screw 355 thrusts and widens the slit portion 372, hence making it possible to absorb the load. In other words, the emergency releasable fixture portion 354 can serve as the load absorption portion 371.

The breakable riveted portions, such as rivets, serving as the emergency releasable fixture portions 354 can include the load absorption portions 371 by setting the breaking loads thereof to levels that are optimal for the load absorption.

Alternatively, the locking fixture portions 367 serving as the emergency releasable fixture portions 354 can include the load absorption portions 371 by setting the deformation loads of the hook portions 365 to levels that are optimal for the load absorption.

(d) Here, the high-strength-vehicle-body-member main part 342 includes at least the high-rigidity structure part 381 as shown in FIG. 26. The high-rigidity structure part 381 may be provided entirely to the high-strength-vehicle-body-member main part 342, but in this example, is provided partially to the high-strength-vehicle-body-member main part 342 at a portion thereof where strength and rigidity are needed most. In FIG. 26, the high-rigidity structure part 381 is provided to a middle core portion on the driver-seat side of the high-strength-vehicle-body-member main part 342.

The high-rigidity structure part 381 includes multiple closed cross-section portions 382 (see FIG. 27). In this example, the high-rigidity structure part 381 includes three closed cross-section portions 382 which extend substantially in the vehicle width direction 331 and are integrally aligned next to each other substantially in the vehicle front-rear direction 332. The three closed cross-section portions 382 are so formed that one closer to the front of the vehicle in the vehicle front-rear direction 332 is larger while one closer to the rear of the vehicle in the vehicle front-rear direction 332 is smaller.

Note that the number and the arrangement of the closed cross-section portions 382 are simplest and most logical when they are as described above, but are not limited thereto. The high-rigidity structure part 381 is made of a light metal or a light alloy, for example. This light-metal or light-alloy high-rigidity structure part 381 can be manufactured by extrusion. The high-rigidity structure part 381 manufactured by extrusion has a cross section that is uniform in the vehicle width direction 331.

Metal pipe members 384 are provided to both sides of the high-rigidity structure part 381 of the high-strength-vehicle-body-member main part 342, respectively. In this example, these metal pipe members 384 are of the same diameter. The metal pipe members 384 are fitted and fixed to the closed cross-section portion 382 of the high-rigidity structure part 381 (in this case, the largest closed cross-section portion 382 at the closest position to the front of the vehicle).

In this case, since the multiple closed cross-section portions 382 are integrally aligned next to each other substantially in the vehicle front-rear direction 332 as mentioned above, the high-rigidity structure part 381 is formed to have a relatively large (long) size in the vehicle front-rear direction 332 and a relatively small (thin) size in the vertical direction 323. Accordingly, the structure of the high-rigidity structure part 381 is given a high strength and rigidity against the emergency input load 3F in the vehicle front-rear direction 332.

The almost entire or most part of the lower surface side of the high-rigidity structure part 381 is formed into a horizontal and flat surface to form the aforementioned attachment surface portions 348 and 349, or the emergency front-rear displaceable portions 352 and 353.

At a vehicle-rear-side portion of the lower surface side of the high-rigidity structure part 381, an inclined portion 358 inclined upward is formed (see FIG. 28). Since the steering column (not illustrated) is inclined upward from the front to the rear of the vehicle, the inclined portion 385 is given an inclination almost equivalent to that of the steering column and is configured to be usable as a column-rear-portion attachment portion to which (vehicle-rear-side fixture portion of) the steering column can be attached.

The aforementioned inclined portion 385 is also usable as a stopper surface 387 of the aforementioned stopper portion 350 capable of limiting displacement of the stay 344 relative to the high-strength-vehicle-body-member main part 342 (high-rigidity structure part 381) toward the front of the vehicle. At a vehicle-rear-side portion of the upper end of the stay 344, a stopper surface 388 as the stopper portion 350 is provided which corresponds to the stopper surface 387 mentioned above.

Meanwhile, if it is necessary to limit displacement of the stay 344 relative to the high-strength-vehicle-body-member main part 342 (high-rigidity structure part 381) toward the rear of the vehicle, the stopper portion 350 mentioned above is provided to a vehicle-front-side portion of the lower surface side of the high-rigidity structure part 381.

(e) In addition, the aforementioned stay 344 is made of metal. The stay 344 is formed through bending or the like of a metal plate in such a manner that the stay 344 has a substantially square U shape in a plan view. The stay 344 is attached to the high-rigidity structure part 381, and is placed at a substantially center portion of the high-strength-vehicle-body-member main part 342. In this example, there is only one stay 344. Moreover, the stay 344 extends substantially in the vertical direction 333. The upper end of the stay 344 is fixed to the lower portion (lower surface portion) of the high-strength-vehicle-body-member main part 342 (high-rigidity structure part 381). The aforementioned attachment surface portion 349 (emergency front-rear displaceable portion 353) is formed integrally at the upper end of the stay. Moreover, the lower end of the stay 344 is bolted to the cabin floor 336 (in this example, bolted in the vehicle width direction 331).

The stay 344 is so formed that its upper end side portion larger than its lower end side portion in horizontal cross section. For this reason, as the upper end side portion, the stay 344 includes an expanding cross-section portion 391 whose horizontal cross section expands as it extends upward. The upper end of the expanding cross-section portion 391 is formed to have a length in the vehicle front-rear direction 332 which is almost equal to that of the high-rigidity structure part 381. In this case, the stay 344 has a vehicle-rear-side edge extending straight substantially in the vertical direction 333, and a vehicle-front-side edge extending straight substantially in the vertical direction from the lower end to a middle portion thereof and extending obliquely from the middle portion toward the front of the vehicle.

(f) The aforementioned post bracket 345 is made of metal. The post bracket 345 has a substantially triangular shape in the side view. The post bracket 345 is so configured that its strength is about such a level that it does not become crushed by the emergency input load 3F.

In addition, the aforementioned high-strength vehicle body member 341 includes a column bracket 395 through which (vehicle-front-side fixture portion of) the steering column can be attached to the high-rigidity structure part 381 of the high-strength-vehicle-body-member main part 342. This column bracket 395 is fixed to a vehicle-front-side portion of the high-rigidity structure part 381.

The aforementioned post bracket 345 has an attachment structure to the high-rigidity structure part 381 and the column bracket 395 that has the same structural relationship between the high-strength-vehicle-body-member main part 342 (high-rigidity structure part 381) and the stay 344.

To briefly describe this, (1) the high-rigidity structure part 381 and column bracket 395, and the post bracket 345 are formed as members independent of each other, and an emergency separable attachment structure portion is provided as an attachment structure portion between both members; (2) this emergency separable attachment structure portion includes emergency releasable fixture portions; and (3) these emergency releasable fixture portions include the load absorption portions 371. Incidentally, details of the above (configuration as well as operation and effect) can be found by reading the stay 344 as the post bracket 345. Note that the aforementioned post bracket 345 is configured to be displaceable obliquely upward from the high-rigidity structure part 381 and the column bracket 395 toward the rear of the vehicle. In the other words, the post bracket 345 is purposely configured in such a way that its displacement direction does not completely coincide with that of the stay 344.

(g) Moreover, as shown in FIG. 27, an air conditioning unit 397 is disposed at a position which is substantially below the high-strength-vehicle-body-member main part 342 of the high-strength vehicle body member 341 and at a substantially vehicle front side of the stay 344. This air conditioning unit 397 is mainly made of resin.

Figure 35:
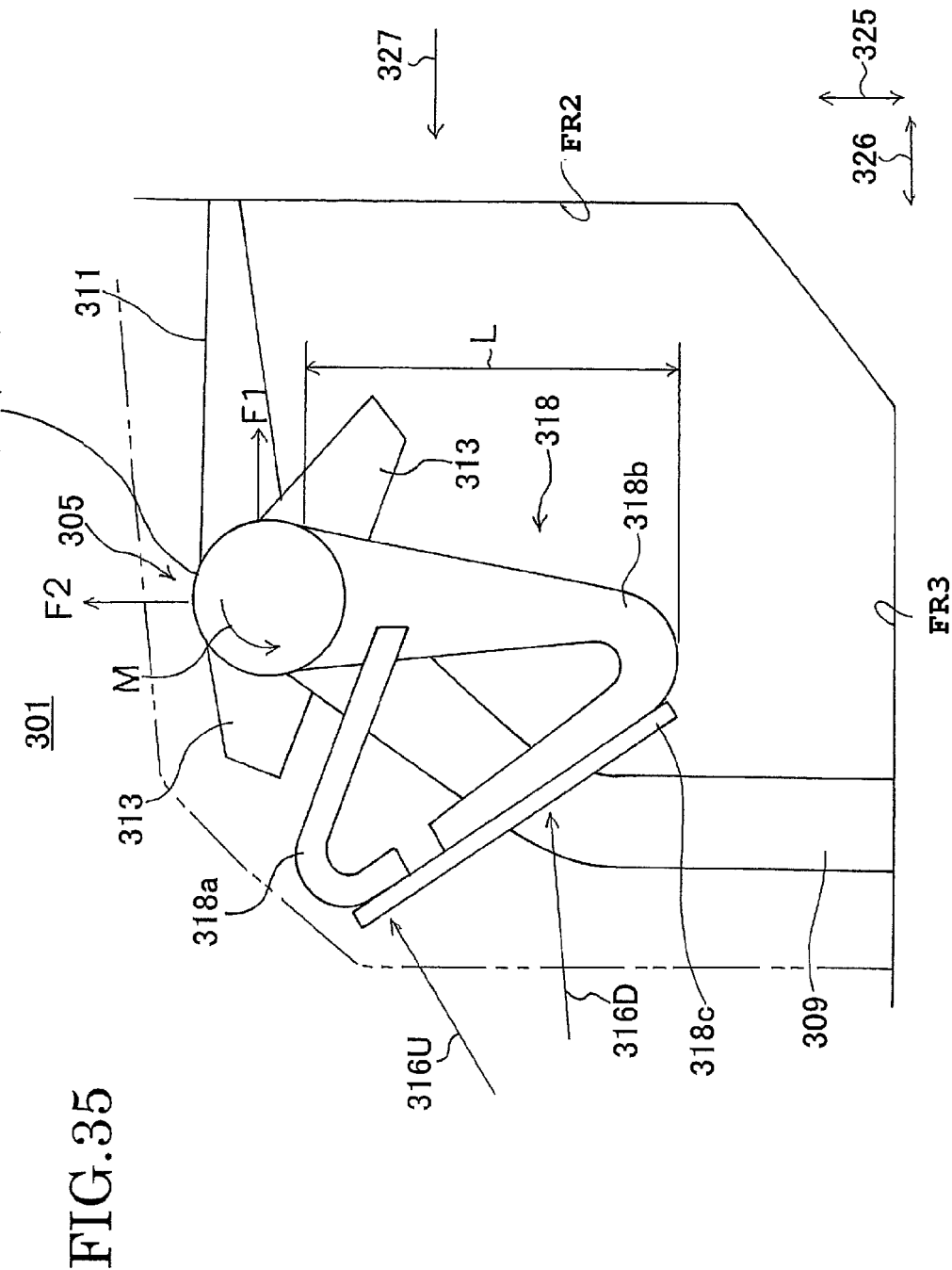
FIG. 35 is a side view of a knee protector part of the high-strength vehicle body member in the conventional example.

(h) Furthermore, as shown in FIG. 26, the high-strength vehicle body member 341 includes a knee protector 398 which is attached to the high-strength-vehicle-body-member main part 342 (high-rigidity structure part 381) and capable of receiving the knees of the occupant in an emergency and absorbing the emergency input load 3F (the second load 3Fb such as a knee input load from the occupant). Since this knee protector 398 is the same as that in FIG. 35, details thereof are omitted here. However, the description of FIG. 35 and the knee protector therein may be borrowed as needed.

Next, operations of this example will be described.

Figure 30:
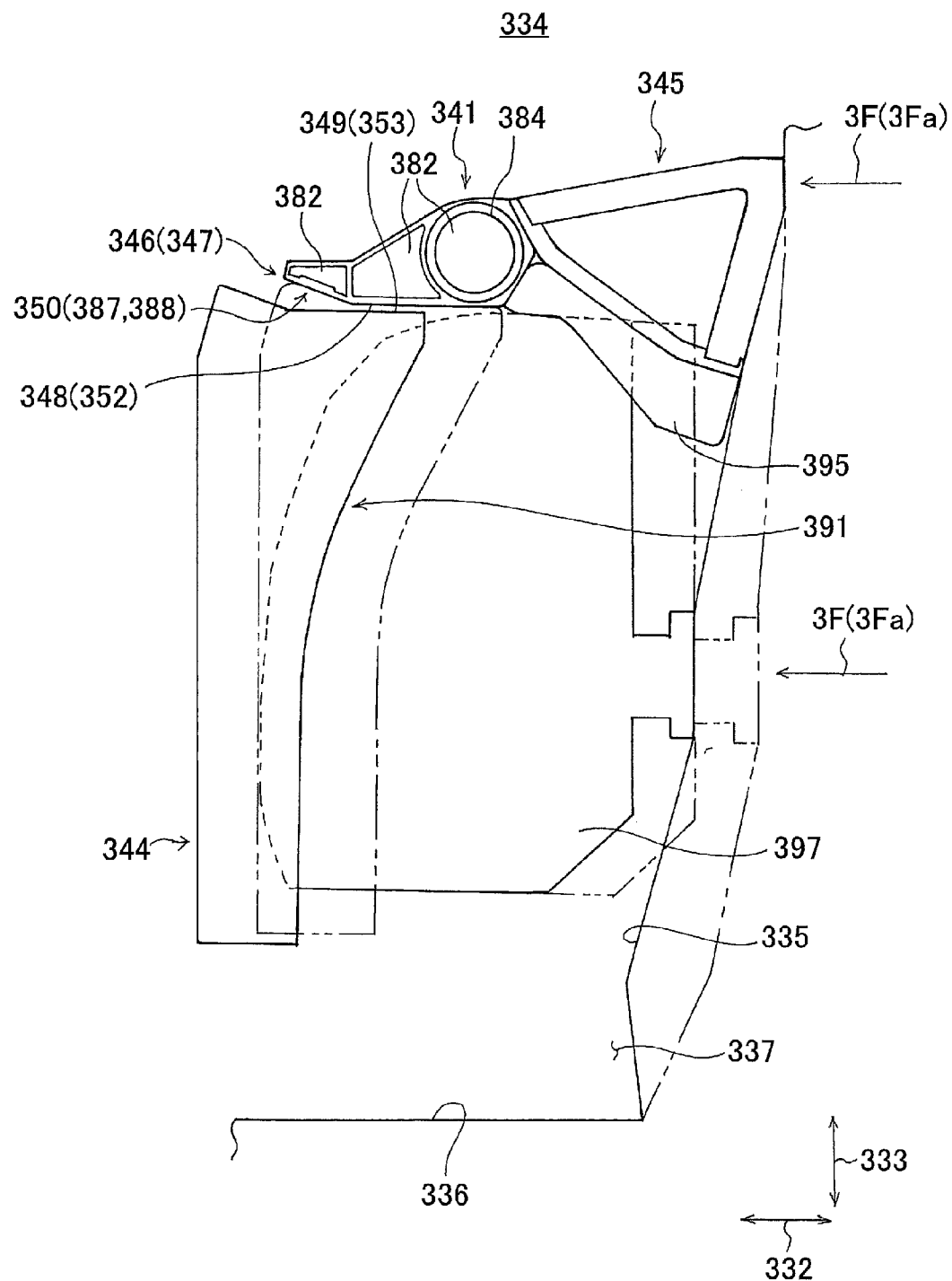
FIG. 30 is a view showing how the same part in FIG. 27 acts upon application of an emergency input load.
Figure 31:
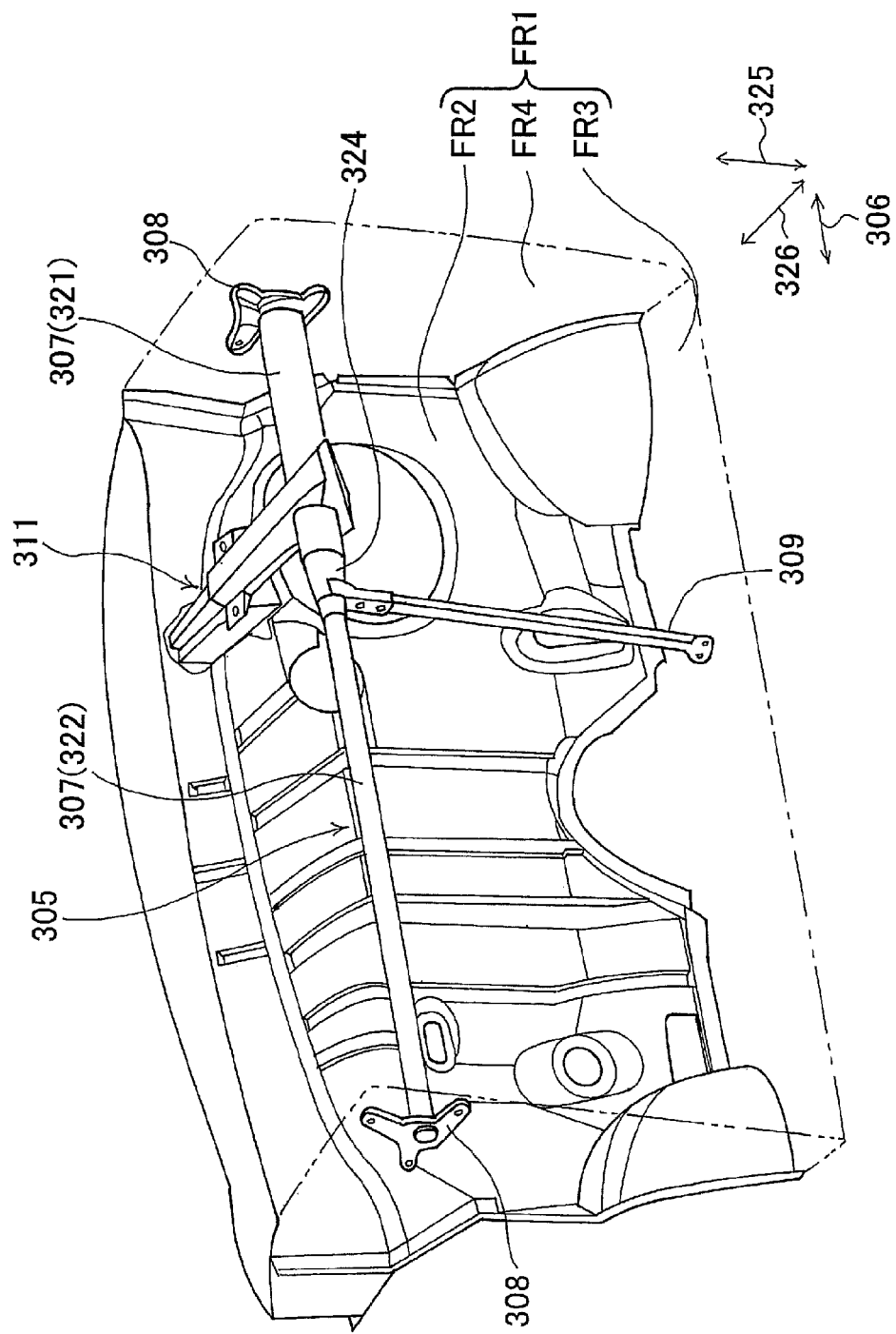
FIG. 31 is a perspective view of a cabin front part in the conventional examples.
Figure 32:
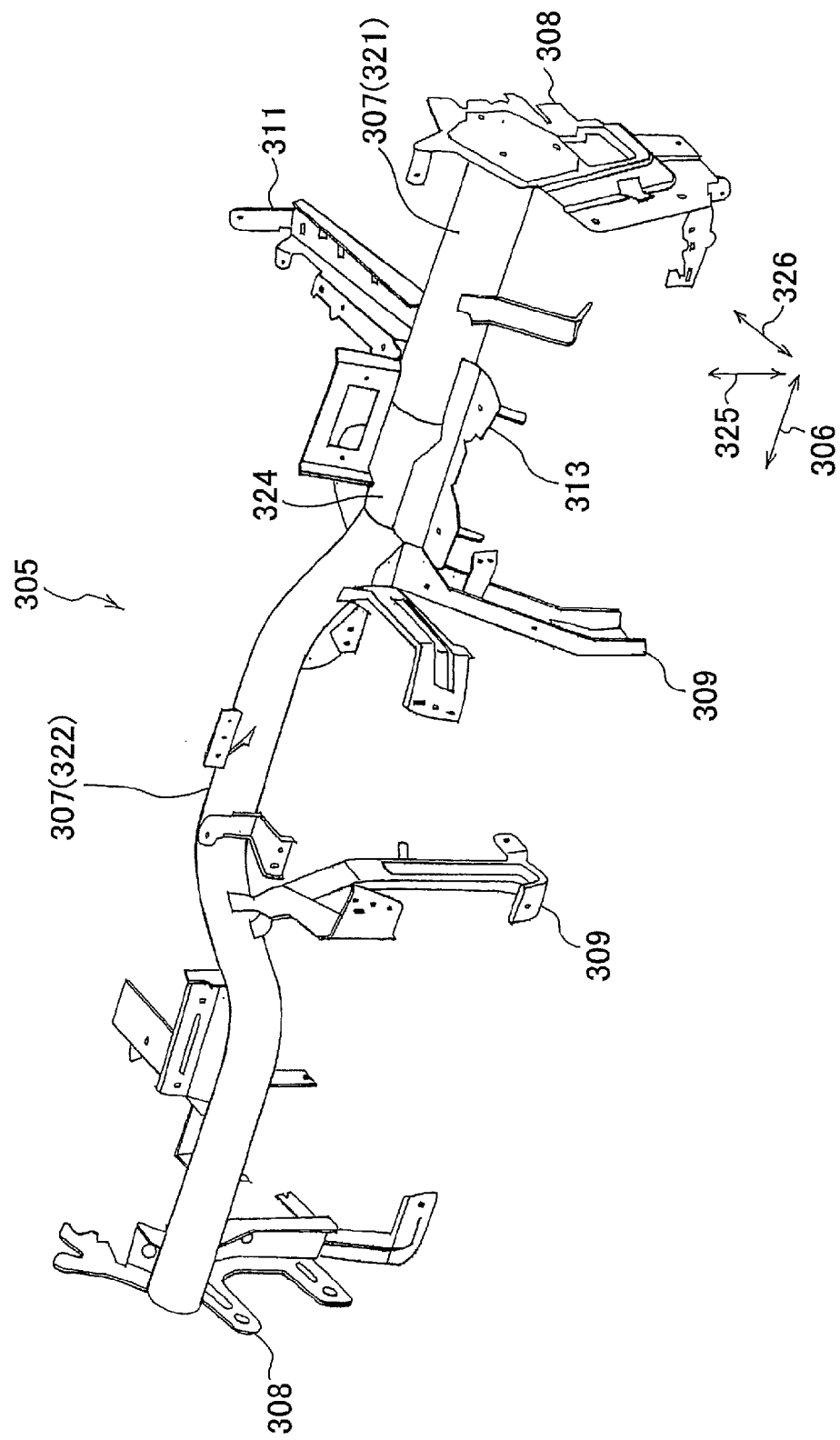
FIG. 32 is a perspective view of a high-strength vehicle body member according to another conventional example.
Figure 33:
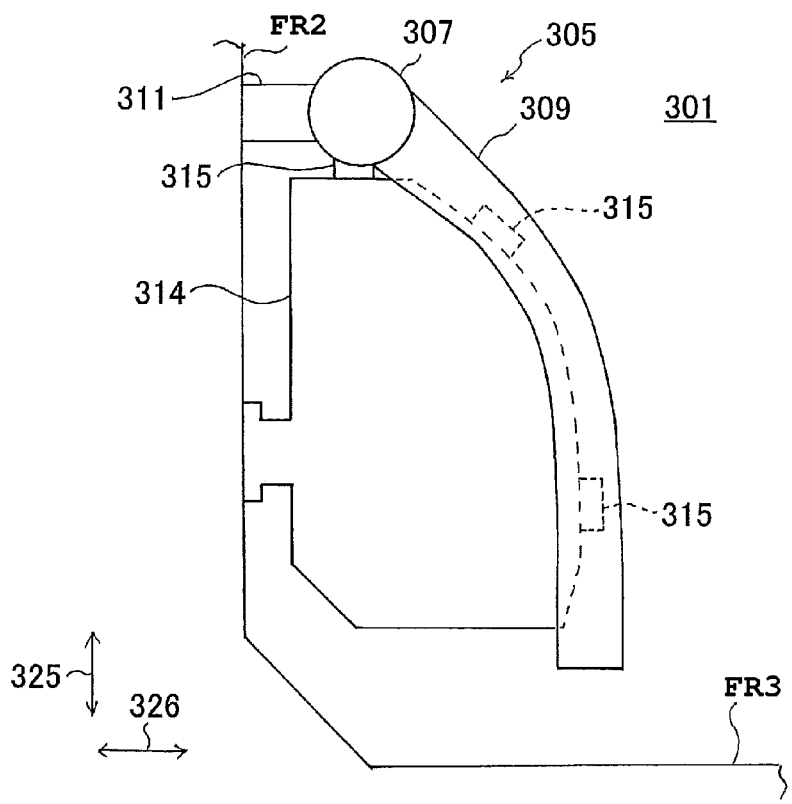
FIG. 33 is a side view of a stay part of the high-strength vehicle body member in the conventional example.
Figure 34:
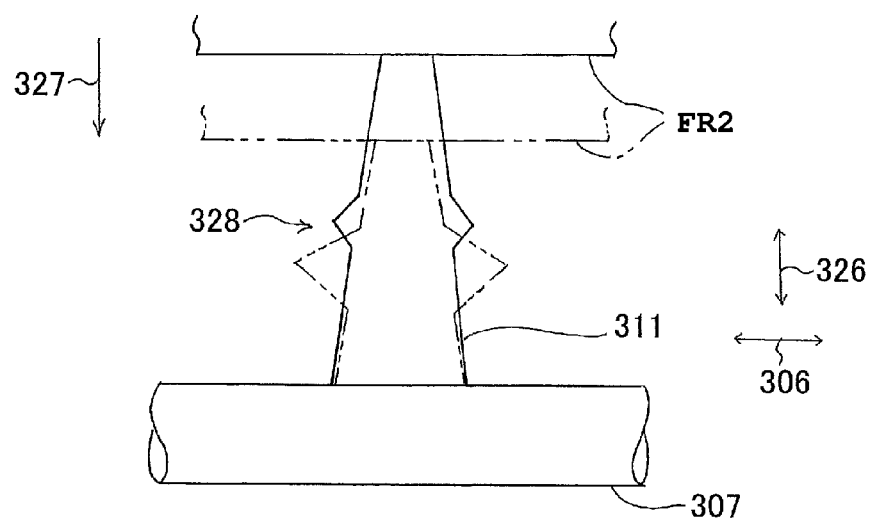
FIG. 34 is a plan view of a post bracket part of the high-strength vehicle body member in the conventional example.

As shown in FIG. 30, when the emergency input load 3F (first load 3Fa) is applied to the vehicle (vehicle body) from the front thereof in an emergency, the cabin front wall 335 and the left and right cabin side walls 337 are displaced rearward. Due to such displacement, the high-strength-vehicle-body-member main part 342 receives a force directed toward the rear of the vehicle by way of the post bracket 345, the side brackets 343, and the like. In this event, though not particularly illustrated, the post bracket 345 becomes separated from the high-strength-vehicle-body-member main part 342 (high-rigidity structure part 381) and the column bracket 395 and displaced obliquely upward toward the rear in the vehicle front-rear direction 332. Thus, the post bracket 345 functions to reduce the distance of displacement of the high-strength-vehicle-body-member main part 342 toward the rear of the vehicle and absorb the emergency input load 3F.

Meanwhile, when the cabin front wall 335 is displaced toward the rear of the vehicle in an emergency, the air conditioning unit 397 mainly made of resin is displaced toward the rear of the vehicle by the cabin front wall 335. In this event, the stay 344 becomes separated from the high-strength-vehicle-body-member main part 342 (high-rigidity structure part 381) and displaced toward the rear in the vehicle front-rear direction 332. Thus, the stay 344 functions to reduce the distance of rearward displacement of the high-strength-vehicle-body-member main part 342 and the emergency input load 3F.

Further, in an emergency, the knee protector 398 provided to the high-strength-vehicle-body-member main part 342 functions to absorb the emergency input load 3F (the second load 3Fb such as a knee input load from the occupant). With this, it is possible to prevent the occupant from being thrown out of the vehicle and the like accidents, for example.

As described above, according to this example, the following operations and effects can be obtained.

(a) The high-strength-vehicle-body-member main part 342 (high-rigidity structure part 381) and the stay 344 which are formed as members independent of each other are attached and integrated together at the attachment structure portion 346. The high-strength vehicle body member 341 is placed in the cabin front part 334. In the high-strength vehicle body member 341 placed in the cabin front part 334, the high-strength-vehicle-body-member main part 342 extends substantially in the vehicle width direction 331. Moreover, the high-strength-vehicle-body-member main part 342 is supported on the cabin floor 336 by means of the stay 344. Furthermore, the high-strength-vehicle-body-member main part 342 is supported on the cabin front wall 335 by means of the post bracket 345.

Upon application of the emergency input load 3F, it is possible to separate the high-strength-vehicle-body-member main part 342 (high-rigidity structure part 381) and the stay 344 from each other by the emergency separable attachment structure portion 347 provided as the attachment structure portion 346 of the high-strength-vehicle-body-member main part 342 and the stay 344.

Thus, when, for example, the emergency input load 3F (3Fa) directed toward the rear of the vehicle is applied to the high-strength-vehicle-body-member main part 342, only the high-strength-vehicle-body-member main part 342 can be displaced toward the rear of the vehicle without the stay 344 being displaced. On the other hand, when the emergency input load 3F (3Fb) directed toward the front of the vehicle is applied to the high-strength-vehicle-body-member main part 342, only the high-strength-vehicle-body-member main part 342 can be displaced toward the front of the vehicle without the stay 344 being displaced. Accordingly, it is possible to reduce influence which the stay 344 experiences due to the emergency input load 3F applied to the high-strength-vehicle-body-member main part 342. Consequently, the stay 344 can continue to exhibit its other functions without any interruption even in an emergency. Note that the stay 344 has functions such for example as support of a car audio system, a control box, and the like as well as attachment of the instrument panel thereto.

Alternatively, when the emergency input load 3F (3Fa) directed toward the rear of the vehicle is applied to the stay 344, only the stay 344 can be displaced toward the rear of the vehicle without the high-strength-vehicle-body-member main part 342 being displaced. On the other hand, when the emergency input load 3F (3Fb) directed toward the front of the vehicle is applied to the stay 344, only the stay 344 can be displaced toward the front of the vehicle without the high-strength-vehicle-body-member main part 342 being displaced. Accordingly, it is possible to reduce influence which the high-strength-vehicle-body-member main part 342 experiences due to the emergency input load 3F applied to the stay 344. Consequently, the high-strength-vehicle-body-member main part 342 can continue to exhibit its functions without any interruption even in an emergency. Note that the high-strength-vehicle-body-member main part 342 has functions such for example as support of the steering column.

In an emergency, due to rearward displacement of the cabin front wall 335 and the like, the emergency input load 3F (3Fa) directed toward the rear of the vehicle is applied indirectly to the high-strength-vehicle-body-member main part 342 and the stay 344 through the post bracket 345 attached to the high-strength-vehicle-body-member main part 342, the side brackets 343, the air conditioning system, and the like.

Meanwhile, the emergency input load 3F (3Fb) directed toward the front of the vehicle is applied indirectly to the high-strength-vehicle-body-member main part 342 and the stay 344 due to input through the knees of the occupant or the like into the knee protector 398 attached to the high-strength-vehicle-body-member main part 342.

In this example, in an emergency, the high-strength-vehicle-body-member main part 342 and the stay 344 are separated from each other by the emergency separable attachment structure portion 347 provided as the attachment structure portion 346 of the high-strength-vehicle-body-member main part 342 and the stay 344. This makes it difficult for a moment and the like, which are applied to one of the high-strength-vehicle-body-member main part 342 and the stay 344, to affect the other.

As described above, in an emergency, the high-strength-vehicle-body-member main part 342 can be separated from the stay 344 or vice versa and displaced by a corresponding necessary distance. Thereby, it is possible to reduce deformation of the high-strength-vehicle-body-member main part 342 and the stay 344. Meanwhile, it is also possible to increase the strengths of the high-strength-vehicle-body-member main part 342 and the stay 344 and to do like as needed.

(b) The attachment structure portion 346 (emergency separable attachment structure portion 347) attaches together the lower portion of the high-strength-vehicle-body-member main part 342 (high-rigidity structure part 381) and the upper end of the stay 344 by bringing the attachment surface portions 348 and 349 (emergency front-rear displaceable portions 352 and 353) into contact with each other and fixing them to each other by the fixture portions 351 (emergency releasable fixture portions 354).

Then, when the emergency input load 3F is applied to the stay 344 and the like, the emergency releasable fixture portions 354 of the emergency separable attachment structure portion 347 release the fixed state of the high-strength-vehicle-body-member main part 342 (high-rigidity structure part 381) and the stay 344. Thereafter, the emergency front-rear displaceable portions 352 and 353 guide the high-strength-vehicle-body-member main part 342 and the stay 344 in such a manner that the high-strength-vehicle-body-member main part 342 and the stay 344 slide relative to each other substantially in the vehicle front-rear direction 332.

Note that by providing the stopper portion 350 to the attachment surface portions 348 and 349, or the emergency front-rear displaceable portions 352 and 353, it is possible to limit displacement of any one of the high-strength-vehicle-body-member main part 342 and the stay 344 toward one or the other way in the vehicle front-rear direction 332. In this example, displacement of the stay 344 from the high-strength-vehicle-body-member main part 342 toward the front of the vehicle is limited.

Moreover, the emergency releasable fixture portions 354 may serve as: the displaceable fastening fixture portions 359 each including the screw 355 and the elongated hole 358 stretched in the vehicle front-rear direction 332; the riveted portions (breakable riveted portions) such as rivets; the locking fixture portions 367 (deformable locking fixture portions 368) each including the hook portion 365 and the hook locking hole portion; or the like.

(c) When the high-strength-vehicle-body-member main part 342 and the stay 344 are separated from each other, loads such as the emergency input load 3F and a moment can be absorbed by the load absorption portions 371 provided to the emergency releasable fixture portions 354.

With this, it is possible to effectively prevent deformation of the high-strength-vehicle-body-member main part 342 and the stay 344 and the like attributable to the emergency input load 3F, a moment, and the like without having to increase the strengths of the high-strength-vehicle-body-member main part 342 and the stay 344. It is also possible to reduce the distances of displacement of the high-strength-vehicle-body-member main part 342 and the stay 344, and the like.

Note that the displaceable fastening fixture portions 359 serving as the emergency releasable fixture portions 354 may serve as the load absorption portions 371 by forming the elongated holes 358 into the slit portions 372 narrower than the diameters of their corresponding screws 355 so that the screws 355 can thrust and widen the slit portions 372 in an emergency. Also, the breakable riveted portions, such as rivets, serving as the emergency releasable fixture portions 354 may serve as the load absorption portions 371 by setting the breaking loads thereof to levels that are optimal for the load absorption. Alternatively, the locking fixture portions 367 serving as the emergency releasable fixture portions 354 may serve as the load absorption portions 371 by setting the deformation loads of the hook portions 365 to levels that are optimal for the load absorption.

Hereinabove, examples of the present invention have been described in detail along with the drawings, but these examples are merely exemplary embodiments of the present invention. Therefore, the present invention is not limited only to the configurations in the examples and includes changes in design and the like without departing from the gist of the present invention, as a matter of course. In addition, in the case where, for instance, each example includes multiple configurations, the present invention naturally includes possible combinations of these configurations even without description thereof. Further, in the case where multiple examples and modifications are illustrated, the present invention naturally includes possible combinations of configurations existing therebetween even without description thereof. Moreover, the present invention naturally includes the configurations depicted in the drawings even without description thereof. Furthermore, wordings such as "the like," "so on," and "etc." are used to indicate that an equivalent(s) is included. Also, wordings such as "substantially," "approximately," and "about" are used to indicate that a range or preciseness which is acceptable based on common sense is included.

INDUSTRIAL APPLICABILITY

The present invention is applicable to a portion of a main part of a high-strength member where strength and rigidity against application of an emergency input load are needed to be increased.

CROSS-REFERENCE TO RELATED APPLICATIONS

The present application is based upon and claims the benefit of priority from the Japanese Patent Application No. 2008-297592 filed to the Japan Patent Office on Nov. 21, 2008, Japanese Patent Application No. 2008-311408 filed to the Japan Patent Office on Dec. 5, 2008, and Japanese Patent Application No. 2009-022080 filed to the Japan Patent Office on Feb. 3, 2009, the entire disclosures of which are completely incorporated herein by reference.

The invention claimed is:

1. A structure of a high-strength vehicle body member, comprising:
   a high-strength-vehicle-body-member main part that extends in a vehicle width direction and is configured to be provided in a front part of a cabin of a vehicle;
   a high-rigidity structure part connected to the high-strength-vehicle-body-member main part;
   a stay that is attached to the high-rigidity structure part and supports the high-strength-vehicle-body-member main part in a vertical direction;
   a post bracket that is attached to the high-rigidity structure part and supports the high-strength-vehicle-body-member main part in a vehicle front-rear direction; and
   a knee protector that is attached to the high-rigidity structure part and is capable of receiving a knee of an occupant and absorbing a knee input load thereof upon application of an emergency input load in the vehicle front-rear direction,
   wherein the high-rigidity structure part includes a plurality of tubular closed cross-section portions which extend in the vehicle width direction, and is integrally formed such that the tubular closed cross-section portions are aligned next to each other in the vehicle front-rear direction, and
   wherein the stay extends across each of the tubular closed cross-section portions in the vehicle front-rear direction.

2. The structure of a high-strength vehicle body member of claim 1, wherein,
   at an upper end side of the stay, an expanding cross-section portion is provided which has a horizontal cross section larger than that of a lower end side of the stay, and
   the expanding cross-section portion is attached to a lower surface of the high-rigidity structure part.

3. The structure of a high-strength vehicle body member of claim 1, wherein the post bracket is a reinforced post bracket having such a strength that the post bracket is bent and deformed before the high-strength-vehicle-body-member main part upon application of an emergency input load from the front in the vehicle front-rear direction, but is not bent or deformed before the high-strength-vehicle-body-member main part upon application of the knee input load by the occupant from the rear in the vehicle front-rear direction.

4. The structure of a high-strength vehicle body member of claim 1, further comprising a column bracket which is attached to the high-rigidity structure part, the column bracket being configured to be attached to a steering column of the vehicle, and
   wherein the post bracket has a bifurcated shape including a main-part supporting portion provided between a cabin front wall of the vehicle and a vehicle-front-side portion of the high-rigidity structure part, and a column supporting portion provided between the cabin front wall and the column bracket.

5. The structure of a high-strength vehicle body member of claim 4,
   further comprising a base bracket,
   wherein a reinforced post bracket body having a substantially triangular shape cross section includes the base bracket joined between and to a vehicle-rear-side end of the main-part supporting portion of the post bracket and a lower end of the column supporting portion thereof,
   wherein the base bracket is disposed in contact, from above, with a vehicle-front-side upper surface of the high-rigidity structure part and an upper surface of the column bracket, wherein a high-strength-vehicle-body-member attachment portion through which the base bracket is attached to the high-rigidity structure part is provided between the base bracket and the vehicle-front-side upper surface of the high-rigidity structure part, and wherein a column-bracket attachment portion through which the base bracket is attached to the column bracket is provided between the base bracket and the upper surface of the column bracket.

6. The structure of a high-strength vehicle body member of claim 5, wherein an emergency separable/escapable structure portion is provided between the high-rigidity structure part and column bracket and the reinforced post bracket body wherein the emergency separable/escapable structure portion allows the reinforced post bracket body to be attached to the high-rigidity structure part and the column bracket in such a manner that the reinforced post bracket body is separable and escapable therefrom upon application of an emergency input load from the front, and wherein the emergency separable/escapable structure portion includes a slide surface portion provided to a lower surface of the base bracket, a guide surface portion provided to the vehicle-front-side upper surface of the high-rigidity structure part and to the upper surface of the column bracket and being capable of guiding sliding movement of the slide surface portion toward rear and upper sides of the vehicle, a load absorption attachment member provided to the high-strength-vehicle-body-member attachment portion and to the column-bracket attachment portion and being capable of breaking due to an emergency input load from the front of the vehicle to absorb the emergency input load, and a load absorption amount adjustment member so provided as to be selectively mountable between the slide surface portion and the guide surface portion, and being capable of breaking due to an emergency input load from the front of the vehicle to absorb the emergency input load and of setting and adjusting an amount of the absorption of the emergency input load.

7. The structure of a high-strength vehicle body member of claim 1, wherein the post bracket includes at least two vertical surface portions disposed in parallel to each other with a gap therebetween, and the two vertical surface portions are joined to each other by the base bracket.

8. The structure of a high-strength vehicle body member of claim 1, wherein an attachment structure portion through which the stay is attached to the high-rigidity structure part is provided between the high-rigidity structure part and the stay, and the attachment structure portion is an emergency separable attachment structure portion enabling the high-rigidity structure part and the stay to be separated from each other upon application of an emergency input load.

9. The structure of a high-strength vehicle body member of claim 8, wherein the attachment structure portion includes an attachment surface portion provided to the high-rigidity structure part, an attachment surface portion provided to the stay, and a fixture portion fixing both of the attachment surface portions to each other, the emergency separable attachment structure portion includes both of the attachment surface portions as emergency front-rear displaceable portions capable of being displaced substantially in the vehicle front-rear direction, and the emergency separable attachment structure portion includes the fixture portion as an emergency releasable fixture portion capable of releasing a fixed state of the high-rigidity structure part and the stay upon application of an emergency input load.

10. The structure of a high-strength vehicle body member of claim 9, wherein the emergency releasable fixture portion includes a load absorption portion capable of absorbing the emergency input load when the fixed state of the high-rigidity structure part and the stay is released.

11. The structure of a high-strength vehicle body member of claim 1, wherein the plurality of closed cross-section portions include two tubular portions having a non-circular cross section.

12. The structure of a high-strength vehicle body member of claim 1, wherein the stay is directly attached to the high-rigidity structure part.

13. The structure of a high-strength vehicle body member of claim 1, wherein the plurality of closed cross-section portions includes three tubular portions aligned next to each other in a front-rear direction of the vehicle.

14. The structure of a high-strength vehicle body member of claim 1, wherein at least one of the closed cross-section portions constitutes a through hole in the high-rigidity structure part, and the high-strength-vehicle-body-member main part penetrates entirely through the through hole in the vehicle width direction.

15. The structure of a high-strength vehicle body member of claim 1, further comprising a knee protection bracket directly connected to the high-rigidity structure part, wherein the knee protector is directly connected to the knee protection bracket.

16. The structure of a high-strength vehicle body member of claim 1, further comprising two knee protection brackets directly connected to the high-rigidity structure part, wherein the knee protector is directly connected to the two knee protection brackets.

17. The structure of a high-strength vehicle body member of claim 1, wherein the post bracket is directly connected to the high-rigidity structure part.

18. The structure of a high-strength vehicle body member of claim 1, further comprising a knee protection bracket directly connected to the high-rigidity structure part, wherein the knee protector is directly connected to the knee protection bracket, wherein at least one of the closed cross-section portions constitutes a through hole in the high-rigidity structure part, and the high-strength-vehicle-body-member main part penetrates entirely through the through hole in the vehicle width direction, wherein the post bracket is directly connected to the high-rigidity structure part, and wherein the stay is directly connected to each of the tubular closed cross-section portions, and wherein the tubular closed cross-section portions are coextensive with each other in the vehicle width direction.

19. The structure of a high-strength vehicle body member of claim 1, further comprising a knee protection bracket directly connected to the high-rigidity structure part, wherein the knee protector is directly connected to the knee protection bracket, wherein at least one of the closed cross-section portions constitutes a through hole in the high-rigidity structure part, and the high-strength-vehicle-body-member main part penetrates entirely through the through hole in the vehicle width direction, and wherein the post bracket is directly connected to the high-rigidity structure part.

20. The structure of a high-strength vehicle body member of claim 1, further comprising a knee protection bracket directly connected to the high-rigidity structure part, wherein the knee protector is directly connected to the knee protection bracket, wherein at least one of the closed cross-section portions constitutes a through hole in the high-rigidity structure part, and the high-strength-vehicle-body-member main part penetrates entirely through the through hole in the vehicle width direction, wherein the post bracket is directly connected to the high-rigidity structure part, and wherein the post bracket is a reinforced post bracket having such a strength that the post bracket is bent and deformed before the high-strength-vehicle-body-member main part upon application of an emergency input load from the front in the vehicle front-rear direction, but is not bent or deformed before the high-strength-vehicle-body-member main part upon application of the knee input load by the occupant from the rear in the vehicle front-rear direction.

* * * * *